United States Patent [19]

Culley

[11] 4,447,213
[45] May 8, 1984

[54] ELECTRONIC LEARNING AID

[75] Inventor: Bobby G. Culley, Wylie, Tex.

[73] Assignee: Texas Instruments Incorporated, Dallas, Tex.

[21] Appl. No.: 843,017

[22] Filed: Oct. 17, 1977

[51] Int. Cl.³ ............................................. G09B 23/02
[52] U.S. Cl. ..................................... 434/201; 434/202
[58] Field of Search ...................... 35/6, 9 R, 9 A, 9 B, 35/30, 31 R, 31 C, 48 R; 273/1 E, 85 G, 138 A; 340/366; 364/200, 410, 900

[56] References Cited

U.S. PATENT DOCUMENTS

| | | | |
|---|---|---|---|
| 3,748,754 | 7/1973 | LaBerge | 35/48 R |
| 3,947,976 | 4/1976 | Hafel | 35/31 C |
| 3,974,575 | 8/1976 | Duncan | 35/31 R |
| 3,981,087 | 9/1976 | Sachs | 35/9 A |
| 4,010,556 | 3/1977 | Ellsworth | 35/30 |
| 4,026,555 | 5/1977 | Kirschner et al. | 273/85 G |
| 4,040,048 | 8/1977 | Lien | 35/30 X |
| 4,051,605 | 10/1977 | Toal et al. | 35/30 |

FOREIGN PATENT DOCUMENTS 2228409 11/1974 France ................................ 340/336

OTHER PUBLICATIONS

*Popular Electronics*, "Altair 8800", Jan. 1975, pp. 33-38.

*Primary Examiner*—Vance Y. Hum
*Attorney, Agent, or Firm*—William E. Hiller; James T. Comfort; Melvin Sharp

[57] ABSTRACT

An electronic learning aid of the type having a keyboard, a display at which problems are posed, a circuit for posing problems at the display, and a circuit for comparing proposed answers entered at the keyboard with correct answers, is provided with a timing circuit for measuring elapsed time while a set of problems is being posed to an operator of the learning aid. The timing circuit is preferably arranged to actuate different segments of a timing character in the display when the timing circuit is performing its timing function. The timing circuit is also preferably arranged to actuate, at the conclusion of a set of problems, the display to provide an indication to the operator of the learning aid the total elapsed time taken in solving the set of problems.

16 Claims, 13 Drawing Figures

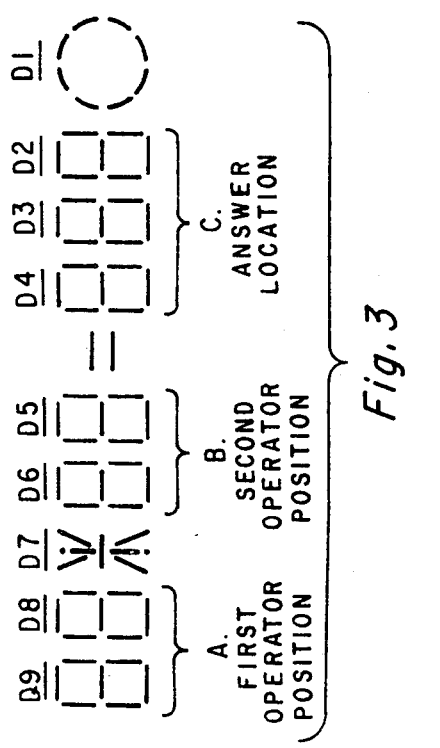
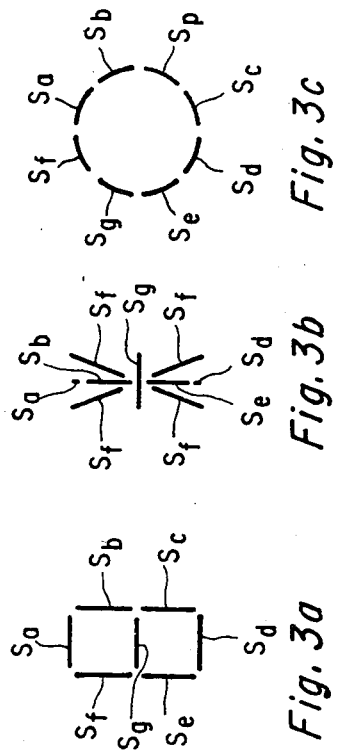
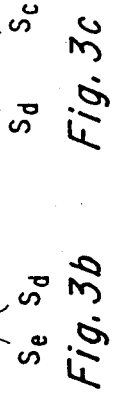
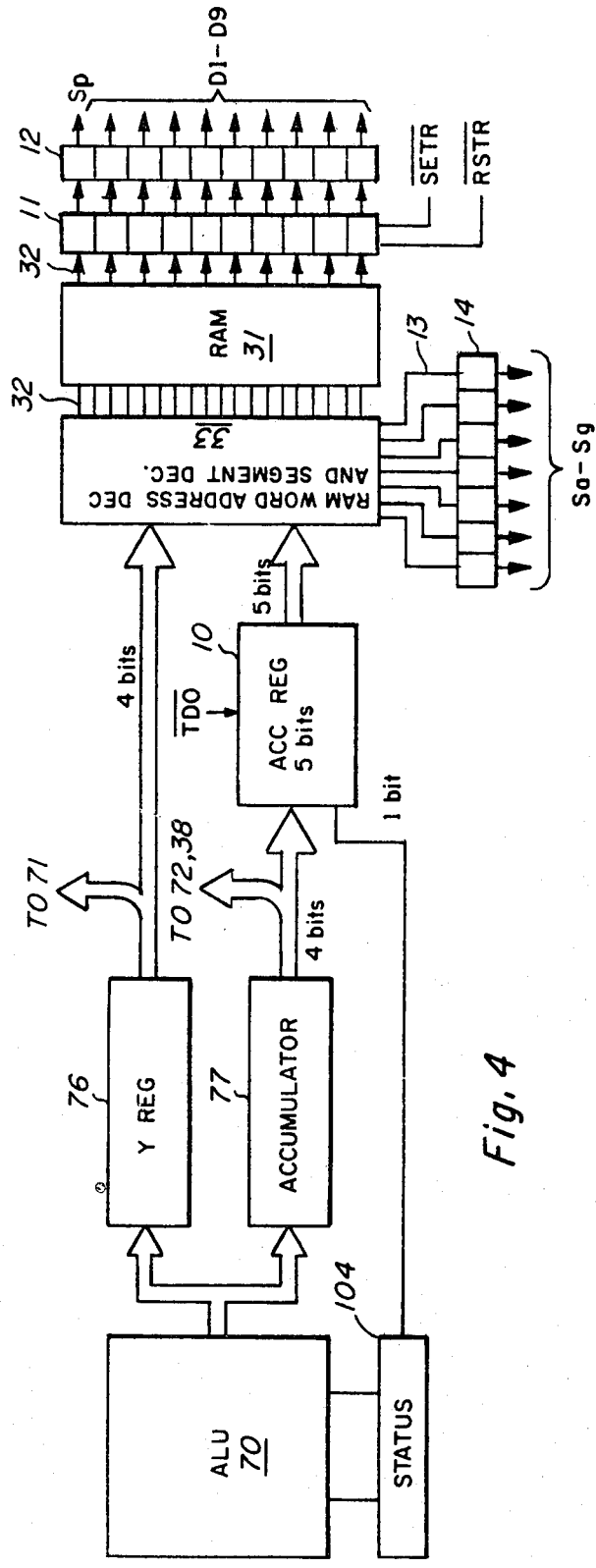

ELECTRONIC LEARNING AID

BACKGROUND OF THE INVENTION

This invention relates to learning aids, and more specifically, learning aids of the type which may be used for teaching elementary arithmetic or other such subjects.

In the prior art, it has been known to provide learning aids for teaching children and adults arithmetic and other subjects as well. Early learning aids were essentially mechanical devices, such as that exemplified by U.S. Pat. No. 925,716 which issued June 22, 1909. More modernly, it has been known to use large electronic computers programmed for the purpose of teaching arithmetic. For example, in an article entitled "The Development of Computer Assisted Instruction" which appeared in IEEE Transactions on Human Factors and Electronics in June 1967, the use of an IBM 650 computer programmed for teaching binary arithmetic is disclosed. Further, it has been known to provide desk model learning aids for teaching elementary arithmetic, such as those learning aids exemplified by U.S. Pat. Nos. 3,584,398 of June 14, 1971 and 3,947,976 of Apr. 6, 1976. Still further, it is known to implement an elementary arithmetic learning aid in a hand-held battery-powered unit, which units have found their way into the market place under the trade name "Little Professor" manufactured by Texas Instruments Incorporated or "Quiz Kid" manufactured by National Semiconductor Incorporated.

While these prior art electronic learning aids are effective for informing the operator of the learning aid whether he or she has properly solved a problem, these prior art electronic learning aids do not emphasize the importance of being able to solve problems quickly in addition to solving them accurately.

It was, therefore, one object of this invention to provide an electronic learning aid with an indication of the time taken to solve a problem or a set of problems. It is another object of this invention that, in addition to being informed of the correctness of solutions to a set of problems, that the operator should also be informed as to the time required to solve the set of problems. It was yet another object of this invention that the display associated with the learning aid be provided with a timing character for the purpose of indicating to the operator of the learning aid that he or she is being timed while the learning aid is awaiting the entry of a solution to the problem then being posed.

The foregoing objects are achieved as is now described. In a preferred embodiment of the learning aid, the learning aid is provided with a display for presenting arithmetic problems and timing information. The learning aid preferably has circuits for posing problems via the display to the operator, receiving the operator's proposed solution to the problems via a keyboard or other data entry means and circuits for comparing the operator's proposed solution with a correct solution to the problem. The learning aid is further provided with a timing circuit for timing (in preselected intervals of time) when the learning aid is presenting a problem to the operator and also awaiting the receipt of a proposed solution from the operator. When the timing circuit is performing its timing function, a timing character in the display is preferably actuated to indicate to the operator that he or she is then being timed. Also, the timing circuit is preferably arranged to indicate to the operator after completing a set of problems the total elapsed time (in the aforementioned preselected units) which occurred between the time the first problem in a set was posed and the last problem in the set was posed while the learning aid was awaiting a proposed response from the operator.

BRIEF DESCRIPTION OF THE DRAWINGS

The novel features believed characteristic of the invention are set forth in the appended claims. The invention itself, however, as well as a preferred mode of use and further objects and advantages thereof, will best be understood by reference to the following detailed description of an illustrative embodiment when read in conjunction with the accompanying drawings, wherein:

FIG. 3 depicts the segmented electrodes of the display and FIGS. 3a–3c identify those segmented electrodes;

FIG. 4 is a block diagram of a portion of the microprocessor used in the learning aid;

DETAILED DESCRIPTION

Figure 1:
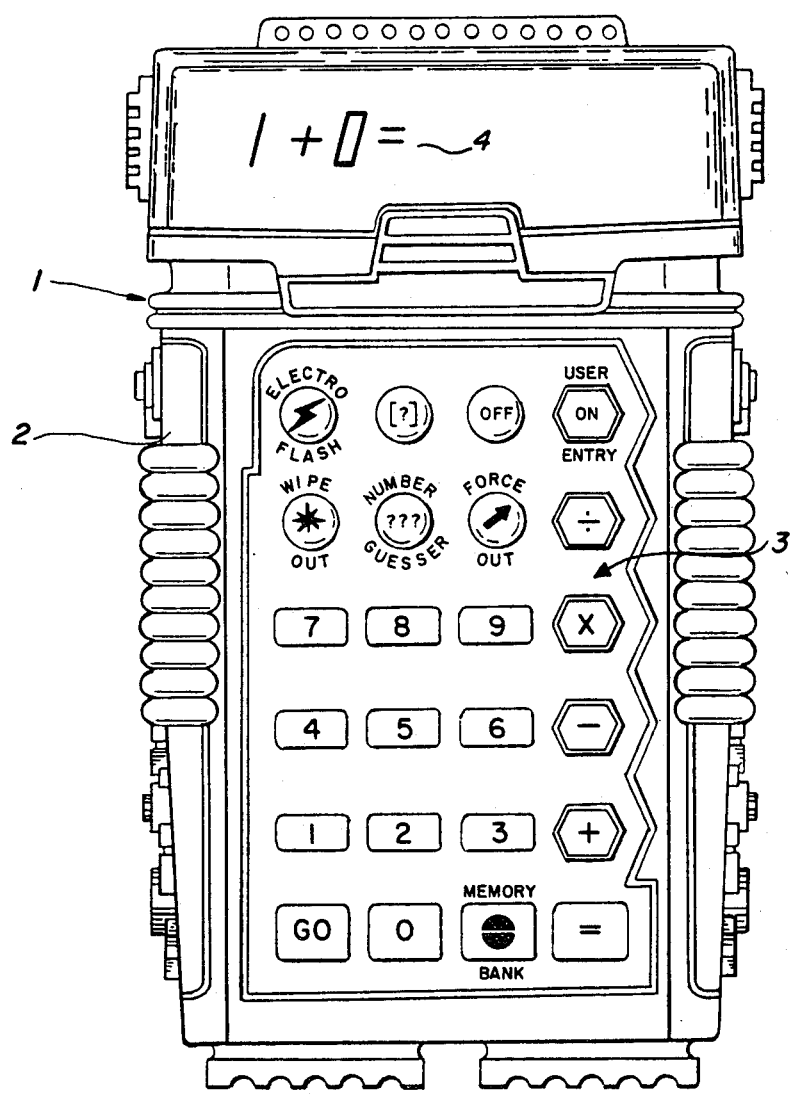
FIG. 1 is a front view of a case in which a learning aid embodying the present invention may be disposed.

Referring now to FIG. 1, there is shown a front view of a learning aid 1 which may embody the present invention. The learning aid is disposed in a case 2, which in FIG. 1, is depicted as a stylized version of a "Spaceman" or other "Space-character". Of course, whether a case 2 is used at all and the style of the case used are design choices of those who desire to practice the present invention. Also in FIG. 1, the case is shown with a keyboard 3 and a display 4. Display 4 may be provided by a vacuum fluorescent display device, an array of light emitting diodes, a liquid crystal display device, gas discharge tube electrochromic display device or other display means.

Figure 2:
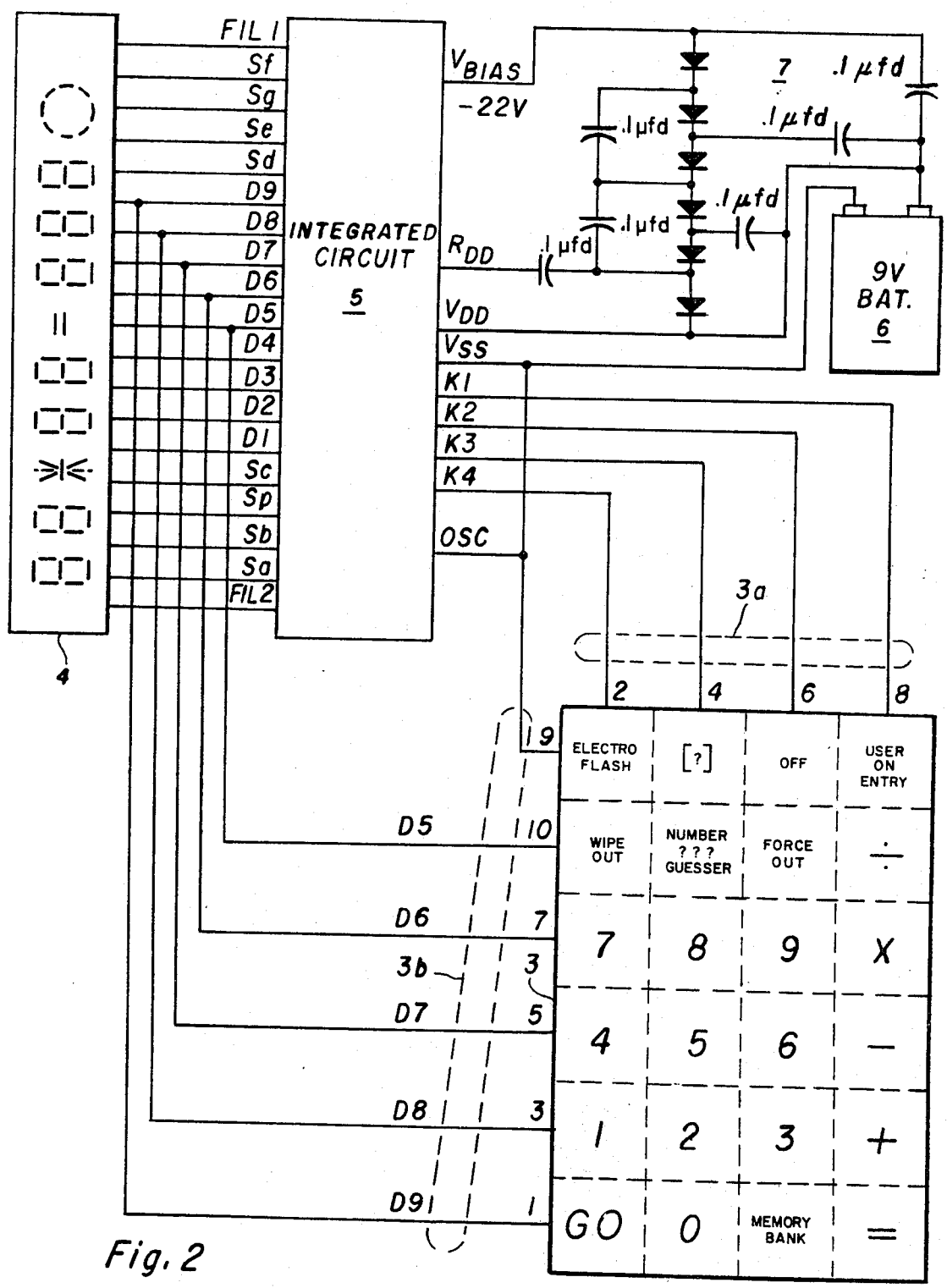
FIG. 2 is a simplified block diagram of the learning aid, including a voltage tripler circuit.

Referring now to FIG. 2, there is shown a simplified block diagram of the components preferably located in case 2 (FIG. 1). Keyboard 3 is preferably of the well known matrix type and in this embodiment has four column conductors 3a and six row conductors 3b. As is well known, in matrix keyboards, the column and row conductors thereof are arranged to cross over each other (in the form of the grids of a matrix) and connections preferably occur at the points of cross-over when the push-button switches associated therewith are depressed. Display 4 is preferably adapted to be actuated by multiplexed signals and, in this embodiment, display 4 is provided with nine character positions strobed by D (Digit) lines D1 through D9, with each character position having up to eight segments strobed by lines Sa–Sg and Sp.

Integrated circuit 5 is coupled to both display 4 and keyboard 3. Integrated circuit 5 strobes keyboard 3 on the D5 through D9 lines coupled to the row conductors and detects key closures by sensing K1, K2, K3 and K4 lines coupled to column conductors 3a. One of the column conductors is coupled to $V_{SS}$ rather than one of the other D lines (D1–D4) to provide the learning aid with an integrated on/off switch which is described in U.S. patent application Ser. No. 700,672 filed June 28, 1976, now U.S. Pat. No. 4,089,062 issued May 9, 1978. In lieu of using integrated circuit 5, of course, a plurality of integrated circuits, a plurality of discrete devices or mixtures thereof could be used to perform the functions of integrated circuit 5; however, it will be appreciated by those skilled in the art that by integrating more electronic functions on a single integrated circuit (of reasonable dimensions), the cost of the entire learning aid system may be reduced. Integrated circuit 5 is preferably a microprocessor type device implemented in Metal Oxide Silicon (MOS) technology. Of course, as a matter of design choise, those practicing the present invention may wish, in the alternative, to use bipolar, integrated injection logic, charge-coupled, bucket brigade or other such technologies in implementing integrated circuit 5.

Preferably, integrated circuit 5 is provided with the microprocessor described in U.S. patent application Ser. No. 706,719 filed July 19, 1976, now U.S. Pat. No. 4,073,006 issued Feb. 7, 1978, modified as is hereinafter discussed with its read-only-memory being programmed with the instruction set of Table I. U.S. Pat. No. 4,073,006 is hereby incorporated herein by reference. The microprocessor chip described in U.S. Pat. No. 4,073,006 uses a segment scanning technique for driving its display. That is, the segments scan lines $S_a$–$S_g$ and $S_p$ which (See FIG. 3 of U.S. Pat. No. 4,073,006) are strobed sequentially while the digit drive lines, D1–D9, are selectively enabled to display appropriate numerals in the display used in conjunction with the microprocessor chip of U.S. Pat. No. 4,073,006. In the present embodiment, as a matter of design choice, a digit scan technique is used to actuate display 4. The D lines, D1–D9 are sequentially strobed while the segment lines, $S_a$–$S_g$ and $S_p$ are selectively enabled. As should be apparent to those skilled in the art, segment scan techniques are preferably used when display 4 is provided by an array of light emitting diodes, as is discussed in U.S. Pat. No. 4,073,006 while digit scan techniques are preferably used when display 4 is provided by a vacuum fluorescent display, for instance. The display used and the scanning technique used to drive the display are design choices to be made by those practicing the present invention; however, those who desire to practice the present invention utilizing the microprocessor of U.S. Pat. No. 4,073,006 and the ROM instruction set of Table I should be aware that the microprocessor of U.S. Pat. No. 4,073,006 is embodied with segment scanning while the program of Table I is set up for digit scanning to drive the display 4. Accordingly, appropriate modification to the microprocessor of U.S. Pat. No. 4,073,006 should be made to convert it from segment scanning to digit scanning or appropriate modifications should be made to the program of Table I to convert it from digit scanning to segment scanning. Modifications which may be made to the microprocessor of U.S. Pat. No. 4,073,006 to convert it to digit scanning discussed subsequently.

Referring now to FIGS. 3 and 3a–3c, there are depicted the segment details of display 4. In FIG. 3, display 4 preferably includes a first operator location as provided by two seven-segmented characters for displaying numerals, for instance. Also included is a second operator location also preferably comprising two seven-segmented characters. The first and second operator locations are separated by an annotator location which may be used for displaying plus, minus, multiply or divide signs. Display 4 is further provided with an answer location, which, in this embodiment, has three conventional seven-segment characters. The answer location is separated, in this embodiment, from the second operator position by an equals sign annotator. Display 4 is also provided with an eight segmented, circular character, which is used at certain times as a timing indicator and for certain other display functions. When used as a timing indicator, the eight segments of the circular character may be sequentially actuated, each segment being actuated for a predetermined time interval. Of course, in certain applications it may be desirable to use a segmented oval, square, rectangular or spoked wheel character in lieu of the circular character shown in FIG. 3 or to use more or less than eight segments therefor.

Each character position of the display 4 preferably has a common electrode associated with each character position. Thus, the D1 electrode is associated with the timing indicator, while the D2–D4 electrodes are associated with the respective three characters in the answer location. The D5 electrode is associated with the least significant digit in the second operator position and with the equals sign, while the D6 electrode is associated with the most significant digit in the second operator position. The D7 electrode is associated with the annotator character while the D8 and D9 electrodes are associated with the respective digits in the first operator location. This relationship between the D1–D9 electrodes and the character positions is depicted in FIG. 3.

In this embodiment of the display 4, a maximum of eight segments (Sa–Sg and Sp) is associated with each character position. Each segment is connected to one of the segment buses, Sa–Sg and Sp, as is identified in FIGS. 3a–3c for all characters and segments, save for the equals sign. The equals sign is coupled to the Sp segment bus in this embodiment.

Referring again to FIGS. 1 and 2, the learning aid is activated by depressing the "on/user entry" key. This action places the learning aid in a User Entry Mode, which will be subsequently described. Depressing the "off" push button turns the learning aid off. Depressing the "Electro-Flash", "Wipe-Out," "Number Guesser", "Force Out" or "Memory Bank" keys causes the learning aid to enter Math Table (Electro-Flash), Wipe-Out, Number Guesser game, Force Out game or Memory Bank modes which also will be subsequently described. Depressing the key having a question mark enclosed in brackets causes the learning aid to enter a Box Problem Mode which likewise will be subsequently described. The function of the remaining keys, that is, the ten numerals keys, the "GO" key, the equals (=) key and the four arithmetic operator (+, −, × and ÷) keys, will be described with respect to the various modes in which the learning aid may be placed.

USER ENTRY MODE

The learning aid automatically enters the user Entry Mode upon energization. In the User Entry Mode (student entered problem mode), the learning aid actuates the equals sign in display 4. Thereafter, the operator of the learning aid may enter his or her own problem and a proposed solution to the problem. In the User Entry Mode the learning aid will indicate whether the proposed solution is correct or incorrect and will maintain a running score of the problems attempted. More particularly, in the User Entry Mode, after first depressing the User Entry key, a first number preferably having one or two numerals may be entered by the numeral keys followed by one of the four arithmetic operators, followed by a second number preferably having one or two numerals and then followed by the equals key. Then, the proposed solution is entered, by depressing one to three numeral keys, for instance. The first number is displayed at the first operator location (reference A) and the second number is displayed at the second operator location (reference B), while the proposed solution is displayed at the reference C location in display 4 (FIG. 3).

If the answer is correct then the display 4 so indicates by giving a type C presentation after the problem and correct solution are briefly displayed. During the type C presentation (as well as the type A, B and D presentations) the segments in display 4 are actuated in a preselected manner comprising a preselected sequence of various segments actuated at preselected times. The presentation preferably does not display alphanumeric information, but rather presents fanciful, moving pattern of actuated display segments. The type A presentation is the most complex while the type D presentation is the least complex. The particular segments being actuated during the different types of presentations are described subsequently.

If, on the other hand, an incorrect proposed solution is entered at keyboard 3, the learning aid flashes "EEE" in the display and a type D presentation and gives the operator another opportunity to insert a correct answer, by again presenting the entered problem with no solution. If the second proposed solution is also incorrect, the learning aid will again momentarily flash "EEE", indicate the correct answer to the problem and display a type D presentation. If, on the other hand, the second proposed solution is correct, a type C presentation is initiated.

In subtraction problems, the operand may be either one or two digits and have either a one or two digit answer but the first operand, in this embodiment, is required to be larger than the second operand so that negative answers are avoided. A number entry which will make the second operand larger than the first operand is ignored. For example, if $8-5=3$ were keyed in, the problem would be accepted and the type C presentation would be displayed to indicate that the solution was correct. Similarly, if $88-85=3$ were keyed in, the problem would be accepted and the type C presentation would again be initiated because the solution is correct. However, if the operator attempted to key in $75-76$, the numeral 6 would not be accepted or displayed in the second operator position. In this embodiment of the learning aid, and for this problem, only a numeral 5 or less will be accepted in the least significant digit position of the second operator, assuming of course, the second operator is to have two digits, the first of which is a seven.

In multiplication problems, in this embodiment of the learning aid, both operators may be one or two digits and the answer may be one, two or three digits. In the manner similar to the handling of negative answers for subtraction problems, multiplication problems which would result in a four digit result are ignored by inhibiting selected digits in the least significant digit position of the second operator, when required.

For division problems, each operator may have one or two digits. Of course, numbers which do not divide evenly have remainders associated therewith. In this embodiment, only the whole part of the answer need be entered and, after the whole part of the answer is correctly entered, the learning aid of this embodiment displays the remainder (which is previously calculated) preferably with a small case "r" before the numerical value of the remainder. Thus, if $9 \div 4 = 2$ is entered, the learning aid responds by then displaying a lower case "r" and 1 followed by a type C presentation.

In the User Entry Mode, the learning aid of this embodiment scores the user entered problems. After a set of ten problems have been attempted, the learning aid displays, in the first operator position, the number of problems answered correctly on the first try and the number of problems attempted in the second operator position of display 4. The scoring is also preferably shown and associated with either a type A, B, C or D display presentation based on the number of correct answers. If all answers were correct on the first try, i.e., ten correct answers, a type A presentation is initiated. For nine correct answers a type B presentation is displayed while for eight correct answers a type C presentation is presented. For seven or fewer correct answers a type D presentation is begun. The different types of display presentations, types A–D, are described subsequently.

MEMORY BANK MODE

The Memory Bank Mode is used in combination with the Use Entry Mode to store a series of up to ten problems. The problems are entered in nearly the same way as in the User Entry Mode but instead of pushing the "equals" key and inserting a proposed solution, the Memory Bank key is depressed. The sequence may be repeated up to ten times and the ten problems entered thereby are stored in a memory in integrated circuit 5 of the learning aid. The problems may then be sequentially outputted by depressing the "GO" key. The "GO" key also starts an elapsed time counter which times the operator as he or she solves the series of problems stored in the memory. The elapsed time counter counts only when the learning aid is waiting for the operator to respond to the problem being posed.

As in the User Entry Mode, the operator is given two opportunities to enter a proposed solution which is the correct solution to the problem being posed and the learning aid initiates either a type C or D presentation at display 4 for correct or incorrect answers, respectively. Also, as in the User Entry Mode, the number of correctly answered problems (on the first try) and the total number of problems presented are remembered by the learning aid. At the conclusion of the set of problems, three numbers are displayed in the first and second operator positions and the answer position of the display. In the first operator position, the number of correct answers is shown, in the second operator position the number of problems attempted is shown and in the answer position an elapsed time indication (a decimal number of up to three digits) is displayed. Thereafter, if the number of correct answers and the number of posed problems are identical then a type A display presentation is initiated while if the number of correct answers and number of problems presented differ then either a type B presentation is displayed if the difference is one or a type C presentation is started if the difference is two or a type D presentation is begun if the difference is three or more.

MATH TABLE MODE

The "Electro-Flash" (short for electronic flash card) key is depressed to put the learning aid in the Math Table Mode. The learning aid of this embodiment herein described then displays the numeral one in the operator position and a plus sign in the annotator position of display 4. If the "GO" key is now depressed, the learning aid sequentially poses a problem of the type $1+X$ where $X=0, 1, \ldots 8,9$. The number or arithmetic operator in the expression may be altered by depressing the appropriate number and/or arithmetic operator key before depressing the "GO" key. The math tables then tested will be presented as, for example, $6+X$ or $X+6$ (where $X=0, 1, \ldots, 9$,) depending on the order in which the number and arithmetic operator are entered at keyboard 3. Thus, after depressing the electro-flash key, if just the six numeral key or the six numeral key followed by the plus sign key is depressed, then the problems will be posed in the $6+X$ format whereas if the plus sign is depressed before the numeral six the problems will be posed in the $X+6$ format.

When the learning aid is doing addition tables, the problems may be of the form $2+X$ or $X+5$, for instance, with X sequentially increasing from 0 to 9.

When the learning aid is doing subtraction tables, however, problems requiring a negative answer are not posed. Thus, for example, the $7-X$ tables are posed only for $X=0, 1, \ldots 6,7$ and the $X-7$ tables are presented only for $X=7, 8$ and 9.

For the multiplication tables, 3 times X and X times 9 formats are permitted with X sequentially increasing from 0 through 9.

When doing division tables, no restraints are imposed which require the answer to be even. The operator need only to enter the whole part of the answer to receive a correct answer response and the learning aid responds by indicating what the remainder is, if any.

As in the User Entry Mode, the operator of the learning aid is given two opportunities to input a correct solution to the problem before the answer is provided by the learning aid. For each correct answer a type C presentation is initiated at the display. After completing each table, the score is displayed with the number of correct answers (on the first attempt) being placed in the first operator position, the number of problems attempted in the second operator position and the elapsed time being displayed in the answer location. Thereafter, a type A presentation is initiated if all problems were answered correctly, a type B presentation is shown for one incorrect answer, a type C presentation being shown for two incorrect answers and a type D presentation being displayed for three or more incorrect answers.

After completion of a table such as the $7+X$ table, the learning aid goes to the next higher table, which in this case would be the $X+8$ table. After the 9's table is completed, the learning aid reverts to the 0's table for the function being tested.

WIPE-OUT GAME MODE

Depressing the "Wipe-Out" key causes a learning aid to enter the wipe-out game mode. In the wipe-out game mode, a series of problems are presented to the operator of the learning aid. When the game has been started by a depressing the "GO" key, the elapsed time counter contains a number indicative of the time elapse since the "GO" key was depressed. After the counter reaches a randomly preselected count, the display is caused to present a type A presentation. The learning aid when in the wipe-out game mode, is intended to be used by a plurality of players or operators who each answer a problem before passing the learning aid to another player in the game. The player holding the learning aid when the type A presentation is displayed loses and drops out of the game. The game is then reinitiated and the remaining players are eliminated one by one until only one player is remaining who is the ultimate winner.

Upon depressing the "Wipe-Out" key, the machine is cleared and the display shows a plus sign in the annotator character location and displays the equals sign and a pair of brackets in the answer location. A left hand bracket is actuated by actuating the $S_a$ and $S_d$–$S_f$ segments (see FIG. 3a) and a right hand bracket is formed by actuating the $S_a$–$S_d$ segments. The game and the elapsed time counter are initiated by depressing the "GO" key. The learning aid sequentially presents random "Box" type problems of level one difficulty (see Box Problem Mode, which is discussed subsequently). Again, an operator is given two opportunities to enter a correct solution and if the first solution is not correct "EEE" is momentarily displayed followed by a type D presentation and the problem is repeated. After two incorrect attempts, the learning aid displays "EEE" momentarily, the problem and correct answer for a brief period followed by a type D presentation. Correct answers are displayed for about $\frac{1}{2}$ seconds followed by a type C presentation and then the learning aid automatically poses a new problem.

During the presentment of the problems in the wipe-out mode, the elapsed time indicator in display 4 is sequentially actuated, beginning at the five o'clock position and running clock-wise. As in the Memory Bank Mode, the elapsed time counter is activated only while the learning aid is awaiting a correct response.

NUMBER GUESSER MODE

The Number Guesser Mode is entered by depressing the "Number Guesser" key. In the Number Guesser Mode, the learning aid randomly selects a number in the range from 9 to 100. The object of the game is for the operator to guess the number randomly selected by the learning aid in as few attempts as possible.

After depressing the number guesser key, the possible range in which the number may lie is displayed by displaying the number nine in the first operator location, the number 100 in the answer location and brackets in the second operator location of display 4. The operator then enters a guess by pressing the number keys, which guess is briefly displayed in the operator position. The guess is displayed for approximately 1 second and followed by a type C presentation before the learning aid replaces one of the end limits (i.e., either the end limit in the first operator position or in the answer location) with the number guessed so that the randomly selected number still lies within the range shown by the end limits. This sequence continues until the randomly selected number is guessed. If the number guessed lies outside the range of the end limits, a type D presentation is initiated. When the correct answer is entered, the number of guesses required is displayed in the first operator position for a short time followed by a type A presentation. As a matter of design choice, the elapsed time counter is not utilized in the Number Guesser Mode of the embodiment of the learning aid disclosed.

FORCE OUT GAME MODE

The learning aid is placed in the force out game mode by depressing the "Force Out" key on keyboard 3. When initially placed in the force out game mode, the learning aid displays a randomly selected number in the first operator position, a minus sign in the annotator position, a pair of brackets in the second operator position and the equals sign of display 4. This game is typically played by two operators. The first operator starts the game by entering a number between one and nine. The learning aid responds by calculating the difference and displaying it for approximately one second in the answer location and then transposes the difference into the first operator position. The second operator then may be given the opportunity of subtracting a number between one and nine. The game continues until the resulting difference equals zero, at which time a type A display presentation is initiated. The object of the force out game may be either (1) to be or (2) not to be the operator who enters a number leaving a difference that equals zero.

Should either operator enter a number which would result in a negative result, the display 4 provides a type D presentation and the attempted input is ignored.

BOX PROBLEM MODE

The box problem mode is entered by the operator depressing the key with the question mark enclosed by brackets on keyboard 3. The learning aid responds by displaying a plus sign in the annotator character position and brackets enclosing the number one in the answer location position of the display. In the box problem mode, problems of the type $?+3=7$, $3+?=24$ and $40 \div 5=?$ will be presented, the brackets being used to indicate in which position, i.e., the first operator, second operator or answer location that the unknown must be supplied. The position of the brackets may be moved from the answer location to the first operator position, from the first operator position to the second operator position or from the second operator position to the answer location by repeatedly depressing the bracketed question mark key. The particular arithmetic function to be tested can be changed by depresssing the appropriate arithmetic operator key. The number one in the answer location indicates that the problems to be presented are of the first level difficulty. Problems of the second level difficulty may be selected by depressing the number two key. After the brackets are in the desired location and the desired function and level difficulty are selected, the "GO" key may be depressed to initiate the selection of a problem. The levels of difficulty are shown in Table III. Depressing the "GO" key starts a sequence of problems and initiates the elapsed time counter in the learning aid's memory and initiates the rotating actuated segment in the circular timer character of display 4. After each correct answer, a type C presentation is displayed and the learning aid then poses another randomly selected problem. After ten problems have been posed and answered, the number of correct answers is displayed in the first operator position, the number of attempted problems is displayed in the second operator position and the count of the elapsed time counter is displayed in the answer location of display 4 for a brief period of time. Thereafter either a type A, B, C or D presentation is begun based on the number of correct answers, as is done when the learning aid is in the User Entry Mode.

If an incorrect answer is entered at keyboard 3, it is not displayed but the learning aid momentarily displays "EEE" in the answer location followed by a type D presentation and then the learning aid again poses the problem with the answer location blank. After two incorrect attempts, the learning aid displays the correct answer. A correct response receives a type C presentation.

ELAPSED TIME COUNTER

An elapsed time counter is provided by a memory in integrated circuit 5. The counter is incremented approximately every ¾ second. The maximum count is 999 which is equivalent to about twelve minutes. When 999 is attained in the elapsed time counter, the operator may continue using the learning aid but the counter in this embodiment does not count above 999. During the time the elapsed time counter is counting, the timing indicator in the display 4, comprising the circular arrangement of segments, is sequentially actuated, one segment at a time, starting from the five o'clock position and running clock-wise with each successive segment being actuated as the preceding segment becomes unactuated.

INSTRUCTION SET

In Table I (which comprises Tables I-1 through I-15) is listed the set of instructions which may be stored in the main read-only-memory of the microprocessor of U.S. Pat. No. 4,073,006 (with the modifications discussed herein) to provide the integrated circuit 5 of FIG. 2. Referring now to Table I, there are several columns of data which are, reading from left to right: PC (Program Counter), LOC (Location), INST (Instruction), BRLN (Branch Line), Line and Source Statement (which includes name, title and comments). In U.S. Pat. No. 4,073,006, it will be seen that the main read-only-memory is addressed with a seven bit address in a program counter and a four bit address in a buffer. The address in the buffer is referred to as a page address in the main read-only-memory. The instructions listed on Table I-0 correspond to page zero in the microprocessor while the instructions listed in Table I-1 are those on page one and so forth through to the instructions in Table I-15 which are stored on page fifteen in the microprocessor.

The program counter of the aforementioned microprocessor is comprised of a feedback shift register and therefore counts in a pseudorandom fashion. Thus the addresses in the left hand column of Table I, which are expressed as a hexadecimal number, exhibit such pseudorandomness. The hexadecimal location code (LOC) refers to the physical location within the read-only-memory at which the instruction listed is stored. If the instruction starting at page zero were read out sequentially from the starting position in the program counter (00) then the instructions would be read out in the order shown in Table I. In the "line" column is listed a sequentially increasing decimal number associated with each source statement and its instruction and program counter address. The line number starts at line 29 merely for reasons of convenience not important here. When an instruction requiring either a branch or call is to be performed, the address to which the program counter will jump and the page number to which the buffer will jump, if required, is reflected by the binary code comprising the instruction or instructions performing the branch or call. For sake of convenience, however, the branch line column indicates the line number in Table I to which the branch or call will be made. For example, the instruction on line 32 (Page 0, Program Counter Address 07) is a branch instruction, with a branch address of 1111101 (7D in hexadecimal). To facilitate finding the 7D address in the program counter, the branch line column directs one to line 38, where the 7D address is located.

MICROPROCESSOR MODIFICATIONS

Figure 5:
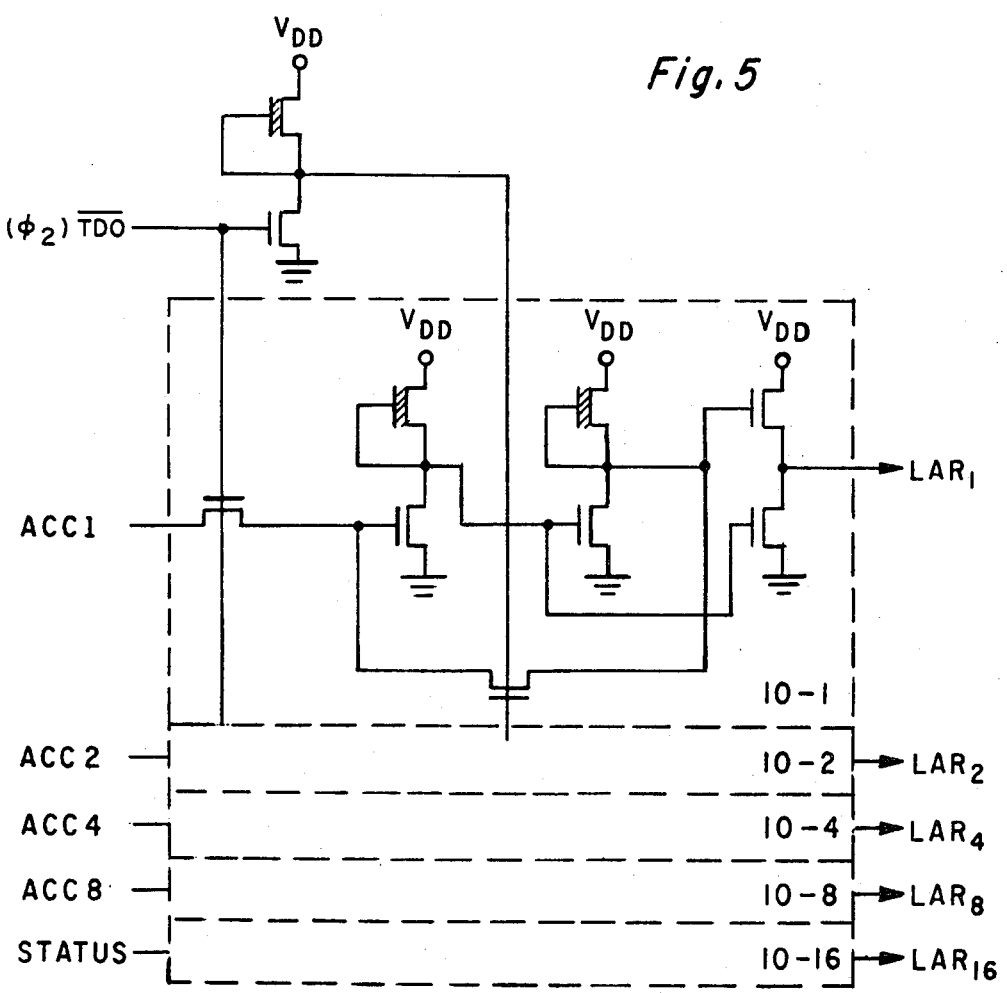
FIG. 5 is a logic diagram of a latched accumulator register.

The microprocessor of U.S. Pat. No. 4,073,006 may be modified for segment decoding as is herein described. Referring now to FIG. 4, there is shown a portion of the block diagram of the microprocessor. In FIG. 4, the elements having reference numerals between 30 and 105 generally correspond with those having the same numerals in FIGS. 7a and 7b of U.S. Pat. No. 4,073,006. The segment latches 87, segment decoder 89, gate 96, buffers 94, latches 97, and output buffers 91 and 98 shown in FIG. 7b of U.S. Pat. No. 4,073,006 are eliminated and replaced with other components shown in the block diagram of FIG. 4. The output of accumulator 77, instead of being directly coupled to the Programmed Logic Array (PLA) in segment decoder 33 is instead coupled thereto via a latched accumulator register 10. Register 10, which is shown in greater detail in FIG. 5, is five bits wide and latches four bits from accumulator 77 as well as one bit from status latch 104 in response to a $\overline{\text{TD0}}$ signal. The contents of register 10 are then clocked into the PLA of RAM word address and segment decoder 33 on a $\phi 1$ clock. Of course, the contents of Y register 76 are also clocked into the PLA, but on a $\phi 2$ clock. Inasmuch as register 10 stores five bits, the PLA of decoder 33 is modified to decode as many as thirty-two terms. However, inasmuch as RAM 31 and digit latches 11 are responsive to the four bit address in Y register 76, only sixteen lines are needed to interconnect decoder 33 with RAM 31.

Table III shows the thirty-two five bit codes (in hexadecimal notation) storable in register 10 and the effect of decoding thereby by decoder 33. Thus, Table III indicates the segments actuated according to the decoding of the five bit codes and the input as seen at display 4 (FIG. 2), according to the segment connections of FIGS. 3a–3c. The first hexadecimal digit in the five bit code indicates the state of the status latch 104 while the second hexadecimal digit corresponds to the four bits inputted into register 10 from accumulator 77. For matters of convenience, a few of the five bit codes will be found to actuate the same set of segments in the display.

The PLA in RAM word address and segment decoder 33 decodes the five bit codes according to Table III and outputs segment actuation signals on lines 13 to segment buffers 14. The segment buffers 14 are shown in greater detail in FIG. 6.

Figure 7:
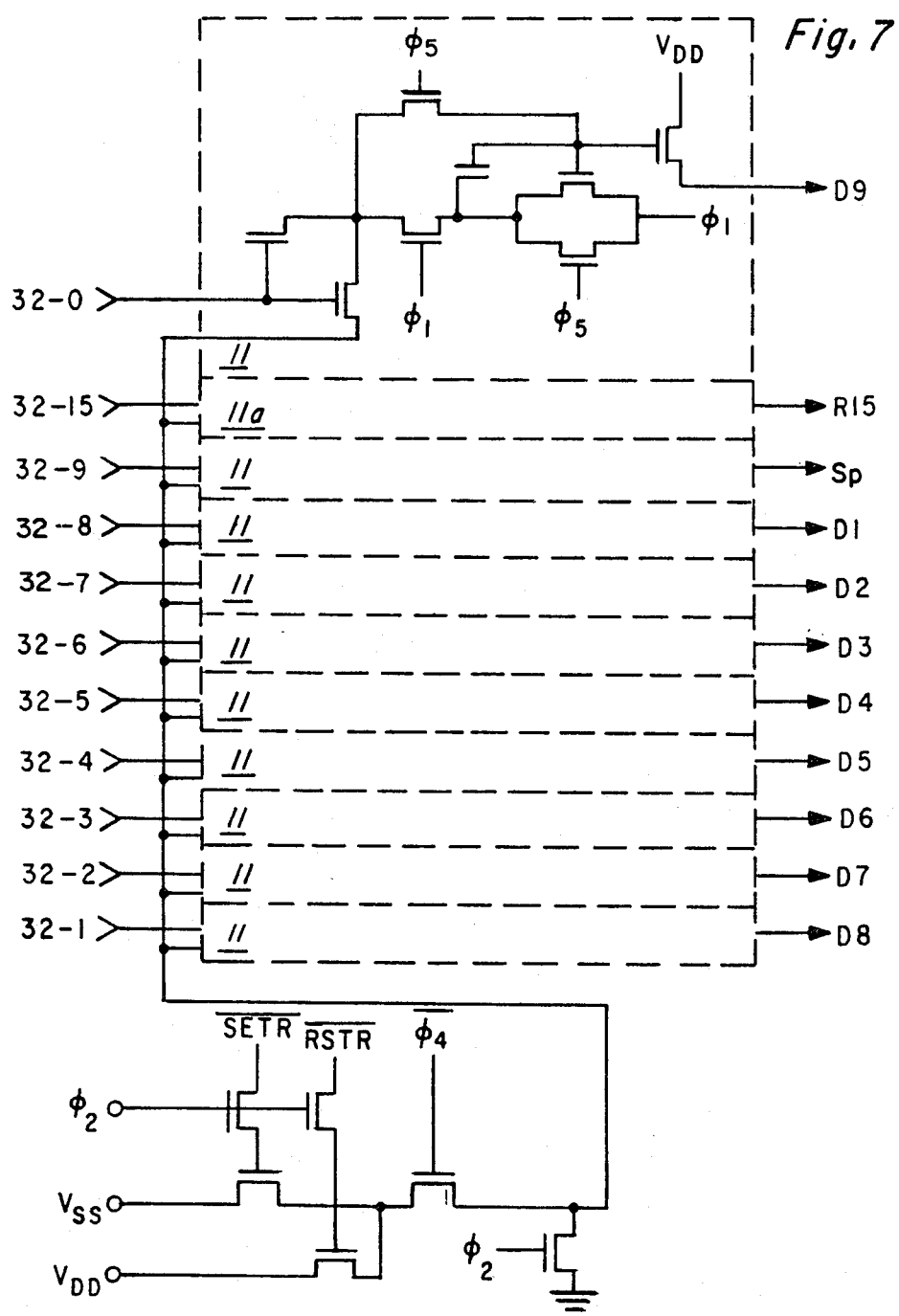
FIG. 7 is a logic diagram of the digit latches.

The digit buffers 11 are similar in construction to the RAM cells in RAM 31, but in lieu of being addressed by RAM pages address decoder 35 (see FIG. 7b of U.S. Pat. No. 4,073,006), these latches 11 are addressed by the $\overline{\text{SETR}}$ and $\overline{\text{RSTR}}$ commands. The $\overline{\text{SETR}}$ command sets the latch 11 whose input line 32 is selected by RAM word address decoder 33 to be set, while the $\overline{\text{RSTR}}$ command resets the latch 11 whose input line 32 is selected by decoder 33. The $\overline{\text{SETR}}$ command was heretofore decoded by the microprocessor of U.S. Pat. No. 4,073,006; however, the $\overline{\text{RSTR}}$ command is a new command in this version of the microprocessor and is decoded when the instruction 0110110 is outputted from the read-only-memory of this microprocessor. The outputs of the digit latches 11 are coupled to the digit buffers 12. The digit latches 11 and digit buffers 12 are shown in greater detail in FIGS. 7 and 8, respectively.

Nine of the digit buffers 12 provide the D1–D9 outputs to the grids of the vacuum fluorescent display device 4, preferably used in this embodiment of the invention. One of the digit buffers is coupled to the $S_p$ output which is coupled to the $S_p$ plate of the vacuum fluorescent display device 4. The $S_A$–$S_G$ outputs from segment buffers 14 are coupled to the remaining plates in vacuum fluorescent display device 4. The outputs from buffers 12 and 14 output zero volts to the respective plates and grids to actuate the desired segments. Typically, the digit lines, D1–D9 are sequentially raised from approximately −25 volts to 0 volts while the segment lines $S_a$–$S_g$ and $S_p$ are selectively raised from approximately −25 volts to 0 volts. It can be seen from an examination of FIGS. 5 and 7 that the segment buffers and digit buffers selectively ground or connect the output lines to $V_{bias}$ (about −25 volts).

It should be noted that the $S_p$ segments are driven from a digit buffer 12 in lieu of being driven from a segment buffer 14, as a matter of design choice. Of course, the $S_p$ segment could be decoded in the PLA in decoder 33 and driven by a segment buffer, similar to the manner by which the $S_a$–$S_g$ segments are actuated. Of course, driving the $S_p$ segments from a digit buffer 12 requires that at least two digit latches 11 be set at the same time. This may be accomplished by first setting one of the digit latches 11 using an address in Y register 76 and then setting another digit latch 11 using another address in Y register 76 before resetting the first latch 11 with the $\overline{\text{RSTR}}$ command.

Referring now to FIG. 5, there is shown the five bit Latched Accumulator Register LAR 10 comprising stages 10-1 through 10-16. Only one of these five stages, 10-1, is shown in detail inasmuch as the other stages are identical thereto. As can be seen, register 10 is responsive to a decoded $\overline{\text{TD0}}$ command for loading the contents thereof from the four bits in accumulator 77 and one bit from status latch 104.

Figure 6:
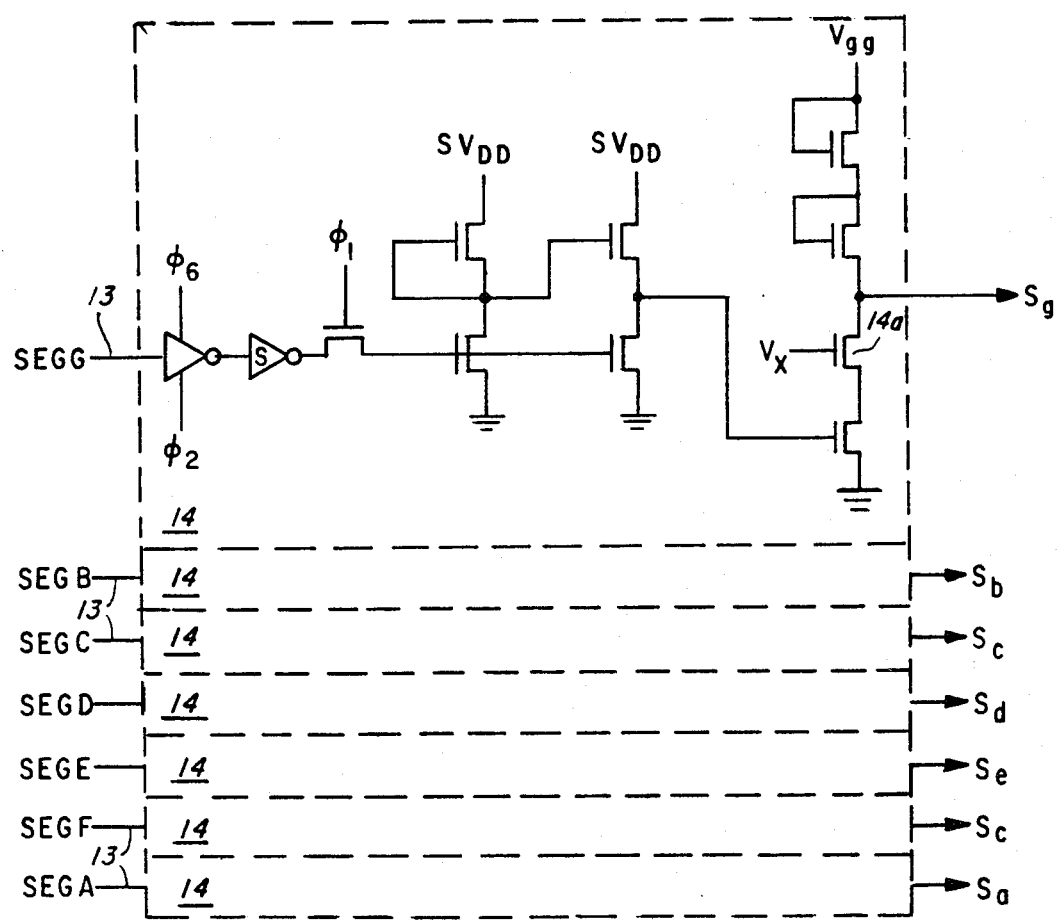
FIG. 6 is a logic diagram of the segment buffer circuits.
Figure 8:
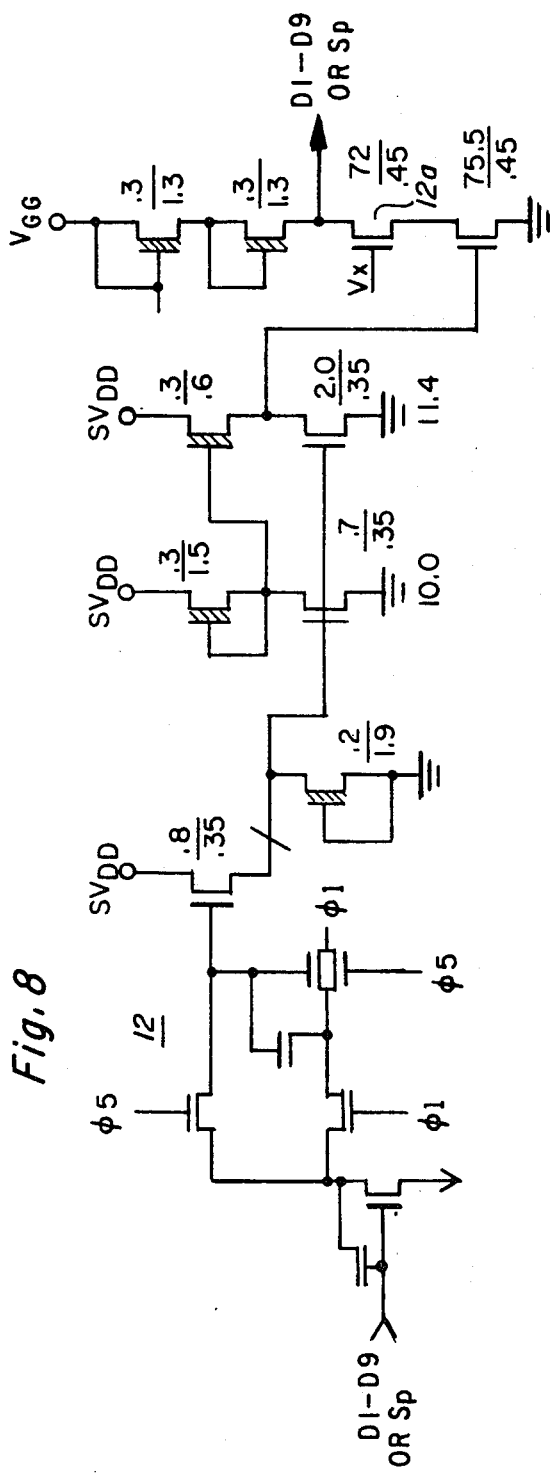
FIG. 8 is a logic diagram of the two digit buffer circuits.

In FIG. 6, there is shown the seven aforementioned segment buffers 14. Each of the $SV_{DD}$ voltages refers to a switched $V_{DD}$ provided by an integrated on/off switch if used. Otherwise each of these voltages may refer to a normal $V_{DD}$ found in typical MOS chips. Device 14a which is coupled to a voltage $V_x$, is normally turned on by voltage $V_x$ and thus is used merely for voltage protection purposes. In FIG. 7 there are shown the digit latches 11 in greater detail. As aforementioned, the digit latches are addressed by lines 32 from RAM Word Address and Segment Decoder 33 and are selectively set and reset by the $\overline{\text{SETR}}$ and $\overline{\text{RSTR}}$ commands. Each of the digit latches 11 (as well as latch 11a) are identical so only one is shown in detail in FIG. 7. Lines 32-0 through 32-8 determine which latch 11 is to be set to provide the digit actuation signals for the D9 through D1 digits in display 4, respectively. Line 32-9 permits the latch corresponding to segment $S_p$ of display 4 to be set by a $\overline{\text{SETR}}$ signal, as aforementioned. Line 32-15 is coupled to a latch 11a, which is identical to the digit latches 11; however, latch 11a is not coupled to a digit buffer 12, as are latches 11. Rather, latch 11a may be latched by the program in the ROM to provide an R15 command which, as will be seen, is used in generating a filament voltage for display 4. In FIG. 8, one of the digit buffers 12 is shown in detail. Each of the ten digit buffers utilized in this embodiment are identical and therefore only one digit buffer 12 is depicted in FIG. 8. V is the $V_{bias}$ voltage provided by the voltage tripler circuit; the $V_x$ voltage keeps device 12a on.

Figure 9:
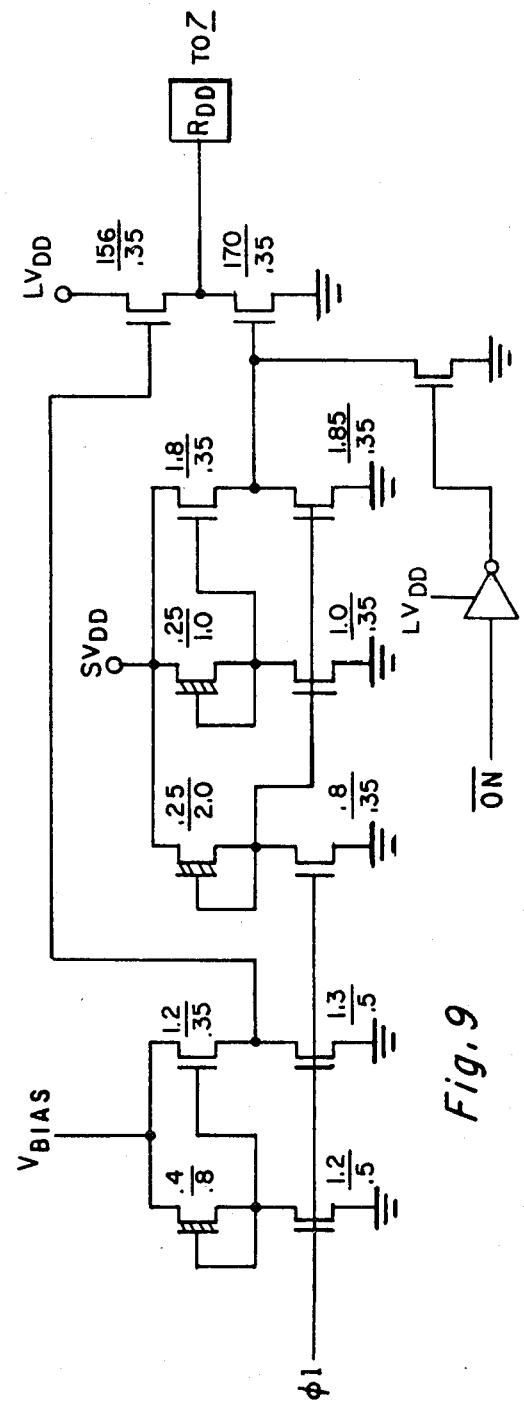
FIG. 9 is a logic diagram of a circuit used to drive the voltage tripler of FIG. 2.
Figure 10:
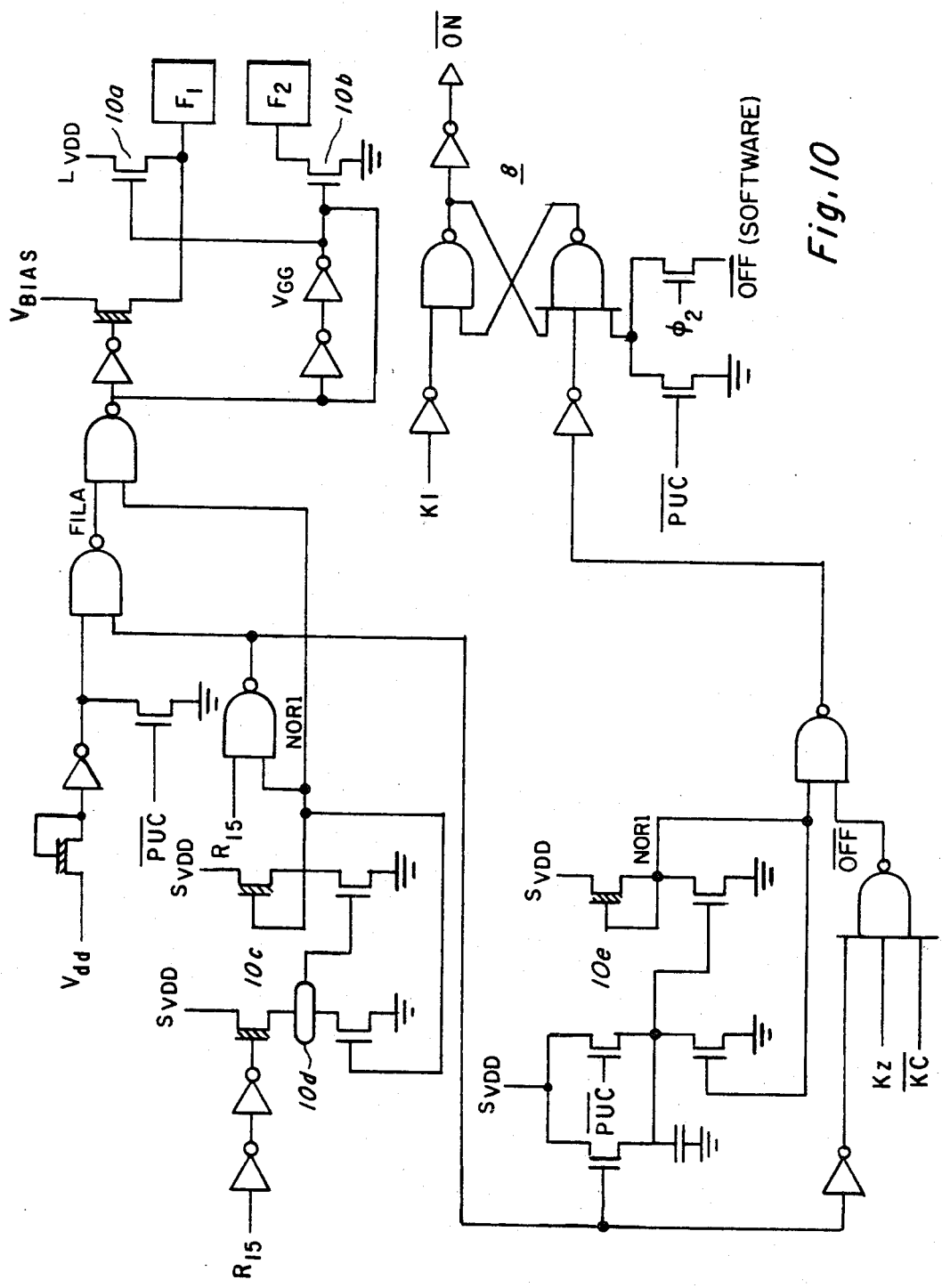
FIG. 10 is a logic diagram of a circuit used to drive the filament of a vacuum fluorescent display device.

Referring now to FIG. 9, there is shown the circuit for driving the voltage tripler circuit 7 in FIG. 2. The $LV_{DD}$ voltage refers to a "live $V_{DD}$" voltage, that is a $V_{DD}$ which is not controlled by the integrated switch but rather is directly coupled to the negative terminal of battery 6. Referring briefly to FIG. 10 there is shown the circuit for driving the filament of display 4 as well as a latch 8 used to control an integrated on/off switch (not shown). The filaments are connected directly across the nine volt battery 6 via devices 10a and 10b whenever latch 11a, i.e., signals R15 is set. Timer circuit 10c acts to turn off the filament should the R15 signal, which is of course controlled by the program stored in the read-only-memory, occur for too long a period of time (because having nine volts coupled across the low voltage filament in display 4 for a long enough period of time will damage such filament). Normally, latch 11a is set under control of the program in the ROM of integrated circuit 5 approximately a third of the time display 4 is displaying information. In time 10c is a P diffusion 10d, which due to its size, requires approximately 100 microseconds to charge or discharge. Time 10c assures that the filament is not connected across battery 6 for longer than 100 microseconds each time the R15 signal is generated. Another timer circuit 10e is provided for turning the learning aid off should the R15 command fail to come up for an extended period of time. The integrated on/off switch controlled by latch 8 is shown in U.S. Pat. No. 4,089,062 and therefore is not depicted here.

DISPLAY PRESENTATIONS

It has been previously mentioned that several types of different display presentations, heretofore referred to as type A, B, C and D display presentations, are presented at various times during the operation of the learning aid. These display presentations are preferably initiated at the same display 4 at which the problems posed by the learning aid are presented. Generally, a type D presentation is initiated whenever the operator proposes the solution to a problem which is incorrect or enters a number in the number guesser or force out game modes which violate the rules of the game. A type C presentation is generated for correct proposed solutions to individual problems or for guesses in a game which comply with the rules of the game. During operation of the learning aid in a game mode, a type A presentation is generally shown at the end of the game. For instance, in the wipe out game mode, the learning aid presents a type A presentation when the counter reaches its randomly preselected count (so that the operator then holding the learning aid knows to drop out of the game).

Generally, in the modes for which the operator is asked to solve an arithmetic problem, such as the User Entry Mode, Memory Bank Mode, and Box Problem Mode, type A, B, C, or D presentations are selectively generated at a conclusion of a set of arithmetic problems. A type A presentation is generated if the operator answered all the problems correctly on the first try while the B, C, and D type presentations are respectively generated if one, two and three or more errors are made in a set of problems. The type A, B, and C presentations as will be seen, occur as preselected, fanciful sequences of segments being actuated in the different positions of the display, the complexity and length of time to complete the presentation decreasing as the number of errors increases. That is, the complexity and length of time of the presentation is (1) less for the type C presentation than the type B presentation and (2) less for the type B presentation than the type A presentation. Also, as will be seen, the type D presentation is a preselected but unordered sequence of segments being actuated in the various segment positions, such that the actuation of the segments in dipslay 4 would appear to the casual observer to be randomly generated. The patterns of actuated segments for these presentations are discussed in Table IV.

The learning aid gives the operator a positive reinforcement for a correct answer or proper response in a game by giving a type C presentation while indicating erroneous solutions or responses by initiating the type D presentation. Then upon completing a set of problems, the learning aid responds by initiating a display presentation whose complexity and duration are a function of the number of erroneous solutions entered by the operator to the set of posed problems. Thus, an operator who answers all problems correctly is "rewarded" with a type A presentation, but an operator who misses one problem receives only a type B presentation, and so forth. The operator, it is felt, will seek to receive the type A presentation and thereby improve his or her abilities with mathematics.

It should be evident to those skilled in the art, furthermore, that in addition to making the type of display presentation initiated a function of the number of errors in a set of problems that the type of presentation presented could be made also a function of the length of time required to solve the set of problems inasmuch as the learning aid disclosed herein includes a timer mechanism. That is for instance, a type A presentation might be initiated only in (1) all the problems in a set of problems are answered correctly and (2) the elapsed time counter incremented to a value no greater than some preselected value, say 30 for instance. As a matter of design choice, the learning aid disclosed herein does not use the contents of the elapsed time counter in determining the type of display perstantion to be initiated upon the completion of a set of problems.

In Table IV the various display presentations are explained. It should be appreciated that these presentations occur rather quickly, having a duration of approximately one second for a type C presentation and approximatley five seconds for a type A presentation. Further, while the A and B type presentations are broken down into a series of steps, a following step may be initiated before a prior step is completed, if desired. Further, the order, number and content of the various steps may be altered as desired for it should be evident to those skilled in the art that many, many different sequences of segment actuation may be substituted for those selected for the disclosed embodiment of the learning aid. Also, this technique of using the segments of the display (which are used to present the problems) to also prevent a selected display presentation may be used with learning aids teaching material other than arithmetic. For instance, this technique could also be used with learning aids teaching word based problems rather than number based problems.

I have described by invention in connection with certain specific embodiments thereof. It is to be understood that modifications may now suggest themselves to those skilled in the art and that this invention is not limited to the specific embodiment disclosed, except as set forth in the appended claims.

TABLE I-0

| PC | LOC | INSTR. | BRLN. | LINE | NAME | TITLE | COMMENTS | |
|---|---|---|---|---|---|---|---|---|
| | | | | | | | SOURCE STATEMENT | |
| 0000 | 0000 | 0010 0101 | | 0029 | SCAN | TCY | 10 | |
| 0001 | 0001 | 0100 1001 | | 0030 | | TMA | | |
| 0003 | 0003 | 0110 1001 | | 0031 | | ALEC | | |
| 0007 | 0007 | 0111 1110 | | 0032 | | BRANCH | 9 | IF B10 L.E. 9 |
| 001F | 001F | 0111 0101 | 0038 | 0033 | SCAN1 | LDP | SCAN2 | |
| 003F | 003F | 1101 1000 | | 0034 | | ALEC | 6 | |
| 007F | 007F | 0111 1110 | 0855 | 0035 | | BRANCH | 10 | IF B10 = 10 |
| 007D | 007D | 1011 0011 | 1209 | 0036 | | BL | SCORE | IF B10 G.T. 10 |
| 007A | 007A | 0010 0101 | | 0037 | | TCY | BLOWUP | |
| 0076 | 0076 | 0010 0001 | | 0038 | SCAN2 | TBIT | 9 | |
| 006E | 006E | 0000 1111 | 0033 | 0039 | | BRANCH | SCAN1 | |
| 005E | 005E | 1000 0000 | | 0040 | | CLA | CLEAR NOSCAN,KEYUP,KEYDN | |
| 003E | 003E | 0000 0110 | | 0041 | | LDX | TIME | |
| 007C | 007C | 0100 0010 | | 0042 | | TCY | 14 | |
| 0079 | 0079 | 0011 0010 | | 0043 | | TCMIY | 0 | LOAD 5 MIN TIME OUT |
| 0072 | 0072 | 0011 1110 | | 0044 | | TCMIY | 7 | |
| 0068 | 0068 | 0000 1110 | 0049 | 0045 | | BRANCH | GOSCAN | |
| 004E | 004E | 1000 0000 | | 0046 | | CLA | | |
| 001E | 001E | 0011 0000 | | 0047 | | ACACC | 8 | CLEAR KEYUP,KEYDN, SET NOSCAN |
| 003C | 003C | 0000 1000 | | 0048 | | LDX | 4 | |
| 0078 | 0078 | 0100 0001 | | 0049 | | TCY | KEYUP | |
| 0075 | 0075 | 0010 0011 | | 0050 | | TAM | | |
| 006A | 006A | 0100 0101 | | 0051 | SCANH | TCY | 15 | SAVE KEY FLAGS |
| 0056 | 0056 | 0010 0001 | | 0052 | | TMY | | |
| 002E | 002E | 0101 1100 | | 0053 | | RSTR | | |
| 005C | 005C | 0010 0111 | | 0054 | | TCY | 15 | |
| 0039 | 0039 | 0010 1010 | | 0055 | | SETR | | |
| 0070 | 0070 | 0011 1101 | | 0056 | | TCMIY | 8 | HEAT FILAMENT |
| 0061 | 0061 | 0010 0001 | | 0057 | | TCY | KEYUP | |
| 0042 | 0042 | 0010 0011 | | 0058 | | TBIT | 3 | |
| 0006 | 0006 | 0000 1101 | | 0059 | | BRANCH | NOSCNH | |
| 000C | 000C | 1001 0001 | | 0060 | | BL | RANS | |
| 001B | 001B | 0010 0111 | | 0061 | NOSCNH | TCY | | |
| 0037 | 0037 | 0010 1010 | | 0062 | | TYA | 4 | |
| 006F | 006F | 0001 0100 | 1254 | 0063 | | DYN | | |
| 005D | 005D | 0000 1110 | | 0064 | | BRANCH | HDELAY | HEATER DELAY LOOP |
| 003A | 003A | 1010 1100 | 0065 | 0065 | HDELAY | ACACC | 15 | |
| 0074 | 0074 | 1011 1110 | | 0066 | | | | |
| 0067 | 0067 | 0011 1111 | | 0067 | | | | |

TABLE I-0 (cont)

| | | | | | | |
|---|---|---|---|---|---|---|
| 0074 | 0069 | 10110110 | 0065 | | BRANCH | HDELAY | |
| 0060 | 0052 | 01010000 | | | LDX | A | |
| 0053 | 0026 | 00100001 | | | TCY | 8 | |
| 0026 | 004C | 00001001 | | | TMA | | GET TIMER DATA WORD |
| 0019 | 0019 | 01001111 | | | LDX | H | |
| 0018 | 0030 | 00101111 | | | TCY | 15 | |
| 0031 | 0063 | 00100110 | | | RSTR | | CLEAR HEATER |
| 0062 | 0045 | 00100001 | | | TCY | 8 | ADDRESS TIMER STATUS LATCH |
| 0045 | 000A | 10100000 | | | BRANCH | SCAN1A | |
| 000A | 0014 | 00100101 | 0084 | SCAN2 | IYC | | |
| 0015 | 002B | 00110110 | | | RSTR | | CLEAR OLD DIGIT LINE |
| 002B | 0057 | 10001011 | 0089 | | BRANCH | DIGOUT | |
| 0056 | 0020 | 00101011 | | SCAN1 | TAM | | SAVE NEW R LINE |
| 002C | 0058 | 00101000 | | | TAY | | |
| 0058 | 0031 | 00101010 | | | TMA | | GET NEW DATA |
| 0030 | 0060 | 01001001 | | | LDX | H | |
| 0060 | 0041 | 00110011 | | | TBIT1 | ? | STATUS LATCH ? |
| 0041 | 0002 | 10001010 | 0077 | SCAN1A | BRANCH | SCAN2 | YES BRANCH |
| 0002 | 0004 | 00100101 | | | IYC | | |
| 0005 | 000B | 00110110 | | SCAN3 | RSTR | | CLEAR OLD DIGIT LINE |
| 000B | 0017 | 00101110 | | | ACACC | 0 | |
| 0017 | 002F | 01110000 | | DIGOUT | TDO | | OUTPUT NEW DIGIT |
| 002F | 005F | 01011010 | | | DYN | | |
| 005E | 003D | 00000101 | 0097 | | SETR | 0 | SET NEW DIGIT LINE |
| 003C | 007A | 00000100 | | | TBIT | 0 | H SEGMENT ? |
| 007A | 0078 | 00000000 | | | BRANCH | SCAN3A | |
| 0078 | 0071 | 10000110 | 0100 | | TCY | 9 | |
| 0071 | 0062 | 00101001 | | | RSTR | | CLEAR H SEGMENT |
| 0062 | 0046 | 00110110 | | | BRANCH | SCAN3B | |
| 0046 | 000F | 10100111 | | SCAN3A | TCY | 9 | |
| 0047 | 001C | 00101001 | 0100 | | SETR | 0 | SET H SEGMENT |
| 001D | 003A | 00000101 | | SCAN3B | BRANCH | SCAN3 | |
| 003A | 0077 | 10111100 | 0117 | | LDX | A | |
| 0076 | 005A | 01010000 | 0105 | | TCY | .KEYUP | |
| 005D | 0036 | 00001110 | | SCAN5 | KNEZ | | KEY DOWN ? |
| 0036 | 006C | 10001100 | | | BRANCH | KEYDN | YES BRANCH |
| 006C | 0059 | 10101011 | | | BRANCH | SCAN5 | |
| 0059 | 0032 | 00100111 | | | TCY | 15 | |
| 0032 | 0064 | 01011010 | | | DMAN | | DECREMENT R LINE |
| 0064 | 0059 | 10101010 | 0080 | | BRANCH | SCAN1 | NOT RO BRANCH |

TABLE I-0 (cont)

| | | | | | | |
|---|---|---|---|---|---|---|
| 0049 | 0012 | 001001101 | | 0108 | | TCY KEYUP |
| 0012 | 0024 | 000100010 | | 0109 | | TBIT 1 |
| 0025 | 004P | 100010100 | 0112 | 0110 | | BRANCH SCAN6 |
| 0004 | 0015 | 010101001 | | 0111 | | SBIT 2 |
| 0014 | 002B | 010100110 | | 0112 | | RBIT 1 |
| 0029 | 0053 | 001000010 | | 0113 | | TCY 0 |
| 0052 | 0025 | 000000000 | | 0114 | | RSTR |
| 0024 | 004A | 001110010 | | 0115 | | RETN |
| 0048 | 0011 | 100101111 | 0055 | 0116 | | BRANCH NOSCAN FXIT |
| 0010 | 0020 | 000100011 | | 0117 | SCAN6 | TBIT 3 |
| 0021 | 0043 | 101011001 | 0105 | 0118 | | BRANCH SCAN5 |
| 0042 | 0005 | 010100010 | | 0119 | | SBIT 1 |
| 0004 | 0008 | 000100001 | | 0120 | | TBIT 2 |
| 0009 | 0013 | 100100111 | 0123 | 0121 | | BRANCH KEYDN1 |
| 0013 | 0027 | 101011001 | 0105 | 0122 | | BRANCH SCAN5 |
| 0027 | 004F | 001001101 | | 0123 | KEYDN | TCY 11 |
| 0040 | 001D | 000010111 | | 0124 | | TKA |
| 001C | 003A | 000101111 | | 0125 | | TCY 15 |
| 0039 | 0073 | 000101010 | | 0126 | | THY |
| 0072 | 0065 | 000110110 | | 0127 | | RSTR |
| 0065 | 004A | 001001111 | | 0128 | | TCY 15 |
| 004B | 0016 | 001010111 | | 0129 | | TYA |
| 0016 | 002C | 000000100 | | 0130 | DELAY | DYN |
| 002D | 005A | 100010110 | 0130 | 0131 | | BRANCH DELAY |
| 005A | 0035 | 001111111 | | 0132 | | ACACC 15 |
| 0034 | 0068 | 100010110 | 0130 | 0133 | | BRANCH DELAY |
| 0068 | 0051 | 000101010 | | 0134 | | THY |
| 0051 | 0022 | 000110101 | | 0135 | | SETR |
| 0022 | 0044 | 001001101 | | 0136 | | TCY 11 |
| 0044 | 0009 | 000010000 | | 0137 | | TKA |
| 0009 | 0010 | 001001001 | | 0138 | | YNEA |
| 0010 | 0023 | 101101111 | 0001 | 0139 | | BRANCH SCAN |
| 0023 | 0047 | 011100000 | | 0140 | | ALEC 0 |
| 0046 | 000D | 101101111 | 0001 | 0141 | | BRANCH SCAN |
| 000D | 001A | 001001111 | | 0142 | | TCY 15 |
| 0019 | 0033 | 000000011 | | 0143 | | YMA |
| 0033 | 0067 | 011101010 | | 0144 | | ALEC 5 |
| 0066 | 004D | 100010101 | 0105 | 0145 | | BRANCH KD1 |
| 004D | 0014 | 001101101 | | 0146 | | CLA |
| 0014 | 003U | 000111010 | | 0147 | | ACACC 5 |

KEY DOWN FLAG ?

IF NOT, SET KEYUP FLAG
CLEAR KEY DOWN FLAG

CLEAR R0
NOSCAN FXIT

NOSCAN FLAG ?
YES BRANCH
SET KEY DOWN FLAG
KEYS UP FLAG ?

NO BRANCH

SAVE KEYS

KEY DELAY LOOP

RE-READ KEYS
SAME ?
NO BRANCH
NON ZERO ?
NO BRANCH

GET R LINE
FORCE L.F. 5

TABLE I-0 (cont)

| | | | | | |
|---|---|---|---|---|---|
| 0035 | 00000011 | 014A | | XMA | RSTR | RESTORE P LINE |
| 0064 | 00000101 | 0149 | RSTSG1 | TCY | 15 | CLEAR ALL R LINES |
| 002A | 00001101 | 0150 | | JYC | RSTSG1 | BEFORE RE-CHECKING K INPUTS |
| 0054 | 10110100 | 0152 | | BRANCH | | |
| 0022 | 01001000 | 0153 | | LDP | 1 | |
| 0050 | 00001000 | 0154 | | KNEZ | | TO SEE IF A VSS KEY IS DEPRESSED |
| 0021 | 00000110 | 0155 | | BRANCH | VSSSEG | |
| 0020 | 10000000 | 0156 | | BRANCH | FNDKEY | |
| 0040 | 10000001 | | | | | |

TABLE I-1

SOURCE STATEMENT

| PC | LOC | INSTR. | BRLN. | LINE | NAME | TITLE | COMMENTS |
|---|---|---|---|---|---|---|---|
| 0000 | 0080 | 00110101 | | 0158 | VSSSEG | TCMIY | 5 |
| 0001 | 0083 | 00100111 | | 0159 | FNDKEY | TCY | 15 |
| 0003 | 0087 | 01110010 | | 0160 | | ALEC | 1 | A15 = DIGIT NO. |
| 0007 | 008F | 10101010 | 0209 | 0161 | | BRANCH | OPRKEY | OPRKEY OR CLR ? |
| 000F | 009F | 00010001 | | 0162 | | TBIT | 2 | YES |
| 001F | 00BF | 10010111 | 0252 | 0163 | | BRANCH | TOPKEY | DIGIT 4 OR 5 ? |
| 003F | 00FF | 00011011 | | 0164 | | MNEZ | | YES |
| 007F | 00FE | 10011110 | 0172 | 0165 | | BRANCH | NUMKEY | DIGIT 0 ? |
| 007E | 00FD | 00110001 | | 0166 | | ACACC | 8 | NO |
| 007D | 00FA | 10000100 | 0267 | 0167 | | BRANCH | GOKEY | |
| 0078 | 00F6 | 00110010 | | 0168 | | ACACC | 4 | |
| 0077 | 00EE | 10011100 | 0186 | 0169 | | BRANCH | ZROKEY | |
| 006F | 00DE | 01000100 | | 0170 | | BL | MEMBNK | |
| 005F | 00BE | 10000101 | 0345 | 0171 | | | | |
| 003E | 00FC | 00110001 | | 0172 | NUMKEY | ACACC | 8 | 1-9 KEYS |
| 007C | 00F9 | 10100111 | 0177 | 0173 | | BRANCH | KEYDIG | |
| 0079 | 00F2 | 00110010 | | 0174 | | ACACC | 5 | |
| 0073 | 00E6 | 10100111 | 0177 | 0175 | | BRANCH | KEYDIG | |
| 0067 | 00CE | 00110100 | | 0176 | | ACACC | 3 | |
| 004F | 009E | 00000011 | | 0177 | KEYDIG | XMA | | |
| 001E | 00BC | 01110000 | | 0178 | | ALEC | 1 | |
| 003D | 00FB | 10010110 | 0184 | 0179 | | BRANCH | NUMKY2 | |
| 007A | 00F5 | 01110010 | | 0180 | | ALEC | 2 | |
| 0075 | 00EA | 10101111 | 0183 | 0181 | | BRANCH | NUMKY1 | |

TABLE I-1 (cont)

| | | | | | | |
|---|---|---|---|---|---|---|
| 006B | 00D6 | 0182 | | ACACC | 2 | |
| 0057 | 00AE | 0183 | | ACACC | 2 | |
| 002E | 00DC | 0184 | NUMKY1 | AMAAC | | |
| 005C | 0089 | 0185 | NUMKY2 | TAM | | |
| 0038 | 00F0 | 0186 | | TCY | MODE | NO. KEY TO A15 |
| 0070 | 00E1 | 0187 | | TRIT | USER | NUMBER KEY IN A15, CHECK MODE |
| 0061 | 00C2 | 0188 | | BRANCH | USERPB | |
| 0043 | 0086 | 0189 | ZROKEY | LDP | 14 | |
| 0006 | 008C | 0190 0198 | | TRIT | 1 | |
| 000D | 0098 | 0191 | | BRANCH | GAMESDIG | |
| 001B | 0087 | 0192 1875 | | LDP | 5 | |
| 0037 | 00EF | 0193 | | TRIT | 3 | |
| 006E | 00DD | 0194 0742 | | BRANCH | ELCNUM | |
| 005D | 00BA | 0195 | | TRIT | 2 | |
| 003A | 00F4 | 0196 0673 | | BRANCH | BOXNUM | |
| 0074 | 00E9 | 0197 0684 | | BRANCH | BLUPNM | |
| 0069 | 00D2 | 0198 | USERPB | TCY | 12 | |
| 0053 | 00A6 | 0199 | | LDP | 2 | |
| 0026 | 00CC | 0200 | | TRIT | 2 | TEST CLR OR PROB PIN FLG |
| 004C | 0099 | 0201 | | BRANCH | NEWENT | |
| 0018 | 00B0 | 0202 | | TCY | 13 | |
| 0031 | 00E3 | 0203 0287 | | TRIT | 2 | 2ND OPRD ? |
| 0062 | 00C5 | 0204 | | TRIT | SFCOPR | YES |
| 0045 | 00BA | 0205 0306 | | TRIT | 3 | 1ST OPRD ? |
| 000A | 0094 | 0206 0294 | | BRANCH | INSFST | YES |
| 0015 | 00BB | 0207 | | BL | CHKANS | |
| 002B | 0046 | 0208 1324 | | | | |
| 0056 | 0007 | 0209 | OPRKEY | TMA | | |
| 002C | 00AD | 0210 | | ALEC | 4 | |
| 0058 | 00DB | 0211 | | BPANCH | OPRKY | |
| 0030 | 0041 | 0212 0214 | | BL | CLRFGA | M5 IS CLR KEY |
| 0060 | 00F0 | 0213 | | | | |
| 0041 | 00C1 | 0214 1969 | OPRKY | TCY | MODE | |
| 0302 | 00A2 | 0215 | | TRIT | USER | |
| 0005 | 0044 | 0216 | | BPANCH | OPRUSE | |
| 0008 | 00A3 | 0217 0222 | | MNEZ | | |
| 0017 | 0097 | 0218 0220 | | BRANCH | OPRKYOTH | |
| 002F | 002F | 0219 0250 | | BRANCH | DISPLAY | |
| 005E | 00C0 | 0220 | OPRKYOTH | BRANCH | OPKOTH | |
| 003C | 00FB | 0221 0602 | OPRKYOTH | BL | | WIPE OUT NO-OP |

TABLE I-1 (cont)

| | | | | | | Label | Op | Operand | Comment |
|---|---|---|---|---|---|---|---|---|---|
| 007A | 00F1 | 010100110 | | | 0222 | OPRUSE | RBIT | 1 | |
| 0071 | 00F2 | 011100000 | | | 0223 | | ALEC | 0 | |
| 0063 | 00CB | 101011001 | | | 0224 | | BRANCH | EQUAL | |
| 000E | 00CE | 001000011 | 0234 | | 0225 | | TCY | 12 | |
| 0010 | 00CB | 100000001 | | | 0226 | | TBIT | 2 | |
| 001D | 00F7 | 001000011 | | | 0227 | | BRANCH | DISPLAY | |
| 003B | 00FD | 001000011 | 0250 | | 0228 | | TCY | 13 | |
| 0076 | 00FD | 100000011 | | | 0229 | | TBIT | 3 | |
| 006D | 00D1 | 100110110 | | | 0230 | | BRANCH | OPRKY1 | |
| 005A | 00D5 | 001010011 | 0232 | | 0231 | | DISPLAY | | |
| 0036 | 00EC | 010001111 | 0250 | | 0232 | | BRANCH | OPRKY2 | |
| 006C | 00D9 | 101000110 | 2081 | | 0233 | OPRKY1 | BL | | |
| 0050 | 00D2 | 001001011 | | | 0234 | EQUAL | TCY | 13 | |
| 0032 | 00D4 | 000010001 | | | 0235 | | TBIT | 3 | |
| 0060 | 00D9 | 100000001 | | | 0236 | | BRANCH | DISPLAY | |
| 0064 | 00C2 | 001000011 | 0250 | | 0237 | | TCY | 12 | |
| 0049 | 00C0 | 100000001 | | | 0238 | | TBIT | 2 | |
| 0012 | 00CC | 001000011 | | | 0239 | | BRANCH | DISPLAY | |
| 0025 | 00C5 | 100001001 | 0250 | | 0240 | | TCY | 4 | |
| 0014 | 00C6 | 001010010 | | | 0241 | | IMAC | | |
| 0029 | 00D3 | 000110001 | | | 0242 | | BRANCH | DISPLAY | |
| 0052 | 00D5 | 001001011 | 0250 | | 0243 | EQUALS | TCY | 13 | |
| 0024 | 00C8 | 010100101 | | | 0244 | | RBIT | 2 | |
| 0048 | 00C1 | 010100010 | | | 0245 | | SBIT | 1 | |
| 0010 | 0040 | 010011110 | | | 0246 | SETEQ | LDX | H | |
| 0021 | 00C3 | 001000010 | | | 0247 | | TCY | 4 | |
| 0042 | 00C5 | 010100010 | | | 0248 | | SBIT | 0 | |
| 0004 | 0083 | 001011111 | | | 0249 | | RETN | | |
| 0009 | 0093 | 010100000 | 0041 | | 0250 | DISPLAY | BL | SCAN | |
| 0013 | 0047 | 101011111 | | | 0251 | TOPKEY | LDP | 15 | |
| 0027 | 00CF | 100001111 | | | 0252 | | TBIT | 0 | H5 ? |
| 004E | 00CD | 000100000 | 2008 | | 0253 | | BRANCH | VSSKEY | YES |
| 001C | 00AB | 001110100 | | | 0254 | | TCY | 12 | |
| 0039 | 00F3 | 001100011 | | | 0255 | | RBIT | 1 | CLEAR TIMER FLAG |
| 0072 | 00E5 | 010100110 | | | 0256 | | TCY | MODE | SET GAMES FLG |
| 0065 | 00CA | 001000111 | | | 0257 | | TCMIY | 2 | |
| 0049 | 0096 | 001000100 | | | 0258 | | LDP | 14 | |
| 0016 | 00AC | 010000111 | | | 0259 | | ALEC | 2 | |
| 0020 | 00D4 | 011100100 | | | 0260 | | BRANCH | FORCEOUT | |
| 005A | 0085 | 100000000 | 1840 | | 0261 | | | | |

TABLE I-1 (cont)

| | | | | | |
|---|---|---|---|---|---|
| 0034 | 00EA | 010001101 | | LDP | 11 |
| 0068 | 00D1 | 011100010 | | ALEC | 4 |
| 0051 | 0042 | 100000000 | 1452 | BRANCH | NUMGUESS |
| 0022 | 00C4 | 010001111 | | BL | BLIPKY |
| 0044 | 0089 | 100010110 | 2070 | | |
| 0008 | 0090 | 001000011 | | GOKEY | TCY 12 |
| 0011 | 0043 | 010100010 | | | SBIT 1 |
| 0023 | 00C7 | 061000111 | | | TCY MODE |
| 0046 | 00E0 | 000100000 | | | TBIT 0 |
| 000C | 009A | 101010000 | | | BRANCH USERGO |
| 0019 | 00B3 | 001001011 | | | TCY 13 |
| 0033 | 00E7 | 001100100 | | | TCMIY 2 |
| 0066 | 00CD | 000100010 | | | TBIT 1 |
| 004D | 009A | 100001001 | 0250 | | BRANCH DISPLAY |
| 0014 | 00A8 | 010001010 | | | LDP 5 |
| 0035 | 00EA | 000100011 | | | TBIT 3 |
| 0068 | 00D5 | 101001111 | 0692 | | BRANCH ELCGO |
| 0055 | 004A | 001100010 | | | TBIT 2 |
| 0024 | 00D0 | 101001001 | 0752 | | BRANCH BOXGO |
| 0054 | 0049 | 010000010 | | | BL BLUPGO |
| 0028 | 00D0 | 100100111 | 0634 | | |
| 0050 | 00A1 | 010001010 | | USERGO | LDP 12 |
| 0020 | 00C0 | 010100011 | | | SBIT 1 |
| 0040 | 0081 | 100001000 | 1640 | | BRANCH MEMGO |

TABLE I-2

| PC | LOC | INSTR. | BRLN. | LINE | NAME | TITLE | COMMENTS |
|---|---|---|---|---|---|---|---|
| 0000 | 0100 | 001100000 | | 0287 | NEWENT | TCMIY 0 | CLEAR TIMER, PROB FIN FLAG |
| 0001 | 0103 | 010001111 | | 0288 | | CALLL CLCOM | |
| 0003 | 0107 | 110000001 | | 0289 | | | |
| 0007 | 010F | 010001111 | | 0290 | | CALLL BLANKD | |
| 000F | 011F | 111111011 | | 0291 | | | |
| 001F | 013F | 001001011 | | 0292 | | TCY 13 | SET 1ST OPRD FLG |
| 003F | 017F | 001100001 | | 0293 | | TCMIY 8 | |
| 007F | 017E | 001001000 | | 0294 | INSFST | TCY 1 | 1ST OPRD |
| 007E | 017D | 000000011 | | 0295 | INSNUM | XMA | |
| 007D | 017A | 000000100 | | 0296 | | DYN | |
| 0078 | 0176 | 000000011 | | 0297 | | XMA | |

TABLE I-2 (cont)

| | | | | | | | |
|---|---|---|---|---|---|---|---|
| 0077 | 016F | 011101001 | | | | ALEC | 9 |
| 006F | 015E | 100110000 | | | | BRANCH | REVERS |
| 005F | 013E | 000110011 | 0341 | | | MNEZ | |
| 003E | 017C | 101111001 | | | | BRANCH | INSNM1 |
| 007C | 0179 | 000101111 | | | | TAM | |
| 0079 | 0172 | 010101111 | 0303 | INSNM1 | RETN | | |
| 0072 | 0166 | 010000000 | | | | BL | |
| 0067 | 014E | 101101111 | | | | SCAN | |
| 004E | 011E | 001100010 | 0041 | SECOPR | TCMIY | 4 | CLEAR 1ST OPR, MEM FLAG & SET 2ND OPR |
| 001E | 013C | 001000010 | | | TCY | | |
| 003C | 0178 | 111111110 | 0295 | START | CALL | INSNUM | |
| 007A | 0175 | 001000010 | | START1 | TCY | 4 | |
| 0075 | 016A | 010010000 | | | LDX | A | |
| 006A | 0156 | 000110010 | | | IMAC | | |
| 0056 | 012E | 100000110 | 0319 | | BRANCH | START3 | 2ND OPRD TO DAM |
| 002E | 015C | 010010010 | | | TMA | | |
| 005C | 0139 | 010010001 | | | LDX | DAM | |
| 0039 | 0170 | 011111011 | | | YMCY | 13 | |
| 0070 | 0161 | 000101101 | | | TAMIYC | | |
| 0061 | 0142 | 000101010 | | | YNEC | 2 | |
| 0042 | 0106 | 101011001 | | | BRANCH | START1 | |
| 0006 | 010C | 010010000 | | | LDX | DAM | |
| 000C | 011A | 011110001 | | | YMCY | 13 | |
| 001A | 0137 | 011110011 | | | CLA | | |
| 0037 | 016F | 000101111 | | | TAMDYN | | |
| 006F | 015D | 100110111 | 0322 | START4 | BRANCH | START5 | |
| 005D | 013A | 010101111 | | START5 | RETN | | |
| 003A | 0174 | 001100010 | | START8 | TCY | 1 | 1ST OPRD TO REG B |
| 0074 | 0169 | 010010000 | | START6 | LDX | A | |
| 0069 | 0152 | 100000010 | | | IMAC | | |
| 0052 | 0126 | 100001010 | 0335 | | BRANCH | START7 | |
| 0026 | 014C | 000101010 | | | TMA | | |
| 004C | 0119 | 010010000 | | | LDX | B | |
| 0018 | 0130 | 010000101 | | | IYC | | |
| 0031 | 0163 | 000101100 | | | TAMDYN | | |
| 0063 | 0145 | 000000100 | | | DYN | | |
| 0045 | 010A | 101110100 | 0326 | START7 | BRANCH | START6 | |
| 000A | 0114 | 010010010 | | | LDX | R | |
| 0015 | 0128 | 000011000 | | | IYC | | |
| 0028 | 0157 | 000000101 | | | RETN | | |
| 0056 | 012D | 110011011 | 0321 | | CALL | START4 | |

TABLE I-2 (cont)

| | | | | | | |
|---|---|---|---|---|---|---|
| 002C | 015A | 01000110C | | 0330 | | BL | START9 |
| 0058 | 0131 | 10110110 | | 0340 | | XMA | |
| 0030 | 0160 | 00000011 | | 0341 | REVERS | IYC | |
| 0060 | 0141 | 00000101 | | 0342 | | XPA | |
| 0041 | 0102 | 00000011 | 0452 | 0343 | | BRANCH | INSNM1 |
| 0002 | 0104 | 10111001 | | 0344 | | TCY | 4 |
| 0005 | 0108 | 00111001 | | 0345 | | IMAC | |
| 0008 | 0117 | 00111010 | | 0346 | | BRANCH | INSNM1 |
| 0017 | 012F | 10111001 | 0303 | 0347 | MEMRNK | CALL | MEMCNT |
| 002F | 015F | 11111001 | | 0348 | | ACACC | 6 |
| 005E | 0130 | 00111110 | | 0349 | | ACACC | |
| 003C | 0178 | 10111001 | 0303 | 0350 | MEMK1 | BRANCH | INSNM1 |
| 0078 | 0171 | 11011001 | | 0351 | | LDX | 4 |
| 0071 | 0162 | 00100111 | | 0352 | | TCY | |
| 0063 | 0146 | 00010000 | | 0353 | | TRIT | MODE |
| 0047 | 010E | 10001111 | 0356 | 0354 | | BRANCH | 0 |
| 000E | 011C | 10101101 | 0303 | 0355 | | BRANCH | MEMBK1 |
| 001D | 013A | 01010011 | | 0356 | | SRIT | INSNM1 |
| 003A | 0177 | 00111001 | | 0357 | | TCY | 1 |
| 0076 | 016D | 00011001 | | 0358 | | TCMIY | :2 |
| 006D | 015A | 01011001 | | 0359 | | CONVB | 4 |
| 005A | 0136 | 11111001 | 0404 | 0360 | | CALL | DANTOR |
| 0036 | 016C | 11111100 | 0377 | 0361 | | CALL | MEMCNT |
| 006C | 0159 | 00011001 | | 0362 | | IMAC | |
| 0059 | 0132 | 00101010 | | 0363 | | TAM | |
| 0032 | 0164 | 01010010 | | 0364 | | LDX | E |
| 0064 | 0149 | 00010110 | | 0365 | | ACACC | 6 |
| 0049 | 0112 | 10101111 | 0404 | 0366 | MEMBK6 | BRANCH | DANTOP |
| 0012 | 0124 | 00111100 | | 0367 | | LDX | D |
| 0025 | 014B | 10101110 | | 0368 | | ACACC | 1 |
| 004A | 0115 | 10100110 | 0404 | 0369 | | BRANCH | DANTOP |
| 0014 | 012A | 00111101 | 0394 | 0370 | | ACACC | 1 |
| 0029 | 0153 | 10010001 | 0368 | 0371 | | BRANCH | MOV59 |
| 0052 | 0125 | 00111000 | | 0372 | | ACACC | 1 |
| 0024 | 0146 | 10001101 | | 0373 | | BRANCH | MOV10 |
| 0048 | 0111 | 01011010 | | 0374 | | RETN | |
| 0010 | 0120 | 01010010 | | 0375 | | LDX | F |
| 0021 | 0143 | 11010010 | 0368 | 0376 | | CALL | MEMBK6 |
| 0042 | 0105 | 01010100 | | 0377 | MEMCNT | LDX | C |
| 0004 | 0108 | 00100111 | | 0378 | | TCY | 15 |
| 0009 | 0113 | 00010101 | | 0379 | | TMA | |

USER ?
YES

MOVE TO REG #10

9TH

TABLE I-2 (cont)

| | | | | | | |
|---|---|---|---|---|---|---|
| 0013 | 0127 | 0101111111 | 0101001011 | | | RETN |
| 0027 | 014F | 0110111001 | 1001000000 | | | ACACC |
| 004E | 011D | 1001000001 | 1001001011 | 0313 | 0380 | BRANCH MEMRTN |
| 001C | 0138 | 1001001001 | 1001101011 | 0368 | 0381 | BRANCH MEMRK6 |
| 0039 | 0173 | 0010000010 | 0010100011 | | 0382 | TCY 4 |
| 0072 | 0165 | 0010011010 | 0001110011 | | 0383 | COMXB |
| 004B | 0144 | 0100110010 | 0011001011 | | 0384 | TMA |
| 0016 | 011B | 0101111001 | 0100100011 | | 0385 | YMCY MOV10 |
| 002D | 012C | 0110110010 | 0111111011 | | 0386 | COMXR MOV101 |
| 0054 | 015A | 0101010010 | 0100100011 | | 0387 | TAMDYN 9 |
| 0033 | 0135 | 0001111110 | 0100000011 | | 0388 | YPCY |
| 0068 | 0168 | 0010011010 | 0011000011 | | 0389 | YNEC |
| 0051 | 0151 | 1001010010 | 1001101011 | 0385 | 0390 | BRANCH 5 |
| 0022 | 0122 | 0001110010 | 1001101011 | 0412 | 0391 | BRANCH 15 |
| 0044 | 0144 | 1101010010 | 0010100011 | | 0392 | TCY MOV101 |
| 0068 | 0168 | 0010011010 | 0001110011 | | 0393 | COMXB MEMR |
| 0008 | 0110 | 0101001010 | 0011001011 | | 0394 | TMA 4 |
| 0017 | 0123 | 0101110001 | 0100100011 | | 0395 | YMCY |
| 0023 | 0127 | 0110011010 | 0111111011 | | 0396 | COMXR |
| 0046 | 011A | 0101010010 | 0100100011 | | 0397 | TAMDYN |
| 0009 | 0102 | 0001111110 | 0100000011 | | 0398 | YMCY |
| 0019 | 0133 | 0101000010 | 0011000011 | | 0399 | YNEC |
| 0033 | 0167 | 1001010010 | 1001101011 | 0395 | 0400 | BRANCH 10 |
| 0066 | 0114 | 1101010010 | 1001101011 | 0412 | 0401 | BRANCH 15 |
| 000A | 0134 | 0010000010 | 0010100011 | | 0402 | TCY MOV591 |
| 0035 | 016B | 0100110010 | 0001110011 | | 0403 | COMXB MEMR |
| 006A | 0155 | 1001101010 | 0100001011 | 0309 | 0404 | IMAC 4 |
| 0055 | 012A | 0101010010 | 1001101011 | | 0405 | BRANCH MEMRK4 |
| 0024 | 0154 | 0100110010 | 0011001011 | | 0406 | TMA |
| 0029 | 0129 | 1001000001 | 0111111011 | | 0407 | COMXB MEMR |
| 0052 | 0152 | 1000011010 | 0100100011 | 0405 | 0410 | TAMDYN MEMRK3 |
| 0028 | 0150 | 0101011100 | 0100001011 | | 0411 | BRANCH |
| 0050 | 0121 | 1000110101 | 1001101011 | | 0412 | RETN MEMRK3 |
| 0020 | 0140 | 0101110111 | 0100001011 | | 0413 | BL |
| 0040 | 0101 | 1010101001 | 1010100011 | 0667 | 0414 | BL EFFIX |

TABLE I-3

| PC | LOC | INSTR. | BRLN. | LINE | NAME | TITLE | COMMENTS | |
|---|---|---|---|---|---|---|---|---|
| 0000 | 0180 | 010011000 | | 0416 | ADDR | LDX | 4 | |
| 0001 | 0183 | 001000100 | | 0417 | ADD | TCY | 2 | |
| 0003 | 0187 | 010110100 | | 0418 | | REAC | | |
| 0007 | 018F | 010110001 | | 0419 | | SAL | | |
| 000F | 019F | 000100050 | | 0420 | | DMEA | | |
| 001F | 01BF | 010101110 | | 0421 | | TAMACS | 6 | R = H + DAM |
| 003F | 01FF | 000011000 | | 0422 | | CTMDYA | | |
| 007F | 01FF | 100001111 | 0420 | 0423 | | BRANCH | ADDREG | |
| 007E | 01FE | 000010010 | | 0424 | | CCLA | | |
| 007D | 01FD | 000111100 | | 0425 | | RETN | | |
| 007B | 01FB | 010111010 | 0433 | 0426 | | BRANCH | OPRFIN | |
| 0077 | 01F7 | 100000000 | | 0427 | | TBIT | 2 | |
| 006F | 01EF | 010000001 | 0416 | 0428 | SUBCHA | BRANCH | ADDR | |
| 005F | 01DF | 100000110 | | 0429 | SUBTR | LDX | 8 | |
| 003E | 01BE | 010101111 | | 0430 | SUBT | TCY | 2 | |
| 007C | 017C | 010110011 | | 0431 | | SEAC | | |
| 0079 | 01F9 | 010100100 | | 0432 | SUBT1 | DMEA | 10 | H = H + DAM |
| 0073 | 01E3 | 010101101 | 0432 | 0433 | | TAMACS | 6 | |
| 0067 | 01C7 | 000011000 | | 0434 | | CTMDYA | | |
| 004F | 018F | 101111111 | | 0435 | | BRANCH | SUBT1 | |
| 001E | 011E | 000011010 | | 0436 | | CCLA | | |
| 003D | 013D | 000111100 | | 0437 | | RETN | | |
| 0074 | 01F4 | 001000010 | 0433 | 0438 | | RCACC | OPRFIN | |
| 0075 | 01F5 | 001111111 | | 0439 | | BRANCH | | |
| 006A | 01EA | 000010110 | | 0440 | REVERS1 | CLA | 15 | FULLOR ON SURT |
| 0057 | 01D7 | 000001010 | | 0441 | | LDACC | 15 | |
| 002E | 01AE | 100000100 | 0776 | 0442 | | LDX | 4 | |
| 005C | 01DC | 010100000 | | 0443 | | TCY | 14 | |
| 0030 | 01B0 | 010101010 | | 0444 | | LDP | 5 | |
| 003A | 01BA | 100000011 | | 0445 | | TBIT | 3 | |
| 0070 | 01E0 | 010111111 | | 0446 | | BRANCH | XTIARA | |
| 0041 | 01C2 | 100001100 | 0341 | 0447 | | TCY | 3 | |
| 0003 | 0100 | 010101010 | | 0448 | | CALLL | REVERS | |
| 0066 | 01E2 | 000000110 | | 0449 | | BL | START | |
| 0001 | 0102 | 000111111 | 1770 | 0450 | | | | |
| 0037 | 0137 | 000100100 | | 0451 | | RL | | |
| 006F | 0165 | 101111010 | | 0452 | | CALLL | CLCOM | |
| 0033 | 0153 | 110000001 | | 0453 | STARTS | | | |
| 0034 | 0134 | 011010110 | | 0454 | | LDX | 4 | |
| 006E | 016E | 001100110 | | 0455 | | TCY | 10 | |
| 0069 | 0169 | 000101001 | | 0456 | | TMA | | OPR SEG NO TO ACC |

TABLE I-3 (cont)

| | | | | | | |
|---|---|---|---|---|---|---|
| 0053 | 01A6 | 00100111 | 0057 | | TCY | 14 |
| 0026 | 01CC | 01101000 | 0058 | | ALEC | 1 |
| 004C | 0199 | 10000000 | 0059 | | BRANCH | ADDB |
| 0018 | 0180 | 01100100 | 0416 | 0460 | ALEC | 2 |
| 0031 | 01E3 | 10111011 | 0461 | | BRANCH | SUBCHK |
| 0062 | 01C5 | 01101101 | 0427 | 0462 | ALEC | 3 |
| 0045 | 01B4 | 10001010 | 0096 | 0463 | BRANCH | MULTP |
| 0004 | 0194 | 00010001 | | 0464 | TBIT | 2 |
| 0015 | 01AB | 10001010 | 0096 | 0465 | BRANCH | MULTP |
| 0028 | 0107 | 01001010 | | 0466 | LDX | DAM |
| 0056 | 01AD | 00100100 | | 0467 | TCY | 2 |
| 002C | 0108 | 00110011 | | 0468 | MNEZ | |
| 005A | 01B1 | 10001011 | 0075 | 0469 | BRANCH | DIVID2 |
| 0030 | 01ED | 00000100 | | 0470 | DYN | |
| 0060 | 01C1 | 10011100 | 0468 | 0471 | BRANCH | DIVID1 |
| 0041 | 01B2 | 01011111 | | 0472 | RETN | |
| 0002 | 0184 | 01001111 | 2084 | 0473 | BL | DIVZRO |
| 0005 | 018B | 10011011 | | 0474 | RETN | |
| 000B | 0197 | 01011111 | | 0475 | RETN | |
| 0017 | 01AF | 11101111 | 0429 | 0476 | CALL | SUBTR |
| 002F | 01DE | 01101000 | | 0477 | ALEC | 0 |
| 005E | 01BD | 10111101 | 0488 | 0478 | BRANCH | DIVID4 |
| 003C | 01FA | 01001110 | | 0479 | LDX | 6 |
| 0078 | 01F1 | 00101100 | | 0480 | TCY | 2 |
| 0071 | 01E2 | 00101010 | | 0481 | IMAC | |
| 0063 | 01C5 | 01111001 | | 0482 | TAM | |
| 0047 | 018F | 01101001 | | 0483 | ALEC | 9 |
| 000E | 019C | 10001011 | 0075 | 0484 | BRANCH | DIVID2 |
| 001D | 01B8 | 00110000 | | 0485 | TCMIY | 0 |
| 0038 | 01F7 | 00101000 | | 0486 | TCY | 1 |
| 0076 | 01ED | 10111101 | 0481 | 0487 | BRANCH | DIVID3 |
| 006D | 01DA | 11000010 | 0416 | 0488 | CALL | ADDR |
| 005B | 0146 | 11001010 | 0096 | 0489 | CALL | MULTP |
| 0036 | 01EC | 11110110 | 0467 | 0490 | CALL | CHKZRO |
| 006C | 01D9 | 00111111 | | 0491 | YNEC | 15 |
| 0059 | 01B2 | 10001100 | 0529 | 0492 | BRANCH | REM |
| 0032 | 01E4 | 01001100 | | 0493 | LDX | A |
| 0064 | 01C9 | 01000001 | 1143 | 0494 | BL | MAYCNT |
| 0049 | 0192 | 10001010 | | 0495 | | |
| 0012 | 01A0 | 00100100 | | 0496 | TCY | 2 |
| 0025 | 01CB | 01001000 | | 0497 | LDX | 4 |

Burrow ?
Yes (rem)

TABLE I-3 (cont)

| | | | | | | |
|---|---|---|---|---|---|---|
| 004A | 0195 | 000101001 | | 0498 | | TMA | |
| 0014 | 01A8 | 000100011 | | 0499 | | COMX | |
| 0029 | 01D3 | 000000011 | | 0500 | | XMA | |
| 0052 | 01A5 | 000000000 | | 0501 | | COMX | |
| 0024 | 01C8 | 000101100 | | 0502 | | TAMDYN | |
| 0048 | 0191 | 100101101 | 0497 | 0503 | | BRANCH | EXCOM |
| 0010 | 01A0 | 010100100 | | 0504 | SETG3 | LDX | 6 |
| 0021 | 01C3 | 010101110 | | 0505 | | TCY | 3 |
| 0042 | 0185 | 001101111 | | 0506 | | RETN | |
| 0009 | 01A8 | 001101100 | | 0507 | | TCMJY | 2 |
| 0013 | 0193 | 110010000 | 0504 | 0508 | | CALL | SETG3 |
| 0027 | 01A7 | 000101010 | | 0509 | | TMY | |
| 004E | 01CF | 000000111 | | 0510 | | DMAN | |
| 001C | 01B0 | 101010011 | 0516 | 0511 | MULTP1 | BRANCH | MULTP2 |
| 0039 | 01BB | 110010000 | 0504 | 0512 | | CALL | SETG3 |
| 0072 | 01F3 | 000000111 | | 0513 | | DMAN | |
| 0065 | 01E5 | 101101000 | 0521 | 0514 | | BRANCH | MULTP4 |
| 00CA | 01CA | 100111100 | 0493 | 0515 | | BRANCH | OPRFIN |
| 0036 | 0196 | 000101111 | | 0516 | MULTP2 | TAM | |
| 001A | 01AC | 110010000 | 0416 | 0517 | | CALL | ADDR |
| 002D | 01DB | 011100000 | | 0518 | | ALEC | 0 |
| 005A | 01B5 | 101000001 | 0508 | 0519 | | BRANCH | MULTP1 |
| 0034 | 01EB | 101101011 | 0440 | 0520 | MULTP3 | BRANCH | REVRS1 |
| 0068 | 01D1 | 000101111 | | 0521 | MULTP4 | TAM | |
| 0051 | 01A2 | 010100011 | | 0522 | | LDX | 04M |
| 0022 | 01C4 | 010101110 | | 0523 | | TCY | 2 |
| 0044 | 0189 | 000000110 | | 0524 | | CLA | |
| 0006 | 0190 | 000000011 | | 0525 | | XMA | |
| 0011 | 01A3 | 000000110 | | 0526 | | DYN | |
| 0023 | 01C7 | 100001000 | 0525 | 0527 | SHFL | BRANCH | SHFL |
| 0046 | 0180 | 100001001 | 0508 | 0528 | | BRANCH | MULTP1 |
| 000C | 0198 | 001001101 | | 0529 | REM | TCY | 2 |
| 0019 | 01B3 | 000101001 | | 0530 | MOVREM | TMA | |
| 0033 | 01E7 | 011101101 | | 0531 | | YMCY | 10 |
| 0066 | 01CD | 000101100 | | 0532 | | TAMDYN | |
| 004D | 019A | 011101010 | | 0533 | | YMCY | 4 |
| 001A | 01B4 | 011100010 | | 0534 | | YNEC | 0 |
| 0035 | 01E8 | 100101001 | 0530 | 0535 | | BRANCH | MOVREM |
| 006A | 01D5 | 010101101 | | 0536 | | LDX | A |
| 0055 | 01AA | 010101111 | | 0537 | | TCY | 14 |
| 002A | 01D4 | 010001010 | | 0538 | | LDP | 5 |

TABLE I-3 (cont)

| | | | | | |
|---|---|---|---|---|---|
| 0054 | 0149 | 000010001 | | 0539 | TRIT 3 |
| 0028 | 0100 | 100101001 | 0757 | 0540 | BRANCH ELCNXT |
| 0050 | 01A1 | 001001011 | | 0541 | TCY 13 |
| 002C | 01C0 | 010000001 | | 0542 | BL |
| 0040 | 0181 | 101001010 | 1142 | 0543 | MAYREM |

TABLE I-4

SOURCE STATEMENT

| PC | LOC | INSTR. | BRIN. | LINE | NAME | TITLE | COMMENTS |
|---|---|---|---|---|---|---|---|
| 0000 | 0200 | 001001010 | | 0545 | ERROR | TCY | 5 |
| 0001 | 0203 | 010001111 | | 0546 | | CALLL | BLANK1 |
| 0003 | 0207 | 111101111 | 1981 | 0547 | | | |
| 0007 | 020F | 001000011 | | 0548 | ERRORH | TCY | 12 |
| 000F | 021F | 010101101 | | 0549 | | RHIT | 2 |
| 001F | 023F | 010001001 | | 0550 | | LDX | DAM |
| 003F | 027F | 001001111 | | 0551 | | CALLL | BLANK |
| 007F | 027E | 111110111 | 1980 | 0552 | | | |
| 007E | 027D | 001001010 | | 0553 | | TCY | 5 |
| 007D | 027C | 001101011 | | 0554 | | TCMIY | 13 |
| 007B | 0274 | 001101011 | | 0555 | | TCMIY | 13 |
| 0077 | 026E | 001101011 | | 0556 | | TCMIY | 13 |
| 006F | 025E | 010000101 | | 0557 | | CALLL | CNTDIG |
| 005F | 023E | 110100010 | 1450 | 0558 | | | |
| 003E | 027C | 001001001 | | 0559 | EXROM | TCY | 9 |
| 007C | 0279 | 000010001 | | 0560 | EXROM1 | TMA | |
| 0079 | 0272 | 000011001 | | 0561 | | XDA | |
| 0072 | 0265 | 000101100 | | 0562 | | TAMDYN | |
| 0065 | 024E | 101111100 | 0560 | 0563 | | BRANCH | EXROM1 |
| 004E | 021E | 010111111 | | 0564 | | RETN | |
| 001E | 023C | 010000111 | | 0565 | | CALLL | CLCOM |
| 003C | 027A | 110000001 | 1970 | 0566 | | | R |
| 007A | 0275 | 001001001 | | 0567 | | TCY | 8 |
| 0075 | 026A | 001101011 | | 0568 | | TCMIY | 13 |
| 006B | 0256 | 010000111 | | 0569 | ERROR1 | CALLL | NOSCAN |
| 0057 | 022E | 111001010 | 0047 | 0570 | | | |
| 002E | 025C | 001001111 | | 0571 | | TCY | 10 |
| 005C | 0239 | 010000111 | | 0572 | | CALLL | SHOWVAR |
| 003A | 0270 | 110001100 | 1954 | 0573 | | | |
| 0070 | 0261 | 001111111 | | 0574 | | ACACC | 15 |

TABLE I-4 (cont)

| | | | | | | |
|---|---|---|---|---|---|---|
| 0061 | 0242 | 10110101 | | | BRANCH | ERROR1 |
| 0043 | 0206 | 01001000 | | | LDX | 4 |
| 0006 | 020C | 11011110 | | | CALL | EXRD4 |
| 000D | 0213 | 01001110 | | | LDX | H |
| 001B | 0237 | 00100100 | | | TCY | 2 |
| 0037 | 026F | 00100000 | | | TCMIY | 6 |
| 006E | 0250 | 00110010 | | | TCY | 4 |
| 005D | 023A | 00110100 | | | TCMIY | 1 |
| 003A | 0274 | 01011111 | | | RETN | |
| 0074 | 0269 | 01001111 | 0569 | | LDX | 8 |
| 0069 | 0252 | 01001001 | | | TCY | 9 |
| 0053 | 0226 | 00100000 | 0550 | | TBIT | C |
| 0026 | 024C | 10110010 | | | BRANCH | ERROR3 |
| 004C | 0219 | 01001000 | 0591 | | SBIT | 0 |
| 0018 | 0230 | 10100010 | | | BL | RANTHINK |
| 0031 | 0263 | 01011110 | | BLRANT | | |
| 0062 | 0245 | 10001001 | 1220 | | TCMIY | 8 |
| 0045 | 020A | 00011010 | | ERROR3 | IMAC | |
| 000A | 0214 | 00010111 | | | TAM | |
| 0015 | 0228 | 00010000 | | | LDX | 4 |
| 002B | 0257 | 00100101 | | | TCY | 10 |
| 0056 | 022D | 00010001 | 0653 | | TRIT | 2 |
| 002C | 0258 | 10010010 | | ERROR9 | BRANCH | BOXEP4 |
| 0058 | 0231 | 01010110 | | ERROR4 | TCY | 2 |
| 0030 | 0260 | 01001100 | | | LDX | 7 |
| 0060 | 0241 | 00011000 | | | TMA | |
| 0041 | 0202 | 00111010 | | | YMCY | 9 |
| 0002 | 0205 | 00101111 | | | LDX | 4 |
| 0005 | 0217 | 00010111 | | | TAM | |
| 0017 | 022F | 00101111 | 0599 | | YMCY | 9 |
| 002F | 025F | 00011101 | | LEADZ | YNEC | 15 |
| 005E | 0230 | 10011000 | | ERROR7 | BRANCH | ERROR4 |
| 0030 | 0278 | 00100110 | | | TCY | 5 |
| 0078 | 0271 | 10001110 | 0613 | | MNEZ | |
| 0071 | 0262 | 00110011 | | | BRANCH | ERROR8 |
| 0063 | 0246 | 00100111 | | | TCMIY | 15 |
| 0047 | 020E | 00011100 | 0608 | | YNEC | 7 |
| 000E | 021C | 10011111 | | ERROR8 | BRANCH | ERROR7 |
| 001D | 0239 | 01011011 | | BXER9 | RETA | |
| 0039 | 0277 | 00110000 | | | TCY | 13 |
| | | 01010000 | | | TRIT | 0 |

B9 ERROR COUNT

TABLE I-4 (cont)

| | | | | | | | |
|---|---|---|---|---|---|---|---|
| 0076 | 026D | 101011011 | 0618 | | BRANCH | BXER10 | |
| 0060 | 025A | 101100100 | 0623 | | BRANCH | BXER11 | |
| 0058 | 0236 | 000000110 | 0618 | BXER10 | CLA | | |
| 0036 | 026C | 001111111 | 0619 | | ACACC | 15 | |
| 006C | 0259 | 010000000 | 0620 | | LDX | 4 | |
| 0059 | 0232 | 010000101 | 0621 | | CALLL | INSKEM | |
| 0032 | 0264 | 110000000 | 0622 | | | | |
| 0064 | 0249 | 010000101 | 0623 | BXER11 | BL | SHOW | |
| 0012 | 0224 | 101010011 | 0624 | | | | |
| 0025 | 0248 | 010100010 | 0625 | TIMERUA | LDX | TIME | |
| 004A | 0215 | 000110010 | 0626 | | TCY | 12 | |
| 0014 | 0228 | 101000010 | 0627 | TIMOT1 | IMAC | | |
| 0029 | 0253 | 000101111 | 0628 | | BRANCH | TIMOT2 | |
| 0052 | 0225 | 000000110 | 0629 | | TAM | | |
| 0024 | 024B | 001110100 | 0630 | | CLA | | |
| 0048 | 0211 | 001000011 | 0631 | | ACACC | 2 | |
| 0011 | 0220 | 010100010 | 0632 | | TCY | 12 | |
| 0021 | 0243 | 101101110 | 0633 | | BL | NDELAY | |
| 0042 | 0205 | 000000000 | 0634 | | | | |
| 0009 | 0208 | 001110100 | 0635 | TIMOT2 | TAMIYC | | |
| 0013 | 0213 | 101010010 | 0636 | | YNEC | | |
| 0027 | 0227 | 010100110 | 0637 | | BRANCH | 0 | |
| 0042 | 024F | 010011000 | 0638 | | OFF | TIMOT1 | |
| | | | 0639 | BLUPGO | LDX | 8 | RANDOM BLOW UP TIME |
| 004E | 021D | 001000001 | 0640 | * | 6-300KHZ, MIN TIME = 8 SEC, MAX TIME = 48 SEC |
| 001C | 0238 | 000101001 | 0641 | | TCY | 8 | |
| 0039 | 0273 | 001001010 | 0642 | | TMA | | |
| 0072 | 0265 | 101001011 | 0643 | | TCY | 5 | |
| 0065 | 0204 | 001110010 | 0644 | | BRANCH | BLUPR2 | |
| 0043 | 0216 | 011001010 | 0645 | BLUPR1 | ACACC | 4 | 6,7,8,9,6,7,8,9,8,9 |
| 0016 | 022C | 101001010 | 0646 | BLUPR2 | ALEC | 5 | |
| 0022D | 0253 | 000101111 | 0647 | | BRANCH | BLUPPR1 | |
| 0054 | 0235 | 001100111 | 0648 | BLUPR3 | TAM | | |
| 0039 | 0268 | 111000001 | 0649 | BOXGO2 | CALLL | CLSCOR | |
| 0068 | 0251 | 010010100 | 0650 | | | | |
| 0051 | 0222 | 100000001 | 0651 | | BL | BOXNXT | |
| 0022 | 0244 | 100000110 | 0652 | BOXERA | CALLL | BOXAN | |
| 0044 | 0209 | 110001101 | 0653 | | | | |
| 0008 | 0210 | 010000101 | 0654 | | | | |
| 0011 | 0223 | 110100010 | 0655 | | CALLL | CNTDIG | |
| | | | 0656 | | | | |

TABLE I-4 (cont)

| | | | | | | |
|---|---|---|---|---|---|---|
| 0023 | 0247 | 01000101 | | BOXERA | CALLL | CHKBOX |
| 0046 | 020D | 11111111 | | | | |
| 000C | 021A | 01000110 | | | CALLL | GETCNT |
| 0019 | 0233 | 11010100 | 1330 | | | |
| 0035 | 0267 | 00100100 | 0886 | | TCY | 9 |
| 0066 | 024D | 00000111 | | | DMAN | |
| 004D | 021A | 10011010 | | | BRANCH | BOXERC |
| 001A | 0234 | 10001110 | 0665 | | BRANCH | BXER9 |
| 0035 | 026A | 00010111 | 0614 | | TAM | |
| 004A | 0255 | 01101000 | | BOXERC | BRANCH | BOXERA |
| 0055 | 022A | 01001100 | 0657 | EFFIX | LDX | 8 |
| 002A | 0254 | 00100100 | | | TCY | 9 |
| 0029 | 0229 | 01010010 | | | RBIT | 0 |
| 0054 | 0250 | 01000111 | | | BL | BLANK0 |
| 0028 | 0221 | 10111011 | 1979 | | | |

TABLE I-5

SOURCE STATEMENT

| PC | LOC | INSTR. | BRLN. | LINE | NAME | TITLE | COMMENTS |
|---|---|---|---|---|---|---|---|
| 0000 | 0280 | 00101011 | | 0673 | BOXNUM | TCY | 13 ANS FLG ? |
| 0001 | 0283 | 00010010 | | 0674 | | TBIT | 1 |
| 0003 | 0287 | 10110111 | | 0675 | | BRANCH | BLUPNM |
| 0007 | 028F | 01001100 | | 0676 | | LDX | 8 |
| 000F | 029F | 00100100 | | 0677 | | TCY | 3 |
| 001F | 02BF | 01010101 | | 0678 | | RBIT | 2 |
| 003F | 02FF | 01111101 | | 0679 | | ALEC | 1 |
| 007F | 02FE | 10111101 | 0682 | 0680 | | BRANCH | BOXNM2 |
| 007E | 02FD | 01001111 | | 0681 | | SBIT | 2 |
| 007C | 02FA | 01000111 | 2057 | 0682 | | BL | BOXOK1 |
| 0078 | 02F6 | 10000111 | | 0683 | BOXNM2 | TCY | 13 |
| 0077 | 02EF | 00100110 | | 0684 | BLUPNM | LDP | 4 |
| 006F | 02DE | 00001100 | | 0685 | | TBIT | 1 |
| 005F | 02BF | 00001010 | | 0686 | | BRANCH | BOXNM |
| 003E | 02FC | 10000111 | 0671 | 0687 | BLSCN | BL | SCAN |
| 007C | 02F9 | 01001000 | | 0688 | | | |
| 0079 | 02F2 | 10110111 | | 0689 | | | |
| 0073 | 02E6 | 01010001 | 0041 | 0690 | ELCANS | BL | CHKANS |
| 0067 | 02CE | 10000001 | 1324 | 0691 | | | |
| 004F | 029F | 01001000 | | 0692 | ELCG0 | CALLL | SETEQ |

TABLE I-5 (cont)

| | | | | | | | |
|---|---|---|---|---|---|---|---|
| 001E | 02EC | 11001000 | 0246 | 0693 | | CALLL | CLREGA | |
| 003D | 02FR | 01001111 | 2088 | 0694 | | LDX | A | |
| 0074 | 02F5 | 11011101 | | 0695 | SETANS | TCY | 13 | |
| 0075 | 02EA | 01001010 | | 0696 | | TCMIY | 2 | |
| 006B | 0206 | 00101011 | | 0697 | | TCY | 9 | |
| 0057 | 02AE | 01101100 | | 0698 | | TCMIY | 0 | CLEAR DIGIT COUNT |
| 002E | 02DC | 00110000 | | 0699 | | TCY | 12 | |
| 005C | 0289 | 00110001 | | 0700 | | TRIT | 0 | |
| 003B | 02F0 | 01100011 | | 0701 | | BRANCH | ELOPN | |
| 0070 | 02E1 | 00100000 | | 0702 | | TCY | 4 | SET 2ND OPRD = 0 |
| 0061 | 02C2 | 10001010 | 0721 | 0703 | | TCMIY | 0 | |
| 0043 | 0286 | 01001010 | | 0704 | | TCY | 1 | TAB ≠ TO ACC |
| 0006 | 028C | 00100000 | | 0705 | | TMA | | |
| 000D | 0298 | 00100000 | | 0706 | | | | |
| 001B | 0287 | 00101001 | | 0707 | | | | |
| 0037 | 02EF | 00100101 | | 0708 | ELNOP4 | TCY | 10 | OP TO Y |
| 006E | 02DD | 00000110 | | 0709 | | TMY | | |
| 0050 | 02BA | 00101010 | | 0710 | | YNEC | 4 | DIV ? |
| 003A | 02F1 | 10101010 | 0713 | 0711 | | BRANCH | ELNOP1 | NO |
| 0072 | 02E9 | 00101000 | | 0712 | | TCMIY | 1 | |
| 0069 | 0202 | 00110100 | | 0713 | ELNOP1 | LDX | H | |
| 0053 | 0246 | 00101100 | | 0714 | | YNEC | 3 | * ? |
| 0026 | 02CC | 10011001 | 0718 | 0715 | | BRANCH | ELNOP3 | NO |
| 004C | 0299 | 00101111 | | 0716 | | TAM | | |
| 0018 | 02A0 | 00111100 | 068A | 0717 | | BRANCH | RLSCN | |
| 0031 | 02E3 | 00101101 | | 0718 | ELNOP2 | TCY | 3 | |
| 0062 | 02C5 | 00101100 | | 0719 | | TAMDYN | | |
| 0045 | 0284 | 10001100 | 0716 | 0720 | | BRANCH | ELNOP2 | |
| 000A | 0294 | 00111111 | | 0721 | FLOPN | TCY | 0 | |
| 0015 | 02AB | 00101111 | | 0722 | | TCMIY | 15 | |
| 0028 | 0207 | 01100000 | | 0723 | | TCMIY | 0 | |
| 0056 | 02AD | 00100010 | | 0724 | | TCY | 4 | |
| 002C | 0208 | 00101010 | | 0725 | | TMA | | |
| 0058 | 0281 | 00000101 | | 0726 | | TCY | 10 | |
| 0030 | 02E0 | 00110111 | | 0727 | | TPIT | 0 | |
| 0060 | 02C1 | 10001111 | 0708 | 0728 | | BRANCH | ELNOP4 | |
| 0041 | 0282 | 01000011 | | 0729 | | TRIT | 2 | |
| 0002 | 0284 | 10111000 | 0737 | 0730 | | BRANCH | ELCDIV | |
| 0005 | 02AA | 00101001 | | 0731 | | TCY | 1 | |
| 000A | 0297 | 00101101 | | 0732 | | TAMIYC | | |
| 0017 | 02AF | 01001000 | | 0733 | ELOPN1 | LDX | H | |

TABLE I-5 (cont)

```
002F  02DF  001011000              YNEC    1
005E  02BD  101111100              BRANCH  BLSCN
003C  02FA  100110001      068A    BRANCH  ELNOP3
0078  02F1  001111111      071A            ACACC   15
0071  02E2  100010111      0733    BRANCH  ELOPN1
0063  02C6  010111001              ACACC   9
0047  02BE  010000111              BL      VSS1
000E  029C  100100110      2011
0010  02BB  001100011              TCY     13      ANS FLG ?
003A  02F7  000110010              TBIT    1
0076  02ED  101110011      068D    BRANCH  ELCANS  YES
006D  02DA  001100011              TCY     12
0053  02B6  100010010              TBIT    0       OPR,NUM ?
0035  02EC  100110010      0750    BRANCH  ELOPN1  YES
006C  02D9  001100010              TCMIY   OPRN
0059  02B2  011100101              YMCY    4
0032  02E0  011111110              YMCY    11      NUM,OPR
0064  02EU  011111110              BRANCH  ELNOP2  OPR,NUM
0012  02C9  101100010      0716    BRANCH  ELNOP2   INSERT TABLE NUMBER
0012  0292  001000010              TCY     4
0025  02A0  001000001              CALL    CLANB   CLEAR ELAPSED TIME
0024  02CA  110000010      1117
0014  0295  001000010              BL      BOXG02
0011  02A8  101001010      0649
0029  02B3  101101010              TCY     5
0052  02A5  001010111              CALL    BLANK1
0024  02CB  111101111      1981
0048  02A1  001000011              TCY     12
0010  02A0  000010000              TBIT    0
0021  02C3  101010001      0779    BRANCH  ELCNX2  YES
0042  02C5  000010010              TCY     4
0009  02A8  000010011              IMAC
0013  0293  000110110              TAM
0027  02CF  010000111              LDP     2
000E  02CD  011101001              ALEC    9
001C  02AD  101111010      0309    BRANCH  TCMIY   START
0039  02A8  001100000              TCMIY   0
0072  02F3  010010000              LDX     4
0065  02E5  010010010              LDP     5
0068  02CA  010011010              YNEC    5
004R  0294  100110110      0777    BRANCH  OPMNXT
0016  02AC  001010000              TCY     1
```

TABLE I-5 (cont)

| | | | | | | |
|---|---|---|---|---|---|---|
| 002D | 0208 | 010000110 | | 0775 | NXTTAB | BL | NXTTR1 |
| 005A | 0285 | 101000011 | | 0776 | | | |
| 0034 | 02E8 | 001000010 | 0833 | 0777 | OPNNXT | TCY | 4 |
| 0068 | 02D1 | 100101101 | | 0778 | | BRANCH | NXTTAB |
| 0051 | 02A2 | 001000101 | 0775 | 0779 | ELCNX2 | TCY | 10 |
| 0022 | 02C4 | 000100001 | | 0780 | | TBIT | 2 |
| 0044 | 0288 | 100100001 | | 0781 | | BRANCH | ELCDV |
| 0008 | 0290 | 001001000 | 0784 | 0782 | | TCY | 1 |
| 0011 | 02A3 | 100001000 | | 0783 | | BRANCH | ELCNX1 |
| 0023 | 02C7 | 001000010 | 0764 | 0784 | ELCDV | TCY | 4 |
| 0046 | 028D | 000101001 | | 0785 | | TMA | |
| 000C | 0298 | 001001000 | | 0786 | | TCY | 1 |
| 0019 | 0283 | 000001101 | | 0787 | | AMAAC | |
| 0033 | 02E7 | 100011010 | 0791 | 0788 | | BRANCH | OVR16 |
| 0066 | 02CD | 000101001 | | 0789 | | ALEC | 9 |
| 004D | 029A | 011101001 | 0795 | 0790 | | BRANCH | ELCDV1 |
| 0014 | 0284 | 100101010 | | 0791 | OVR16 | ACACC | 6 |
| 0035 | 02EB | 001101111 | | 0792 | | TAMDYN | |
| 006A | 02D5 | 000110010 | | 0793 | | IMAC | |
| 0055 | 02AA | 100100000 | 0799 | 0794 | | BRANCH | ELCDV3 |
| 002A | 02D4 | 000101111 | | 0795 | ELCDV1 | TAM | |
| 0054 | 0249 | 010001000 | | 0796 | ELCDV2 | LDX | 4 |
| 0028 | 02D0 | 001001000 | 0764 | 0797 | | TCY | 2 |
| 0050 | 02A1 | 100000100 | | 0798 | | BRANCH | ELCNX1 |
| 0020 | 02C0 | 001010000 | 0796 | 0799 | ELCDV3 | TCMIY | 1 |
| 0040 | 0281 | 101010100 | | 0800 | | BRANCH | ELCDV2 |

TABLE I-6

| PC | LOC | INSTR. | BRLN. | LINE | NAME | TITLE | COMMENTS | |
|---|---|---|---|---|---|---|---|---|
| | | | | | | SOURCE STATEMENT | | |
| 0000 | 0300 | 01110000 | | 0802 | OPKOTH | ALEC | 0 | = NO OP |
| 0001 | 0303 | 10111111 | 0814 | 0803 | | BRANCH | NOPOPK | GAME NO OP |
| 0003 | 0307 | 00010010 | | 0804 | | TBIT | 1 | |
| 0007 | 030F | 10110111 | 0814 | 0805 | | BRANCH | NOPOPK | ANS FLG SET ? |
| 000F | 031F | 00101011 | | 0806 | | TCY | 13 | YES |
| 001F | 033F | 00010010 | | 0807 | | TBIT | 1 | |
| 003F | 037F | 10110111 | 0814 | 0808 | | BRANCH | NOPOPK | |
| 007F | 037F | 01000111 | | 0809 | | CALLL | SETOPP | |
| 007E | 037D | 11010101 | 2018 | 0810 | | | | |

TABLE I-6 (cont)

| | | | | | | |
|---|---|---|---|---|---|---|
| 007D | 037A | 001000111 | | 0811 | | TCY | MODE |
| 007B | 0374 | 000100011 | | 0812 | | TRIT | 3 |
| 0077 | 036E | 100111110 | 0816 | 0813 | | BRANCH | ELCOPP |
| 006F | 035E | 010000000 | | 0814 | | BL | SCAN |
| 005F | 033E | 101101111 | | 0815 | | | |
| 003E | 037C | 001000011 | 0041 | 0816 | NOPOPK | TCY | 12 |
| 007C | 0379 | 001001001 | | 0817 | | MNEZ | |
| 0079 | 0372 | 101101101 | 0814 | 0818 | ELCOPR | BRANCH | NOPOPK |
| 0073 | 0366 | 001101010 | | 0819 | | TCMIY | 5 |
| 0067 | 034E | 001000001 | | 0820 | | TCY | 1 |
| 004F | 031E | 000101000 | | 0821 | | TMA | |
| 001E | 037B | 001001111 | | 0822 | | TCMIY | 15 |
| 003D | 037A | 001000100 | | 0823 | | TCY | 4 |
| 007A | 0375 | 000101111 | | 0824 | | TAM | |
| 0075 | 036A | 101101111 | 0819 | 0825 | | BRANCH | NOPOPK |
| 006A | 0356 | 001000011 | | 0826 | | TCY | 12 |
| 0057 | 032E | 000100000 | | 0827 | | TRIT | 0 |
| 002E | 035C | 100111000 | 0830 | 0828 | | BRANCH | NXTDV2 |
| 005C | 0338 | 101101100 | 0841 | 0829 | NXTDIV | BRANCH | NXTTR2 |
| 0038 | 0370 | 001000010 | | 0830 | | TCY | 4 |
| 0070 | 0361 | 001101000 | | 0831 | | TCMIY | 1 |
| 0061 | 0342 | 001110100 | | 0832 | NXTDV2 | BRANCH | NXTDIV |
| 0043 | 0306 | 000110010 | | 0833 | | IMAC | |
| 0006 | 030C | 000101010 | | 0834 | NXTTR1 | TAM | |
| 000D | 0318 | 011010001 | | 0835 | | ALEC | 9 |
| 001B | 0337 | 101110100 | 0841 | 0836 | | BRANCH | NXTTR2 |
| 0037 | 036F | 001100000 | | 0837 | | TCMIY | 0 |
| 006F | 035D | 001000101 | | 0838 | | TCY | 10 |
| 005D | 033A | 000100010 | | 0839 | | TRIT | 2 |
| 003A | 0374 | 101101011 | 0826 | 0840 | NXTTR2 | BRANCH | NXTTR3 |
| 0074 | 0369 | 001001001 | | 0841 | | TCY | 13 |
| 0069 | 0352 | 010100100 | | 0842 | | RBIT | 1 |
| 0053 | 0326 | 001000110 | | 0843 | | TCY | 12 |
| 0026 | 034C | 000100000 | | 0844 | | TRIT | 0 |
| 004C | 0319 | 100110001 | 0847 | 0845 | | BRANCH | NXTTR3 |
| 0018 | 0330 | 010100110 | | 0846 | | YMCY | 2 |
| 0031 | 0363 | 011110000 | | 0847 | NXTTR3 | YMCY | 3 |
| 0062 | 0345 | 001101111 | | 0848 | | TCMIY | 15 |
| 0045 | 030A | 001101111 | | 0849 | | TCMIY | 15 |
| 000A | 0314 | 001001001 | | 0850 | NXTMEM | TCY | 9 | CLEAR VARIABLE OPERAND |

TABLE I-6 (cont)

| | | | | | | | |
|---|---|---|---|---|---|---|---|
| 0015 | 0324 | 010011000 | | 0851 | | LDX | B |
| 0029 | 0357 | 010100001 | | 0852 | | SBIT | 2 |
| 0050 | 0320 | 010000101 | | 0853 | | BL | ERRELF |
| 002C | 035A | 101101100 | 1398 | 0854 | | | |
| 005A | 0331 | 010010000 | | 0855 | SCOPE | LDX | A |
| 0036 | 0360 | 001000111 | | 0856 | | TCY | MODE |
| 0060 | 0341 | 000110011 | | 0857 | | MNEZ | |
| 0041 | 0302 | 100001011 | | 0858 | | BRANCH | SCOP1 |
| 0002 | 0304 | 010001010 | | 0859 | | | BOXGO2 |
| 0004 | 0308 | 101011010 | 0649 | 0860 | | BL | |
| 0005 | 0317 | 010011010 | | 0861 | SCOP1 | CALLL | EXROM |
| 0017 | 032F | 110111110 | 0559 | 0862 | | | |
| 002F | 035F | 010001111 | | 0863 | | CALLL | BLANKD |
| 005E | 033D | 111111011 | 1979 | 0864 | | | |
| 003D | 037A | 010001111 | | 0865 | | CALLL | CLCOM |
| 007A | 0371 | 110000001 | 1970 | 0866 | | | |
| 0071 | 0362 | 001100001 | | 0867 | | TCY | A |
| 0063 | 0346 | 001100001 | | 0868 | | TCMIY | 6 |
| 0047 | 030E | 010000001 | | 0869 | | BL | SCORE2 |
| 000E | 031C | 100000000 | 1060 | 0870 | | | |
| 0010 | 0338 | 001000900 | | 0871 | BOXAN | TCY | 0 |
| 003A | 0377 | 000101001 | | 0872 | BOXAN2 | TMA | |
| 0076 | 0360 | 011101001 | | 0873 | | ALEC | 9 |
| 0060 | 0354 | 101101100 | | 0874 | | BRANCH | BOXAN3 |
| 005A | 0336 | 001010100 | 0877 | 0875 | | YNEC | 2 |
| 0036 | 036C | 100100000 | 0928 | 0876 | | BRANCH | BOXAN4 |
| 006C | 0359 | 000100101 | | 0877 | BOXAN3 | IYC | |
| 0059 | 0332 | 001010001 | | 0878 | BOXAN5 | YNEC | 8 |
| 0032 | 0364 | 100111011 | 0872 | 0879 | | BRANCH | BOXAN2 |
| 0064 | 0349 | 010111111 | | 0880 | | RETN | |
| 0049 | 0312 | 010000101 | | 0881 | | CALLL | CHKBOX |
| 0012 | 0324 | 111111111 | 1330 | 0882 | | | |
| 0025 | 0348 | 001001111 | | 0883 | | TCY | 15 |
| 0048 | 0315 | 000010001 | | 0884 | | MNEA | |
| 0014 | 0328 | 100100010 | 0909 | 0885 | | BRANCH | BOXERR |
| 0029 | 0353 | 010011000 | | 0886 | | LDX | B |
| 0052 | 0325 | 001001100 | | 0887 | | TCY | 3 |
| 0024 | 034A | 000100010 | | 0888 | | TRIT | 1 |
| 0048 | 0311 | 101101000 | 0907 | 0889 | | BRANCH | BOX3 |
| 0010 | 0320 | 000100000 | | 0890 | | TRIT | 0 |
| 0021 | 0343 | 100001001 | 0894 | 0891 | | BRANCH | BOX4 |

GET RID OF BRACKETS

TABLE I-6 (cont)

| | | | | | | |
|---|---|---|---|---|---|---|
| 0042 | 0305 | 001001110 | | 0892 | BOX14 | TCY 7 |
| 0004 | 0308 | 100010011 | 0895 | 0893 | | BRANCH BOXAN1 |
| 0009 | 0313 | 001001000 | | 0894 | BOX4 | TCY 1 |
| 0013 | 0327 | 010010000 | | 0895 | BOXAN1 | LDX 4 |
| 0027 | 034F | 000000011 | | 0896 | | XMA |
| 004E | 031D | 000000100 | | 0897 | | DYN |
| 001C | 033B | 000000011 | | 0898 | | XMA |
| 0039 | 0373 | 010111111 | | 0899 | | RETN |
| 0072 | 0365 | 010000101 | | 0900 | | LDP 10 |
| 0065 | 034A | 001110110 | | 0901 | | ACACC 6 |
| 0048 | 0316 | 101101101 | 1346 | 0902 | | BRANCH DECDIG |
| 0016 | 032C | 000000100 | | 0903 | | DYN |
| 002D | 035B | 001101100 | | 0904 | | ACACC 10 |
| 005A | 0335 | 001101111 | | 0905 | | TAM |
| 0034 | 036A | 101110101 | 1346 | 0906 | | BRANCH DECDIG |
| 0068 | 0368 | 001110101 | | 0907 | | TCY 4 |
| 0051 | 0351 | 001100010 | 0895 | 0908 | BOX3 | BRANCH BOXAN1 |
| 0022 | 0322 | 100100011 | | 0909 | | LDX 8 |
| 0044 | 0309 | 000000100 | | 0910 | BOXERR | TCY 3 |
| 0008 | 0310 | 001001100 | | 0911 | | TMA |
| 0011 | 0323 | 000101001 | | 0912 | | TBIT 1 |
| 0023 | 0347 | 101101010 | 0922 | 0913 | | BRANCH BOXER3 |
| 0046 | 0300 | 000010000 | | 0914 | | TBIT 0 |
| 000C | 031A | 100010101 | 0921 | 0915 | | BRANCH BXER1 |
| 0019 | 0333 | 001001010 | | 0916 | | TCY 5 |
| 0033 | 0367 | 010001000 | | 0917 | | LDX 4 |
| 0066 | 034F | 010101111 | | 0918 | BXER1 | TCMIY 10 |
| 004D | 031A | 101011111 | | 0919 | BOXER3 | TCMIY 15 |
| 001A | 0334 | 100001111 | 0924 | 0920 | | BRANCH BOXER4 |
| 0035 | 0364 | 001101010 | | 0921 | BXER1 | TCY 0 |
| 0064 | 0355 | 010010001 | | 0922 | BOXER3 | LDX 4 |
| 0064 | 032A | 001100101 | | 0923 | | TCMIY 10 |
| 002A | 0354 | 001101111 | | 0924 | BOXER4 | TCMIY 11 |
| 0054 | 0329 | 010111111 | | 0925 | | RETN |
| 0028 | 0350 | 010000010 | | 0926 | | DL |
| 0050 | 0321 | 100000111 | 054B | 0927 | | BRANCH ERRORR |
| 0020 | 0340 | 001101111 | | 0928 | BOXAN4 | TCMIY 15 |
| 0040 | 0301 | 101011001 | 087A | 0929 | | BRANCH BOXAN5 |

TABLE I-7

SOURCE STATEMENT

| PC | LOC | INSTR. | BRLN. | LINE | NAME | TITLE | COMMENTS |
|---|---|---|---|---|---|---|---|
| 0000 | 0380 | 01000111 | | 0931 | BOXNXT | CALLL | BLANKD |
| 0001 | 0383 | 11111011 | 1979 | 0932 | | | B |
| 0003 | 0387 | 01001000 | | 0933 | | LDX | |
| 0007 | 038F | 00010101 | | 0934 | | TMA | 1 |
| 000F | 039F | 01001000 | | 0935 | | TCY | 4 |
| 001F | 03BF | 01000100 | | 0936 | | LDX | |
| 003F | 03FF | 00010111 | | 0937 | | TAM | |
| 007F | 03FE | 01001110 | | 0938 | OPR29 | TCY | 7 |
| 007E | 03FD | 01001000 | | 0939 | | LDX | B |
| 007D | 03FA | 01010101 | | 0940 | | TMA | |
| 007B | 03F6 | 01010001 | | 0941 | | LDX | 4 |
| 0077 | 03EE | 00100010 | | 0942 | | TCY | 4 |
| 006F | 03DE | 00010111 | | 0943 | | TAM | |
| 005F | 03BE | 01011111 | | 0944 | | RETN | |
| 003E | 03FC | 01000111 | | 0945 | | CALLL | INSUFR |
| 007C | 03F9 | 11010110 | 2021 | 0946 | | LDX | B |
| 0078 | 03F2 | 00010001 | | 0947 | | TAIT | 2 |
| 0067 | 03E6 | 10100001 | | 0948 | | BRANCH | 11 |
| 004F | 03CE | 01100101 | 0978 | 0949 | | ALEC | 1 |
| 001E | 039E | 10100011 | | 0950 | | BRANCH | LEV2 |
| 003C | 03BC | 10111000 | 0960 | 0951 | | ALEC | 12 |
| 007A | 03FA | 01110011 | | 0952 | | BRANCH | LEV1AS |
| 0075 | 03F5 | 10011111 | 0946 | 0953 | | CALL | LEV1M |
| 006A | 03EA | 11111111 | 0938 | 0954 | | ALEC | OPR29 |
| 0056 | 03D6 | 01100010 | | 0955 | | ALEC | 4 |
| 0057 | 03AE | 10101100 | 0958 | 0956 | | BRANCH | LEV1D |
| 002E | 03DC | 00111101 | | 0957 | LEV1D | ACACC | 11 |
| 005C | 03B9 | 11101100 | | 0958 | LEV1D1 | ACACC | 1 |
| 0033 | 03F0 | 00010111 | | 0959 | LEV1AS | TAM | |
| 0070 | 03E1 | 00010101 | | 0960 | | TCY | 10 |
| 0061 | 03C2 | 01000001 | | 0961 | | TMA | |
| 0043 | 0386 | 01000001 | | 0962 | | LDP | 8 |
| 0006 | 038C | 01110100 | | 0963 | | ALEC | 2 |
| 000D | 0399 | 10101010 | 1180 | 0964 | | BRANCH | LEV4S |
| 001A | 03B7 | 10111010 | 115A | 0965 | | BRANCH | LEVCHK |
| 0037 | 03EF | 11111111 | 0938 | 0966 | LEV1M | CALL | OPR29 |
| 006E | 03DD | 00010000 | | 0967 | | TCY | 1 |
| 005D | 03BA | 00010001 | | 0968 | | TMA | |
| 0034 | 03F4 | 01110010 | 0959 | 0969 | | ALEC | 5 |
| 0074 | 03E9 | 10001100 | | 0970 | | BRANCH | LEV1D1 |
| 0069 | 03D2 | 00111001 | | 0971 | | ACACC | 12 |

TABLE I-7 (cont)

| | | | | | | | |
|---|---|---|---|---|---|---|---|
| 0053 | 03A6 | 10011000 | | 0959 | 0972 | | BRANCH | LEV101 |
| 0026 | 03CC | 11111111 | | 093A | 0973 | | CALL | OPR29 |
| 004C | 0399 | 00011001 | | | 0974 | | MNEZ | |
| 0018 | 03AC | 10110000 | | 0960 | 0975 | | BRANCH | LEV1AS |
| 0031 | 03E3 | 00101101 | | | 0976 | | TCMIY | 7 |
| 0062 | 03C5 | 10110100 | | 0960 | 0977 | | BRANCH | LEV1AS |
| 0045 | 03AA | 00111100 | | | 0978 | | ACACC | 3 |
| 000A | 0394 | 10010000 | | 0975 | 0979 | | BRANCH | LFV2D |
| 0015 | 03AB | 10011000 | | | 0980 | LEV2D | ACACC | 1 |
| 0028 | 03AD | 10011100 | | 1005 | 0981 | | BRANCH | LFV2H |
| 0056 | 03A5 | 00111111 | | | 0982 | | TCY | 15 |
| 002C | 03AD | 00111110 | | | 0983 | | TMA | |
| 005A | 03AA | 00111010 | | | 0984 | | TCY | 3 |
| 0030 | 03B1 | 00101010 | | | 0985 | | TCY | 4 |
| 006C | 03B0 | 01111001 | | | 0986 | | LDX | 0 |
| 0041 | 03C2 | 01110010 | | | 0987 | LEV2 | ALEC | |
| 0002 | 03B4 | 10011001 | | 0960 | 0988 | | BRANCH | LEV24S |
| 0005 | 03BB | 00111101 | | | 0989 | | ACACC | 11 |
| 000A | 03AF | 10101010 | | 0993 | 0990 | | TAM | |
| 0017 | 03BE | 00011110 | | | 0991 | | MNEZ | |
| 002F | 03BF | 10111100 | | | 0992 | | BRANCH | LFA001 |
| 005E | 03B0 | 01011111 | | | 0993 | LEV2A5 | TCMIY | 15 |
| 003C | 03BR | 01011111 | | | 0994 | LEAD0 | RETN | |
| 0078 | 03B1 | 01010011 | | | 0995 | LEAD01 | LDX | 9 |
| 0071 | 03B2 | 00010101 | | | 0996 | | TCY | 13 |
| 0065 | 03C6 | 00010010 | | | 0997 | | TMA | |
| 0047 | 03BF | 01100000 | | | 0998 | | LRX | 4 |
| 000F | 03B6 | 01111000 | | | 0999 | | TCY | 0 |
| 0010 | 03C4 | 01111011 | | | 1000 | | ALEC | |
| 0020 | 03F7 | 10111011 | | 1002 | 1001 | LEV21 | BRANCH | LEV21 |
| 0060 | 03F0 | 00010010 | | | 1002 | | ACACC | 11 |
| 0058 | 03F6 | 11110110 | | 0990 | 1003 | | TAM | |
| 003A | 03EC | 11111111 | | 0960 | 1004 | | CALL | LEAD0 |
| 006C | 03E9 | 11111000 | | 093A | 1005 | | BRANCH | LEV1AS |
| 0034 | 03FA | 11111000 | | 0960 | 1006 | | CALL | OPR29 |
| 0059 | 03F0 | 11111000 | | 059A | 1007 | LFV24 | BRANCH | LFV1AS |
| 006C | 03A0 | 01001000 | | | 1008 | WHTROX | CALLL | ERROR0 | INS ANS |
| 0032 | 03E8 | 11100110 | | | 1009 | | TCY | 10 |
| 0064 | 03C9 | 00100101 | | | 1010 | | TRIT | 0 |
| 0049 | 0392 | 00001000 | | 1019 | 1011 | | BRANCH | WHTRX1 | *,* OK |

TABLE I-7 (cont)

| | | | | | | |
|---|---|---|---|---|---|---|
| 0025 | 03C8 | 001001000 | | 1012 | | TCY | 1 |
| 004A | 0395 | 000101001 | | 1013 | | TMA | |
| 0014 | 03A8 | 011111010 | | 1014 | | YMCY | 5 |
| 0029 | 03D3 | 000000011 | | 1015 | | XMA | |
| 0052 | 03A5 | 011111001 | | 1016 | | YMCY | 9 |
| 0024 | 03C8 | 000101100 | | 1017 | | TAMDYN | |
| 0048 | 0391 | 101001010 | | 1018 | | BRANCH | SUBDIV |
| 0010 | 03A0 | 001010000 | 1013 | 1019 | SUBDIV | TCY | 0 |
| 0021 | 03C3 | 010000001 | | 1020 | | CALLL | CLAN8 |
| 0042 | 03B5 | 110000010 | | 1021 | | | |
| 0009 | 03B8 | 000010010 | | 1022 | | TBIT | 0 |
| 0009 | 0393 | 100001000 | 1117 | 1023 | | BRANCH | BOX1 |
| 0013 | 03A7 | 000010010 | | 1024 | | TBIT | 1 |
| 0027 | 03CF | 001000110 | 1044 | 1025 | | BRANCH | BOX2 |
| 004E | 039D | 001000100 | | 1026 | WHTRX1 | TCY | 2 |
| 001C | 03BA | 011110010 | 1047 | 1027 | | YMCY | 3 |
| 0039 | 03F3 | 010000100 | | 1028 | | LDX | A |
| 0072 | 03E5 | 000110000 | | 1029 | | IMAC | |
| 0065 | 03CA | 101001010 | 1036 | 1030 | RESROX | BRANCH | WHTRX2 |
| 0048 | 0396 | 000101001 | | 1031 | | TMA | |
| 0016 | 03AC | 010001000 | | 1032 | | LCX | 8 |
| 002D | 03DB | 011110000 | | 1033 | | YMCY | 10 |
| 0054 | 03B5 | 000101001 | | 1034 | | TAMDYN | |
| 0034 | 03EA | 100011100 | 1027 | 1035 | | BRANCH | RESROX |
| 006A | 03D1 | 010000110 | | 1036 | WHTRX2 | CALLL | BOXEPP |
| 0051 | 03A2 | 110100010 | 0909 | 1037 | WHTRX4 | | |
| 0022 | 03C0 | 001000011 | | 1038 | | TCY | 12 |
| 0044 | 0389 | 000100100 | | 1039 | | TCMJY | 2 |
| 0008 | 0390 | 001100100 | | 1040 | | TCMTY | 2 |
| 0011 | 03A3 | 010111111 | | 1041 | | PFIN | |
| 0023 | 03B5 | 010000101 | | 1042 | | RL | |
| 0046 | 03BD | 101001000 | 1428 | 1043 | BOX1 | CALLL | STARTB |
| 000C | 03B8 | 010000100 | | 1044 | BOX2 | BRANCH | WHTRX2 |
| 0019 | 03B3 | 110101010 | 0325 | 1045 | MOV2ND | TCY | 4 |
| 0033 | 03E7 | 101101000 | 1036 | 1046 | | LDX | A |
| 0066 | 03CD | 001000010 | | 1047 | | IMAC | |
| 0040 | 039A | 010010000 | | 1048 | | BRANCH | MOV21 |
| 001A | 03B0 | 000011111 | 1052 | 1049 | | TMA | |
| 0035 | 03EB | 101010101 | | 1050 | MOV21 | YMCY | 13 |
| 006A | 03D5 | 000101001 | | 1051 | | | |
| 0055 | 03AA | 011111011 | | 1052 | | | |

TABLE I-7 (cont)

| | | | | | |
|---|---|---|---|---|---|
| 002A | 03D4 | 010011000 | | LDX | 3 |
| 0054 | 03A9 | 000101100 | | TAMDYN | |
| 0028 | 0300 | 011111000 | | YMCY | 1 |
| 0050 | 03A1 | 001010000 | | YNEC | 2 |
| 0020 | 03C0 | 101001101 | 1048 | BRANCH | MOV2ND |
| 0040 | 0381 | 101101000 | 103A | BRANCH | WHTRX2 |

TABLE I-8

SOURCE STATEMENT

| PC | LOC | INSTR. | BRLN. | LINE | NAME | TITLE | COMMENTS |
|---|---|---|---|---|---|---|---|
| 0000 | 0400 | 001000111 | | 1060 | SCORE2 | TCY | MODE |
| 0001 | 0403 | 010010000 | | 1061 | | LDX | A |
| 0003 | 0407 | 000101001 | | 1062 | | TMA | |
| 0007 | 040F | 011101000 | | 1063 | | ALEC | 1 |
| 000F | 041F | 101111100 | 1075 | 1064 | | BRANCH | SCORE3 |
| 001F | 043F | 001000010 | | 1065 | | TCY | 4 |
| 003F | 047F | 010011000 | | 1066 | INSTIM | LDX | B |
| 007F | 047E | 000101001 | | 1067 | | TMA | |
| 007E | 047D | 000000101 | | 1068 | INSTI1 | IYC | |
| 007D | 0474 | 010010000 | | 1069 | | LDX | A |
| 0074 | 0476 | 000010010 | | 1070 | | TAM | |
| 0076 | 046E | 001011111 | | 1071 | | YNEC | 7 |
| 006E | 045F | 100111111 | 1056 | 1072 | | BRANCH | INSTIM |
| 005F | 043E | 010000010 | 0607 | 1073 | | CALLL | LEADZ |
| 003E | 047C | 111011110 | | 1074 | | | |
| 007C | 0479 | 010011000 | | 1075 | SCORE3 | LDX | B |
| 0079 | 0472 | 001000101 | | 1076 | | TCY | 10 |
| 0072 | 0466 | 000101001 | | 1077 | | TMA | |
| 0066 | 044E | 001010010 | | 1078 | | TCY | 4 |
| 004E | 041E | 010010000 | | 1079 | | LDX | A |
| 001E | 043C | 011101000 | | 1080 | | ALEC | 9 |
| 003C | 047A | 101010111 | 1085 | 1081 | INSSC0 | BRANCH | INSSC1 |
| 007A | 0475 | 000000110 | | 1082 | | CLA | |
| 0075 | 046A | 000101100 | | 1083 | | TAMDYN | |
| 006A | 0456 | 001111000 | | 1084 | | AC4CC | 1 |
| 0056 | 042E | 000101111 | | 1085 | INSSC1 | TAM | |
| 002E | 045C | 010111111 | | 1086 | | RETN | |
| 005C | 0439 | 010011000 | | 1087 | | LDX | B |
| 0039 | 0472 | 001001101 | | 1088 | | TCY | 11 |

TABLE I-8 (cont)

| | | | | | | |
|---|---|---|---|---|---|---|
| 0070 | 0461 | 000101001 | | 1089 | | TPA |
| 0061 | 0442 | 001001000 | | 1090 | | TCY | 1 |
| 0043 | 0406 | 111001111 | | 1091 | | CALL | INSSCO |
| 0006 | 040C | 010000000 | | 1092 | | CALL | NOSCAN |
| 000D | 041A | 111100111 | 1079 | 1093 | | |
| 001A | 0437 | 001001111 | 0047 | 1094 | SCORE1 | TCY | 15 |
| 0037 | 046F | 010000111 | | 1095 | | CALL | SHORTVAR |
| 006E | 045D | 110001100 | 1054 | 1096 | | |
| 005D | 0434 | 001111111 | | 1097 | | ACACC |
| 003A | 0474 | 110000110 | 1092 | 1098 | | BRANCH | SCORE1 |
| 0074 | 0469 | 100010000 | | 1099 | | LDX | A |
| 0069 | 0452 | 010010011 | | 1100 | | TCY | 12 |
| 0053 | 0426 | 010100001 | | 1101 | | SKIT | 2 |
| 0026 | 044C | 010100010 | | 1102 | | CALL | EXHDM |
| 004C | 0419 | 110111110 | 0559 | 1103 | | |
| 0018 | 0430 | 001000111 | | 1104 | | TCY | MODE |
| 0031 | 0463 | 001000000 | | 1105 | | TBIT | USER |
| 0063 | 0445 | 000010101 | 1109 | 1106 | | BRANCH | SCORE4 |
| 0045 | 040A | 100001010 | | 1107 | | CALL | STOPEQ |
| 000A | 0414 | 010000010 | 0578 | 1108 | | |
| 0015 | 042A | 110001100 | | 1109 | SCORE4 | CALL | SETEQ |
| 002A | 0457 | 010001000 | 0246 | 1110 | | |
| 0054 | 072C | 110010100 | | 1111 | | LDX | R |
| 002C | 045A | 001001101 | | 1112 | | TCY | 11 |
| 005A | 0431 | 010101001 | | 1113 | | TMA |
| 0031 | 0062 | 000101001 | | 1114 | | TCY | 10 |
| 0062 | 0045 | 001100001 | | 1115 | | SAMAN |
| 0045 | 040A | 010001001 | | 1116 | | TCY | 9 |
| 000A | 0014 | 110001001 | | 1117 | | LDX | R |
| 0015 | 0028 | 010001000 | | 1118 | | TCMIY | 0 |
| 002B | 0057 | 010001000 | | 1119 | | TCMIY | 0 |
| 0054 | 072C | 010001000 | | 1120 | | TCMIY | 0 |
| 002C | 005A | 001001111 | | 1121 | | RETN |
| 005A | 0431 | 010001001 | 1117 | 1122 | | TCY | 4 |
| 0031 | 0060 | 110010101 | | 1123 | CLSCOR | CALL | CLANB |
| 0060 | 0041 | 001000001 | | 1124 | CLANB | LDP | 9 |
| 0041 | 0002 | 000110000 | | 1125 | | ALEC | 0 |
| 0002 | 0005 | 011001001 | 1197 | 1126 | | BRANCH | ASTROCOM |
| 0005 | 0017 | 100111111 | | 1127 | | ALEC | 1 |
| 0017 | 002F | 011101000 | 1216 | 1128 | | BRANCH | HUEYBLUP |
| 002F | 005E | 011101100 | | 1129 | | ALEC | 2 |

TABLE I-8 (cont)

| | | | | | |
|---|---|---|---|---|---|
| 0038 | 0077 | 10000000 | 1190 | | BRANCH BULLSEYE |
| 0074 | 006D | 10001110 | 1220 | | BRANCH CANTHINK |
| 0060 | 0054 | 00100100 | | MEM7 | TCY 2 |
| 0058 | 0036 | 00010100 | | | TMA |
| 0036 | 006C | 00111110 | | | ACACC |
| 006C | 0059 | 00100101 | | | TCY 7 |
| 0059 | 0432 | 00100101 | | | TAM 10 |
| 0032 | 0464 | 01001110 | | | CALLL WHTBX4 |
| 0064 | 0449 | 11100010 | 1038 | | CALLL STOPEQ |
| 0049 | 0412 | 01000010 | | | |
| 0012 | 0424 | 11000101 | 0578 | MAYREM | BRANCH LEVAS |
| 0025 | 0424 | 10110100 | 1180 | MAYCNT | SKIT 0 |
| 0044 | 0415 | 01010100 | | | TCY 14 |
| 0014 | 0428 | 00010000 | | | TBIT 2 |
| 0029 | 0053 | 00010111 | | | BRANCH MAYCNT1 |
| 0052 | 0225 | 00010001 | 1148 | | MNEZ |
| 0029 | 0448 | 10000000 | | MAYCNT1 | BRANCH MAYCNT2 |
| 0048 | 0411 | 10100110 | 1150 | | RL WHTBOX |
| 0010 | 0426 | 01001110 | | | |
| 0021 | 0443 | 10101001 | 1007 | MAYCNT2 | LDP 10 |
| 0042 | 0405 | 00010101 | | | TMY |
| 0009 | 0409 | 00101110 | | | YNEC 3 |
| 0013 | 0413 | 00010100 | 1430 | | BRANCH CNTDIG |
| 0027 | 004F | 10010010 | | | TCY 13 |
| 004E | 0419 | 00110011 | | | TBIT 1 |
| 001C | 0436 | 10010010 | 1430 | | BRANCH CNTDIG |
| 0039 | 0473 | 10101010 | 1180 | | BRANCH LEVAS |
| 0072 | 0465 | 10011001 | | | TBIT 2 |
| 0065 | 044A | 10000001 | 1167 | LEVCHK | BRANCH CHK1 |
| 004B | 0416 | 00100111 | | | TCY 4 |
| 0016 | 042C | 00011000 | | | MNEZ |
| 0020 | 0454 | 10010010 | 1167 | | BRANCH CHK1 |
| 005A | 0435 | 01001000 | | | LDX 3 |
| 0034 | 0468 | 00011000 | | | TCY 3 |
| 0068 | 0451 | 00010010 | | | TBIT 0 |
| 0051 | 0222 | 10101110 | 1176 | CHK1 | BRANCH CHG4 |
| 0022 | 0444 | 01010000 | | | LDX 4 |
| 0044 | 0409 | 00010000 | | | TCY 1 |
| 0009 | 0010 | 00010011 | | | MNEZ |
| 0011 | 0023 | 10110110 | 1180 | | BRANCH LEVAS |

TABLE I-8 (cont)

| PC | LOC | INSTR. | BRLN. | LINE | | SOURCE STATEMENT | |
|---|---|---|---|---|---|---|---|
| 0023 | 0047 | 010011000 | | 1171 | | LDX | R |
| 0046 | 040D | 001001100 | | 1172 | | TCY | 3 |
| 000C | 041B | 000100010 | | 1173 | | TBIT | 1 |
| 0019 | 0433 | 101001101 | 1177 | 1174 | | BRANCH | CHG1 |
| 0033 | 0067 | 101101010 | 1180 | 1175 | | BRANCH | LEVAS |
| 006B | 004D | 011110100 | | 1176 | CHG4 | YMCY | 2 |
| 004D | 041A | 011111011 | | 1177 | CHG1 | YMCY | 13 |
| 0014 | 0434 | 010010000 | | 1178 | CHG | LDX | 4 |
| 0035 | 006B | 000101000 | | 1179 | | TCMIY | 1 |
| 006A | 0455 | 010000100 | 0309 | 1180 | LEVAS | BL | START |
| 0055 | 002A | 101101010 | | 1181 | | LDP | 15 |
| 002A | 0454 | 000100111 | | 1182 | | TBIT | 1 |
| 0054 | 0429 | 000100101 | 2090 | 1183 | ROXML7 | BRANCH | ROXNX1 |
| 0026 | 0450 | 101101101 | | 1184 | | TBIT | 0 |
| 0050 | 0421 | 000101000 | | 1185 | | BRANCH | HLDIS |
| 0020 | 0440 | 101000000 | 2095 | 1186 | | BRANCH | ROXNX1 |
| 0040 | 0401 | 101010101 | 2090 | 1187 | | BRANCH | ROXNX1 |

TABLE I-9

| PC | LOC | INSTR. | BRLN. | LINE | NAME | TITLE | COMMENTS |
|---|---|---|---|---|---|---|---|
| | | | | 1188 | * | BULLS EYE DISPLAY SEQUENCE | |
| 0000 | 0480 | 110001101 | | 1189 | BULLSEYE | CALL | DISPSAVE |
| 0001 | 0483 | 001100101 | | 1190 | | TCMIY | 10 CONSTANT,SHIFT RIGHT,SINGLE |
| 0003 | 0487 | 001100100 | | 1191 | BULLSUBR | TCMIY | 2 TWO GROUPS |
| 0007 | 048F | 001100010 | | 1192 | | TCMIY | GSEG |
| 000F | 049F | 001101111 | | 1193 | | TCMIY | NOSEG |
| 001F | 048F | 101000011 | | 1194 | | TCMIY | DISPEL |
| | | | | 1195 | | BRANCH | ASTRODOME DISPLAY SEQUENCE |
| 003F | 04FF | 110001101 | 1227 | 1196 | * | ASTRODOM CALL | DISPSAVE |
| 007F | 04FE | 001101101 | | 1197 | ASTRODO2 | TCMIY | 11 CONSTANT,SHIFT RIGHT,DOUBLE |
| 007E | 04FD | 001101010 | | 1198 | | TCMIY | 5 FIVE GROUPS |
| 007D | 04FA | 001100110 | | 1199 | | TCMIY | ASEG |
| 0078 | 04F6 | 001100100 | | 1200 | | TCMIY | GSEG |
| 0077 | 04EE | 001100010 | | 1201 | | TCMIY | GSEG |
| 006F | 04DE | 001101011 | | 1202 | | TCMIY | DIVSEG |
| 005F | 04BE | 001101111 | | 1203 | | TCMIY | NOSEG |
| 003E | 04FC | 101000011 | 1225 | 1204 | | TCMIY | DISPEL |
| | | | | 1205 | | BRANCH | |
| | | | | 1206 | * | BLOW UP DISPLAY SEQUENCE | |
| 007C | 04F9 | 010001111 | | 1207 | BLOWUPA | BL | BLUPKY |

TABLE I-9 (cont)

| | | | | | | |
|---|---|---|---|---|---|---|
| 0079 | 04F2 | 1000010110 | 2070 | 1208 | | ACACC | | |
| 0073 | 04E5 | 0011111000 | | 1209 | BLOWUP | BRANCH | BLOWUPA | SEQUENCE COMPLETE ? |
| 0067 | 04CE | 1011111111 | | 1210 | | TAM | | YES BRANCH |
| 004F | 049E | 0001101111 | 1207 | 1211 | ASTPHALF | CALL | DISPSAVE | |
| 001E | 003C | 1100001101 | 1227 | 1212 | | TCMIY | 4 | CONSTANT,SHIFT LEFT,SINGLE |
| 0030 | 04FA | 0011000001 | 1199 | 1213 | | BRANCH | ASTPD002 | |
| 0074 | 04F5 | 1011111110 | | 1214 | | BULLSEYE,BLOWUP DISPLAY SEQUENCE | | |
| | | | | 1215 | * | | | |
| 0075 | 04EA | 1100001101 | 1227 | 1216 | BUEYBLUP | CALL | DISPSAVE | |
| 0068 | 04D6 | 0011101101 | | 1217 | | TCMIY | 11 | CONSTANT,SHIFT RIGHT,DOUBLE |
| 0057 | 04AF | 1000000011 | 1192 | 1218 | | BRANCH | BULLSUBR | |
| | | | | 1219 | * | RANDOM THINKER DISPLAY SEQUENCE | | |
| 002E | 04DC | 1100001101 | 1227 | 1220 | RANTHINK | CALL | DISPSAVE | |
| 005C | 04B9 | 0011000000 | | 1221 | | TCMIY | 0 | RANDOM,SINGLE |
| 0038 | 04F0 | 0011000100 | | 1222 | | TCMIY | 2 | TWO GROUPS |
| 0070 | 04E1 | 0011101101 | | 1223 | | TCMIY | 11 | |
| 0061 | 04C2 | 0011001101 | | 1224 | | TCMIY | 10 | |
| 0043 | 0486 | 0100010101 | | 1225 | | | | |
| 0006 | 048C | 1000010000 | | 1226 | DISPE1 | BL | DISPE | |
| 000D | 049A | 0100100000 | | 1227 | DISPSAVE | LDX | 4 | DISPLAY DATA FILE |
| 001B | 0487 | 0010000000 | | 1228 | | TCY | 0 | |
| 0037 | 04EF | 0001010010 | | 1229 | | TMA | | |
| 006E | 04DD | 0000110000 | | 1230 | | XDA | | |
| 005D | 04BA | 0011010111 | | 1231 | | TCMIY | 15 | SAVE IN DAM |
| 0034 | 04F9 | 0010101101 | | 1232 | | YNEC | 10 | CLEAR DATA FILE |
| 003A | 04F5 | 0011100101 | | 1233 | | BRANCH | DSAVE1 | |
| 0074 | 04E9 | 1000110110 | 1229 | 1233 | | | | |
| 0069 | 04D2 | 0100111110 | | 1234 | DSAVE1 | LDX | 4 | SAVE 9 DIGITS |
| 0053 | 04A6 | 0001000010 | | 1235 | | TCY | 4 | |
| 0026 | 04CC | 0001010001 | | 1236 | | TMA | | |
| 004C | 0499 | 0001000011 | | 1237 | | TCY | 12 | |
| 0018 | 04B0 | 0000110010 | | 1238 | | XDA | | |
| 0031 | 04E3 | 0001100001 | | 1239 | | TCY | 8 | SAVE E.Q. SEGMENT |
| 0062 | 04C5 | 0000000011 | | 1240 | | TMA | | |
| 0045 | 048A | 0000110010 | | 1241 | | XDA | | |
| 0004 | 0499 | 0001001001 | | 1242 | | TCY | 10 | SAVE TMR H SEGMENT |
| 0015 | 0490 | 0001000011 | | 1243 | | TMA | | |
| 002B | 04D7 | 0010101110 | | 1244 | | XDA | | |
| 0056 | 04AD | 0001000001 | | 1245 | | TCY | 2 | |
| 002C | 04D8 | 0000011001 | | 1246 | | TMA | | |
| 0058 | 04B1 | 0100010110 | | 1247 | DSAVE2 | LDX | DISPLAYX | SAVE OPERAND SEGMENT LATCH |

TABLE I-9 (cont)

| | | | | | | |
|---|---|---|---|---|---|---|
| 0030 | 04F0 | 001001000 | | 1248 | | TCY | 1 |
| 0060 | 04C1 | 001100000 | | 1249 | | TCMIY | 0 |
| 0041 | 04A2 | 001100000 | | 1250 | | TCMIY | 0 |
| 0002 | 0484 | 001101111 | | 1251 | | TCMIY | 15 |
| 0005 | 0488 | 001101000 | | 1252 | | TCMIY | 0 |
| 0008 | 0497 | 010111111 | | 1253 | | RETN | |
| 0017 | 04AF | 010011000 | RANS | 1254 | | LDX | RANX |
| 002F | 04BF | 001100011 | | 1255 | | TCY | 12 |
| 005E | 04BD | 000110010 | RAN1 | 1256 | | IMAC | |
| 003C | 04FA | 000101111 | | 1257 | | TAM | |
| 0078 | 04F1 | 011101001 | | 1258 | | ALEC | 9 |
| 0071 | 04E2 | 100111011 | | 1259 | | BRANCH | RAN2 |
| 0063 | 04C6 | 001110110 | | 1260 | | ACACC | 6 |
| 0047 | 048E | 000101101 | | 1261 | | TAMIYC | |
| 000E | 049C | 100111011 | | 1262 | | BRANCH | RAN2 |
| 001D | 04BH | 101011110 | | 1263 | | BRANCH | RAN1 |
| 003B | 04F7 | 010111111 | | 1264 | | RETN | |
| 0076 | 04ED | 001101011 | | 1265 | | TCY | 13 |
| 006D | 04DA | 000010001 | | 1266 | | TMA | |
| 005A | 04B6 | 001110100 | | 1267 | | ACACC | 2 |
| 0036 | 04EC | 000101111 | | 1268 | | TAM | |
| 006C | 04D9 | 111011110 | | 1269 | | CALL | RAN1 |
| 0059 | 04R2 | 001000111 | | 1270 | | TCY | 14 |
| 0032 | 04E4 | 000101001 | | 1271 | | TMA | |
| 0064 | 04C9 | 001110010 | | 1272 | | ACACC | 4 |
| 0049 | 0492 | 000101111 | | 1273 | | TAM | |
| 0012 | 04A4 | 111011110 | | 1274 | | CALL | RAN1 |
| 0025 | 04C8 | 010011000 | | 1275 | | LDX | 8 |
| 004A | 04C8 | 001100001 | | 1276 | | TCY | 8 |
| 0014 | 04E4 | 000110010 | TIMER1 | 1277 | | IMAC | |
| 0029 | 04D3 | 000101111 | | 1278 | | TAM | |
| 0052 | 04A5 | 011101001 | | 1279 | | ALEC | 9 |
| 0024 | 04C8 | 100011100 | | 1280 | | BRANCH | TIMER3 |
| 0048 | 0491 | 000000110 | | 1281 | | CLA | |
| 0010 | 04A0 | 000001100 | | 1282 | | TAMDYN | |
| 0021 | 04C3 | 001011100 | | 1283 | | YNEC | 3 |
| 0042 | 0485 | 100010100 | | 1284 | | BRANCH | TIMER1 |
| 0009 | 0488 | 001100010 | | 1285 | | TCY | 4 |
| 0013 | 04A7 | 001101001 | | 1286 | | TCMIY | 9 |
| 0013 | 04A7 | 001101001 | | 1287 | | TCMIY | 9 |
| 0027 | 04CF | 001101001 | | 1288 | | TCMIY | 9 |

TEMP GROUP COUNT
SUB GROUP COUNT
INPUT DATA
SCAN COUNT

TABLE I-9 (cont)

| PC | LOC. | INSTR. | BRLN. | LINE | | SOURCE STATEMENT | | COMMENTS |
|---|---|---|---|---|---|---|---|---|
| 004E | 049D | 001001100 | | 1289 | | TCY | 3 | |
| 001C | 04AA | 000101011 | | 1290 | TIMER3 | TYA | | |
| 0039 | 04F3 | 010010000 | | 1291 | | LDX | 4 | |
| 0072 | 04E5 | 001000011 | | 1292 | | TCY | 12 | |
| 0065 | 04CA | 000100010 | | 1293 | | TBIT | 1 | TEST FOR TIMER ENABLE FLAG |
| 0048 | 0496 | 100110100 | 1298 | 1294 | | BRANCH | TIMER3F | FLAG SET BRANCH |
| 0016 | 04AC | 001000001 | | 1295 | | TCY | 8 | |
| 005A | 04DB | 001000110 | | 1296 | | CLA | | CLEAR TIMER DIGIT |
| 005A | 04B5 | 101001101 | 1311 | 1297 | | BRANCH | TIMER3F | |
| 0034 | 04E6 | 001110001 | | 1298 | TIMER3F | ACACC | 9 | HUNDRED MULTIPLE SCAN ? |
| 0068 | 04D1 | 100100000 | 1320 | 1299 | | BRANCH | TIMER4 | NO BRANCH |
| 0051 | 04A2 | 001110010 | | 1300 | | ACACC | 2 | BLOW UP OVERFLOW ? |
| 0022 | 04CU | 001100011 | 1309 | 1301 | | BRANCH | TIMER3AA | NO BRANCH |
| 0044 | 0489 | 001000111 | | 1302 | | TCY | 14 | |
| 0008 | 0490 | 001100011 | | 1303 | | MNEZ | | BLOW UP MODE ? |
| 0011 | 04A3 | 100110011 | 1309 | 1304 | | BRANCH | TIMER3AA | NO BRANCH |
| 0023 | 04C7 | 001110011 | | 1305 | | ACACC | 8 | |
| 0046 | 048D | 010011060 | | 1306 | | LDX | 6 | |
| 000C | 049A | 001100101 | | 1307 | | TCY | 10 | |
| 0019 | 0483 | 101110011 | 1298 | 1308 | | BRANCH | BLOWUP | START BLOWUP SEQUENCE |
| 0033 | 04E7 | 001000001 | | 1309 | TIMER3AA | TCY | 8 | UPDATE TIMER SEGMENT |
| 0066 | 04CD | 000010010 | | 1310 | TIMER3B | IMAC | | |
| 004D | 049A | 000101111 | | 1311 | | TAM | | |
| 001A | 04BU | 010011110 | | 1312 | | LDX | 3 | STATUS LATCH |
| 0035 | 04EA | 010100011 | | 1313 | | SBIT | 0 | PRE-CLEAR H SEGMENT |
| 006A | 04D5 | 001010100 | | 1314 | | RBIT | 7 | MODULO 8 COUNT ? |
| 0055 | 04AA | 011101110 | | 1315 | | ALEC | | NO BRANCH |
| 002A | 04D4 | 100010000 | 1320 | 1316 | | BRANCH | TIMER4 | SET H SEGMENT |
| 0054 | 04D9 | 010010000 | | 1317 | | SBIT | 0 | |
| 0028 | 04D0 | 010010000 | | 1318 | | LDX | 4 | |
| 0950 | 04A1 | 001100010 | | 1319 | | TCMIY | 0 | SET COUNT TO ZERO |
| 0020 | 04C0 | 010000010 | 0625 | 1320 | TIMER4 | BL | TIMER4A | |
| 0040 | 04B1 | 100010010 | | 1321 | | | | |

TABLE I-10

| PC | LOC. | INSTR. | BRLN. | LINE | NAME | TITLE | COMMENTS |
|---|---|---|---|---|---|---|---|
| 0000 | 0500 | 001111011 | | 1323 | INSREM | ACACC | 13 |
| 0001 | 0503 | 001001110 | | 1324 | CHKANS | TCY | 7 | INSERT NEW DIGIT |
| 0003 | 0507 | 000000011 | | 1325 | SMSDIA | XMA | | |

TABLE I-10 (cont)

| | | | | | | |
|---|---|---|---|---|---|---|
| 0007 | 050F | 00000100 | | 1326 | | DYN |
| 000F | 051F | 00101010 | | 1327 | | YREC |
| 001F | 053F | 10000011 | | 1328 | | BRANCH SMSDIA |
| 003F | 057F | 01011111 | 1325 | 1329 | | RETN 9 |
| 007F | 0576 | 00100100 | | 1330 | CHKBOX | TCY 9 |
| 007E | 0579 | 00101001 | | 1331 | | TMA |
| 007D | 057A | 00100000 | | 1332 | | TBIT 0 |
| 0073 | 0576 | 10111100 | | 1333 | | BRANCH CHKAN2 |
| 0077 | 056E | 00110111 | 1338 | 1334 | | ACACC 14 |
| 006F | 055E | 00110010 | | 1335 | | TBIT 1 |
| 005F | 053E | 10111100 | 1338 | 1336 | | BRANCH CHKAN2 |
| 003E | 057C | 00111100 | | 1337 | | ACACC 4 |
| 007C | 0579 | 00111010 | | 1338 | CHKAN2 | TAY |
| 0079 | 0572 | 01001000 | | 1339 | | LDX 8 |
| 0073 | 0566 | 00010001 | | 1340 | | TMA 4 |
| 0067 | 054E | 01000110 | | 1341 | | LDX 7 |
| 004F | 051E | 01011111 | | 1342 | | RETN |
| 001E | 053C | 00101000 | | 1343 | | TCY 9 |
| 003C | 0575 | 10111110 | | 1344 | | MNEA |
| 007A | 0575 | 10010000 | 1449 | 1345 | DECDIG | BRANCH ALERT 9 |
| 0075 | 056A | 00101010 | | 1346 | | TCY 4 |
| 006B | 0556 | 01001000 | | 1347 | | LDX 7 |
| 0057 | 052E | 00000111 | | 1348 | | DMAN |
| 002E | 055C | 10011001 | 1426 | 1349 | | BRANCH CHKAN1 |
| 005C | 0539 | 01010010 | | 1350 | | TCY 13 |
| 003A | 0570 | 00010000 | | 1351 | | LDX 0 |
| 0070 | 0561 | 11000000 | | 1352 | | CALL INSREM |
| 0061 | 0542 | 00101001 | | 1353 | | TCY 9 |
| 0043 | 0506 | 01001000 | | 1354 | | LDX 8 |
| 0006 | 050C | 00011000 | | 1355 | | MNEZ |
| 0000 | 0518 | 10101011 | 1360 | 1356 | | BRANCH NOINC 11 |
| 0018 | 0537 | 00101101 | | 1357 | | TCY |
| 0037 | 056F | 00101110 | | 1358 | | IMAC |
| 006F | 055D | 00110010 | | 1359 | | TAM |
| 005D | 0534 | 00101001 | | 1360 | NOINC | TCY 9 |
| 0034 | 0574 | 00110001 | | 1361 | | TCMIY 0 |
| 0074 | 0569 | 00110010 | | 1362 | | IMAC |
| 0069 | 0552 | 00101111 | | 1363 | | TAM |
| 0053 | 0526 | 01000000 | | 1364 | SHOW | CALL NOSCAN |
| 0026 | 054C | 11110111 | 0007 | 1365 | | |
| 004C | 0519 | 00100111 | | 1366 | | TCY 14 INCREASE SET |

TABLE I-10 (cont)

| | | | | | | |
|---|---|---|---|---|---|---|
| 0018 | 053C | 010000111 | | 1367 | | CALLL | SHOWVAR |
| 0031 | 0563 | 110001100 | 1954 | 1368 | | | |
| 0062 | 0545 | 001111111 | | 1369 | | ACACC | 15 |
| 0045 | 0504 | 101010011 | 1369 | 1370 | | BRANCH | SHOW |
| 0004 | 0514 | 010010000 | | 1371 | | LDX | 4 |
| 0015 | 0528 | 001001011 | | 1372 | | TCY | 13 |
| 0028 | 0557 | 000100000 | | 1373 | | TBIT | 0 |
| 0054 | 0529 | 100010100 | 1606 | 1374 | | BRANCH | SHOWR |
| 002C | 0554 | 001100111 | | 1375 | | TCY | 14 |
| 0058 | 0531 | 010001000 | | 1376 | | LDP | 5 |
| 0030 | 0560 | 001010010 | | 1377 | | TBIT | 3 |
| 0060 | 0541 | 101010011 | 0757 | 1378 | | BRANCH | ELCNXT |
| 0041 | 0502 | 010100011 | | 1379 | USRER1 | CALLL | BLANKD |
| 0002 | 0504 | 111111011 | 1079 | 1380 | | | |
| 0005 | 0504 | 000100111 | | 1381 | | TCY | 14 |
| 000A | 0517 | 000010000 | | 1382 | | TRIT | 0 |
| 0017 | 052F | 101111000 | 1587 | 1383 | | BRANCH | USENXT |
| 002F | 055F | 001000001 | | 1384 | | TRIT | 2 |
| 005E | 0530 | 000100110 | 0031 | 1385 | | LDP | 7 |
| 003C | 0578 | 010000011 | | 1386 | | BRANCH | MOXNXT |
| 0078 | 0571 | 100000011 | | 1387 | | LDP | 12 |
| 0071 | 0562 | 001000010 | | 1388 | | TRIT | 1 |
| 0063 | 0546 | 101111000 | 1645 | 1389 | | BRANCH | MEMNXT |
| 0047 | 050E | 010000111 | | 1390 | | CALLL | CLCOM |
| 000E | 051C | 110000000 | 1970 | 1391 | | | |
| 0010 | 0537 | 000100010 | | 1392 | | TCY | 4 |
| 003A | 0577 | 010101000 | | 1393 | | SBIT | 0 |
| 0077 | 056D | 001010000 | | 1394 | | LDX | A |
| 006D | 0554 | 001000011 | | 1395 | | TCY | 12 |
| 0058 | 0534 | 001100010 | | 1396 | | TCMIY | 4 |
| 0036 | 056C | 001100010 | | 1397 | | TCMIY | 0 |
| 006C | 0559 | 001001100 | | 1398 | ERRELP | LDX | 8 |
| 0059 | 0532 | 001010001 | | 1399 | USRNX1 | TCY | 9 |
| 0032 | 0564 | 001010101 | | 1400 | | TMA | |
| 0064 | 0549 | 010001011 | | 1401 | | RBIT | 3 |
| 0049 | 0512 | 001110000 | | 1402 | | LDP | 9 |
| 0012 | 0524 | 001000001 | | 1403 | | ACACC | 8 |
| 0025 | 0544 | 100000000 | 1220 | 1404 | | BRANCH | RANTHINK |
| 004A | 0515 | 010101000 | 1190 | 1405 | | BRANCH | BULLSEYE |
| 0015 | 0528 | 010100100 | | 1406 | SHOWR | RBIT | 0 |
| 0029 | 0553 | 010001111 | | 1407 | | CALLL | CLCOM |

TABLE I-10 (cont)

| | | | | | | |
|---|---|---|---|---|---|---|
| 0052 | 0525 | 110000001 | 1970 | | TCY | 8 |
| 0024 | 0548 | 001000001 | | | TCMIY | 8 |
| 0048 | 0511 | 001100001 | | | CALLL | BLANKD |
| 0010 | 0520 | 010001111 | | | | |
| 0021 | 0543 | 111111011 | 1979 | | TCY | 7 |
| 0042 | 0505 | 001001110 | | | YMCY | 5 |
| 0009 | 0508 | 011111010 | | | LDX | G |
| 0004 | 0513 | 010010110 | | | TMA | |
| 0013 | 0527 | 001010001 | | | YMCY | 9 |
| 0027 | 054F | 011111001 | | | LDX | A |
| 004E | 0510 | 010010000 | | | TAMDYN | |
| 001C | 0538 | 000101100 | | SHOWR1 | YNEC | |
| 0039 | 0573 | 001011010 | | | BRANCH | 5 |
| 0072 | 0565 | 100000100 | 1414 | | TCMIY | SHOWR1 |
| 0065 | 054A | 001100011 | | | CALLL | 12 |
| 0048 | 0516 | 010000110 | | | | LEAD0 |
| 0016 | 052C | 110001011 | 0990 | | BRANCH | SHOW |
| 002D | 0538 | 101010011 | 1364 | CHKAN1 | BL | ELNOP2 |
| 005A | 0535 | 010001010 | | | | |
| 0034 | 0568 | 101001010 | 0716 | WHTBX3 | CALLL | SETEQ |
| 0068 | 0551 | 010001000 | | | | |
| 0051 | 0522 | 110010000 | 0246 | CNTDIG | LDX | B |
| 0022 | 0544 | 010011000 | | | TCY | 0 |
| 0044 | 0509 | 001000000 | | | CLA | |
| 000A | 0510 | 000000110 | | | ACACC | 2 |
| 0011 | 0523 | 001110010 | | | MNEZ | |
| 0023 | 0547 | 001100011 | | CNTDG1 | BRANCH | CNTDG2 |
| 0046 | 050D | 101001101 | | | IYC | 15 |
| 000C | 051A | 000001010 | | | ACACC | CNTDG1 |
| 0019 | 0533 | 001111111 | | | BRANCH | 1 |
| 0033 | 0567 | 100100011 | 1440 | | ACACC | 9 |
| 0066 | 054D | 001111000 | | CNTDG2 | TCY | A |
| 004D | 051A | 001010001 | | | LDX | |
| 001A | 0534 | 010010000 | | | TAM | |
| 0035 | 056B | 010101000 | | | RETN | |
| 006A | 0555 | 001101111 | | OTHOPF | TCY | 14 |
| 0055 | 052A | 010101010 | | | TRIT | 3 |
| 002A | 0554 | 001010001 | | | BRANCH | ERRELF |
| 0054 | 0529 | 101101100 | 1398 | | BL | BOXML7 |
| 0028 | 0550 | 010000001 | | | | |
| 0050 | 0521 | 100101010 | 1182 | | | |

TABLE I-10 (cont)

```
0020  0540  010000010  1449
0040  0501  100000000  1450
```

TABLE I-11

```
PC    LOC    INSTR.        BRLN.   LINE   NAME      RL      ERROR
                                          SOURCE STATEMENT
                                          NAME      TITLE           COMMENTS 0000  0560   001001110            1452   NUMGUESS  TCY      7
0001  0583   000000110            1453   NGSUBR    CLA
0003  0587   010010000            1454   NG0       LDX      4
0007  058F   001111111            1455             ACACC    15      BLANK DISPLAY DATA FILE
000F  058E   000010110            1456             TAM
001F  058E   010011110            1457             LDX      1
003F  05FF   001111000            1458             ACACC            CLEAR STATUS LATCHES
007F  05FF   000101100            1459             TAMDYN   1
007E  05FD   100000011            1460             BRANCH           NG0
007D  05FA   010111111            1461             RETN
0074  05F6   010010000            1462   NGRM      LDX      4
0077  05FE   010010000            1463             TCY      0
006F  05CE   001101111            1464             TCMIY    15
005F  05AE   001101001            1465             TCMIY    9
005F  05FC   001101010            1466             TCY      5
0079  05F9   001101000            1467             TCMIY    1
0073  05F6   001101000            1468             TCMIY    0
0067  05CE   001001000            1469             TCMIY    0
004F  059F   001001000            1470             TCY      1
001E  058C   010011000            1471   NG1       LDX      RANX
003D  05FF   011110011            1472             YMCY     12
007F  05FF   000010001            1473             TMA
007A  05F5   010010010            1474             LDX      NGX
0075  05EA   011110010            1475             YMCY     4
006B  05D6   000101100            1476             TAMDYN           COPY RANDOM NUMBER
0057  05AE   001011100            1477             YNEC     3
002E  05CC   101001111            1478             BRANCH           NG1
005C  0599   000110011            1479             MNEZ     0       IS MSD = 0 ?
003B  05F0   100001101            1480             BRANCH           NG2A
0070  05E1   000101111            1481   NG2       TAM              COPY LSD TO MSD
0061  05C2   000110010            1482             IMAC             INCREMENT MSD
0043  0586   011101000            1483             ALEC     1       WAS MSD = 0 ?
0006  058C   101110000            1484             BRANCH           NG2       YES BRANCH
```

TABLE I-11 (cont)

| | | | | | | | |
|---|---|---|---|---|---|---|---|
| 000D | 0593 | 001000000 | | 1485 | | TCY | 0 | CLEAR NUMBER OF GUESSES |
| 001B | 05B7 | 001101111 | | 1486 | | TCMIY | 15 | |
| 0037 | 05EF | 001100000 | | 1487 | | TCMIY | 0 | |
| 006E | 05DD | 010010000 | | 1488 | | LDX | 4 | |
| 005D | 05BA | 001001100 | | 1489 | | TCY | 3 | |
| 003A | 05F4 | 001100101 | | 1490 | | TCMIY | OPAREN | OP2 = BOX |
| 0074 | 05E9 | 001101101 | | 1491 | | TCMIY | CPAREN | |
| 0069 | 05D2 | 010010010 | | 1492 | | LDX | NGX | |
| 0053 | 05A6 | 001010010 | | 1493 | | TCY | 1 | |
| 0026 | 05CC | 001101000 | NG13A | 1494 | | IMAC | | INCREMENT NUMBER OF GUESSES |
| 004C | 0599 | 001010111 | | 1495 | | TAM | | |
| 0018 | 05B0 | 000101111 | | 1496 | | ALEC | 0 | BLANK TO 1 FIX |
| 0031 | 05E3 | 011000110 | | 1497 | 1494 | BRANCH | NG13A | |
| 0062 | 05C5 | 011010001 | | 1498 | | ALEC | 9 | |
| 0045 | 05B4 | 100010000 | | 1499 | 1506 | BRANCH | NG13B | |
| 000A | 0594 | 000000110 | | 1500 | | CLA | | |
| 0015 | 05AB | 100100110 | | 1501 | | TAMDYN | | |
| 0028 | 05D7 | 100100110 | | 1502 | 1494 | BRANCH | | |
| 0056 | 05AD | 001010010 | | 1503 | | TCY | 0 | |
| 002C | 05DB | 001101101 | | 1504 | | TCMIY | 0 | |
| 0058 | 05B1 | 010111111 | NG13B | 1505 | | RETN | | |
| 0030 | 05E0 | 010010110 | NG4 | 1506 | 0041 | BL | SCAN | |
| 0060 | 05C1 | 010000111 | | 1507 | | | | |
| 0041 | 05B2 | 101101111 | NG9A | 1508 | | MNEA | | |
| 0002 | 05B4 | 000001001 | | 1509 | 1516 | BRANCH | NG10 | ACC = GUESS(1) ? |
| 0005 | 05B8 | 101111000 | | 1510 | | ALEC | 0 | NO BRANCH |
| 000B | 0597 | 011100000 | | 1511 | 1518 | BRANCH | NGOUT | ACC = 0 ? |
| 0017 | 05AF | 101100011 | | 1512 | | TCY | 1 | YES BRANCH |
| 002F | 05DF | 001000000 | | 1513 | | IMAC | | |
| 005E | 05BD | 001100010 | | 1514 | | TCY | 4 | ACC = OP1(2)+1 |
| 003C | 05FB | 000000001 | NG10 | 1515 | | ALFH | | ACC:MEM(GUESS(1) OR GUESS(2)) |
| 007A | 05F1 | 000001101 | | 1516 | 1521 | BRANCH | NG11 | L.E. BRANCH |
| 0071 | 05E2 | 100011110 | | 1517 | 1488 | CALL | NG3 | |
| 0063 | 05C6 | 111011110 | NGOUT | 1518 | 1220 | BL | RANTHINK | |
| 0047 | 05BF | 010001000 | | 1519 | | | | |
| 000E | 059C | 100101110 | | 1520 | | TCY | 5 | |
| 0010 | 05BE | 001010100 | NG11 | 1521 | | TMA | | |
| 003B | 05F7 | 000010001 | | 1522 | | ALEC | 1 | RES(1)=1 ? |
| 0076 | 05ED | 001010101 | | 1523 | 1535 | BRANCH | NG13 | YES BRANCH |
| 006D | 05DA | 100010000 | | 1524 | | TCY | 6 | |
| 005B | 05B6 | 001000110 | | 1525 | | | | |

TABLE I-11 (cont)

| | | | | | | |
|---|---|---|---|---|---|---|
| 0036 | 05EC | 000101001 | 1526 | | TMA | | ACC = RES(2) |
| 006C | 05D9 | 001001100 | 1527 | | TCY | 3 | ACC = GUESS(1) ? |
| 0059 | 05B2 | 000001001 | 1528 | | MNEA | | NO BRANCH |
| 0032 | 05EU | 100100101 | 1529 | 1533 | BRANCH | NG12 | |
| 0060 | 05C9 | 001001110 | 1530 | | TCY | 7 | ACC = RES3 |
| 0049 | 05D2 | 001010010 | 1531 | | TMA | | |
| 0012 | 05D4 | 001000010 | 1532 | | TCY | 4 | ACC;MEM(GUESS(1) OR GUESS(2) |
| 0025 | 05CB | 000000001 | 1533 | NG12 | ALEM | | |
| 0044 | 05D5 | 101000011 | 1534 | | BRANCH | NGOUT | |
| 0014 | 05D8 | 001001100 | 1535 | 1518 | TCY | 3 | ACC = GUESS(1) ? |
| 0029 | 05D3 | 110010011 | 1536 | 1545 | CALL | NG13C | |
| 0052 | 05D5 | 000001001 | 1537 | NG13 | MNEA | | NO BRANCH |
| 0023 | 05CB | 101001100 | 1538 | 1560 | BRANCH | NG18 | |
| 0048 | 05D1 | 001001010 | 1539 | | TCY | 4 | ACC = GUESS(2) ? |
| 0010 | 05A0 | 110001011 | 1540 | 1545 | CALL | NG13C | |
| 0021 | 05C3 | 000001001 | 1541 | | MNEA | | NO BRANCH |
| 0042 | 05B5 | 101000100 | 1542 | 1560 | BRANCH | NG18 | |
| 0009 | 05CB | 110000010 | 1543 | 1452 | CALL | NUMGUESS | |
| 0004 | 05D3 | 001010000 | 1544 | | TCY | 1 | |
| 0013 | 05D7 | 010010010 | 1545 | NG13C | LDX | NGX | |
| 0027 | 05CF | 000001001 | 1546 | | TMA | | |
| 0009E | 05D0 | 010010001 | 1547 | | LDX | A | |
| 001C | 05D8 | 010010000 | 1548 | | RETN | | |
| 0039 | 05F3 | 010111111 | 1549 | | TAMDYN | | MOVE NUMBER OF GUESSES TO OP1 |
| 0072 | 05E5 | 000101100 | 1550 | 1545 | BRANCH | NG13C | |
| 0065 | 05CA | 100010011 | 1551 | | CALLL | NOSCAN | |
| 004B | 05C8 | 010000000 | 1552 | | | | |
| 0016 | 05A5 | 111100111 | 1553 | 0047 | CALLL | SHOWTIME | |
| 0020 | 05AC | 010000111 | 1554 | | | | |
| 005A | 05DB | 111001110 | 1555 | 1953 | ACACC | 15 | |
| 0034 | 05A5 | 101111001 | 1556 | | BRANCH | NG13D | |
| 0068 | 05EB | 101111101 | 1557 | 1551 | CALL | NG4M | |
| 0051 | 05D1 | 111111011 | 1558 | 1462 | RL | ASTRODCM | |
| 0022 | 05A2 | 010001001 | 1559 | | | | |
| 000A | 05CD | 100111111 | 1560 | 1197 | ALEM | | ACC;MEM(GUESS(1) OR GUESS(2) |
| 0011 | 05B2 | 000000001 | 1561 | | BRANCH | NG20 | L.E. BRANCH |
| 0023 | 05CU | 101001101 | 1562 | 1569 | TCY | 1 | |
| 0004C | 05A3 | 001001010 | 1563 | | YMCY | 2 | |
| 0046 | 05C7 | 011110100 | 1564 | | TMA | | MOVE GUESS TO OP1 |
| 000C | 05AO | 001010010 | 1565 | | YMCY | 12 | |
| 0019 | 05B3 | 000101100 | 1566 | | TAMDYN | | |

TABLE I-11 (cont)

| | | | | | | |
|---|---|---|---|---|---|---|
| 0033 | 05E7 | 10010001 | 1563 | | BRANCH | NG19 |
| 0066 | 05CD | 10101000 | 1577 | | BRANCH | NG22 |
| 004D | 059A | 00110110 | 1569 | NG20 | TCY | 5 | GUESS TO RESULT |
| 001A | 05B4 | 00111111 | 1570 | | TCMIY | 15 |
| 0035 | 05E8 | 01111011 | 1571 | NG21 | YMCY | 12 |
| 006A | 05D5 | 00010101 | 1572 | | TMA | |
| 0055 | 05AA | 01110100 | 1573 | | YMCY | 2 |
| 002A | 05D4 | 00010101 | 1574 | | TAMIYC | |
| 0054 | 05A9 | 01011111 | 1575 | | RETN | |
| 0028 | 05D0 | 11011101 | 1576 | | CALL | NG21 |
| 0050 | 05A1 | 11101110 | 1577 | NG22 | CALL | NG3 |
| 0020 | 05C0 | 01000001 | 1578 | | RL | BULLSEYE |
| 0040 | 0581 | 10000000 | 1579 | | | BOX TO OP2 |

TABLE I-12

SOURCE STATEMENT

| PC | LOC | INSTR. | BRLN. | LINE | NAME | TITLE | COMMENTS | |
|---|---|---|---|---|---|---|---|---|
| 0000 | 0600 | 00111111 | | 1581 | DISPAP | ACACC | 15 | |
| 0001 | 0603 | 10000010 | 1638 | 1582 | | BRANCH | DISPA4 | |
| 0003 | 0607 | 00110110 | | 1583 | | ACACC | 6 | |
| 0007 | 060F | 00010111 | | 1584 | | TAM | | |
| 001E | 061F | 00101001 | | 1585 | DISPA1 | TCY | 6 | |
| 001F | 063F | 00010100 | | 1586 | | TMA | | |
| 003F | 067F | 00010000 | | 1587 | | TCY | 1 | GET G |
| 007F | 067E | 00000100 | | 1588 | | MNFA | | ADDRESS GT |
| 007E | 067D | 10010101 | 1631 | 1589 | | BRANCH | DISPA3 | GT = G ? |
| 007D | 067A | 00000110 | | 1590 | | CLA | | NO BRANCH |
| 007A | 0676 | 00101111 | | 1591 | | TAM | | |
| 006F | 066F | 00101010 | | 1592 | | TCY | 5 | GT = 0 |
| 006E | 065E | 10000010 | | 1593 | | TMIT | 0 | |
| 005E | 063E | 00100001 | 1629 | 1594 | | BRANCH | DISPA2 | |
| 007C | 067C | 01000000 | | 1595 | | TCY | 8 | |
| 0079 | 0679 | 00100101 | 1453 | 1596 | | CALLL | NGSUBR | |
| 0078 | 0672 | 11000000 | | 1597 | OPERLY1 | CALLL | MOSCAN | |
| 0067 | 0666 | 01000000 | | 1598 | | | | |
| 004F | 064F | 11100111 | 0047 | 1599 | | TCY | 3 | |
| 001E | 061E | 01001100 | | 1600 | | CALLL | SHOWVAR | |
| 003C | 063C | 01000111 | | 1601 | | | | |
| 003D | 067B | 11001100 | 1952 | 1602 | | | | |
| 007A | 0675 | 00111111 | | 1603 | | ACACC | 15 | |

TABLE I-12 (cont)

| | | | | Label | Op | Operand | Comment |
|---|---|---|---|---|---|---|---|
| 0075 | 066A | 101110011 | 1598 | 1604 | | BRANCH | DSPDLY1 | |
| 006A | 065A | 001001001 | | 1605 | | TCY | 0 | |
| 0057 | 062E | 010011110 | | 1606 | | LDX | 1 | |
| 002E | 005C | 000000110 | | 1607 | | CLA | | CLEAR H FILE |
| 005C | 0639 | 000101111 | | 1608 | | TAM | | CLEAR DAM AND |
| 0039 | 0670 | 000001111 | | 1609 | | XDA | | |
| 0070 | 0661 | 010010000 | | 1610 | | LDX | 4 | RESTORE A FILE |
| 0061 | 0642 | 000101100 | | 1611 | | TAMDYN | | |
| 0043 | 0606 | 101010111 | 1606 | 1612 | DREST | BRANCH | DREST1 | |
| 0006 | 060C | 010010110 | | 1613 | DREST1 | LDX | H | |
| 000C | 0618 | 001010101 | | 1614 | | TCY | 10 | |
| 0018 | 0637 | 000011001 | | 1615 | | XDA | | |
| 0037 | 066F | 001000001 | | 1616 | | TCY | 8 | |
| 006F | 0650 | 000101111 | | 1617 | | TAM | | RESTORE TIMER H SEGMENT |
| 0050 | 063A | 000100011 | | 1618 | | XDA | | |
| 003A | 0674 | 000011000 | | 1619 | | TCY | 12 | |
| 0074 | 0669 | 000100010 | | 1620 | | TAM | | |
| 0069 | 0652 | 000101111 | | 1621 | | TCY | 4 | |
| 0053 | 0626 | 001001101 | | 1622 | | TAM | | RESTORE E,Q, SEGMENT |
| 0026 | 064C | 001011001 | | 1623 | | TCY | 11 | |
| 004C | 0610 | 000100100 | | 1624 | | XDA | | |
| 0018 | 0630 | 001000100 | | 1625 | | TCY | 2 | |
| 0031 | 0663 | 000101111 | | 1626 | | TAM | | RESTORE OPERAND SEGMENT LATCH |
| 0062 | 0645 | 010010000 | | 1627 | | LDX | 8 | ENTERED FROM DISPLAYS |
| 0045 | 0604 | 010000000 | | 1628 | | RL | SCANT | |
| 0004 | 0614 | 100000001 | 0029 | 1629 | DISPA2 | TCMIY | 8 | |
| 0015 | 0623 | 001100001 | 1585 | 1630 | | BRANCH | DISPA1 | |
| 0023 | 0657 | 000110010 | | 1631 | DISPA3 | IMAC | | |
| 0056 | 062D | 000101110 | | 1632 | | TAP | | |
| 002C | 0658 | 001110110 | | 1633 | | ACACC | 6 | GT + 1 |
| 0058 | 0631 | 000101000 | | 1634 | | TAY | | |
| 0031 | 0660 | 000101000 | | 1635 | | TMA | | |
| 0060 | 0641 | 001001100 | | 1636 | | TCY | 3 | FORM DATA ADDRESS |
| 0041 | 0602 | 010001111 | | 1637 | | TAM | | |
| 0002 | 0604 | 010000000 | | 1638 | DISPA4 | RL | DISPA4A | |
| 0005 | 060B | 100000001 | 1710 | 1639 | MEMGO | CALLL | CLREGB | PUT NEXT ARGUMENT |
| 0008 | 0617 | 010000111 | 2085 | 1640 | | | | |
| 0017 | 062F | 110111010 | | 1641 | | LDX | F | |
| 002F | 065F | 010011010 | | 1642 | | TCY | 15 | |
| 005F | 063D | 001001101 | | 1643 | | TCMIY | 0 | INTO INPUT DATA |
| 003D | 067B | 001100000 | | 1644 | | | | |

TABLE I-12 (cont)

| | | | | | | |
|---|---|---|---|---|---|---|
| 0078 | 0671 | 010001111 | | MEMNXT | CALLL | BLANK0 |
| 0071 | 0662 | 111111011 | 1079 | | CALLL | MEMCNT = PROBLEMS |
| 0063 | 0646 | 010000010 | | | | |
| 0047 | 060E | 111000010 | 0377 | | LDX | F |
| 000E | 061C | 010011010 | | | MMFA | |
| 0010 | 063A | 000001001 | | | BRANCH | MEM1 |
| 003A | 0677 | 100110110 | 1655 | | TCMIY | 0 |
| 0076 | 066D | 001100000 | | | BL | NXTMEM |
| 0060 | 065A | 010000110 | | | | |
| 0056 | 0636 | 100000010 | 0850 | MEM1 | IMAC | |
| 0036 | 066C | 000110010 | | | TAM | |
| 006C | 0659 | 000101111 | | | LDX | E |
| 0059 | 0632 | 010010010 | | | ACACC | 6 |
| 0032 | 0664 | 001110110 | | | BRANCH | MEM04 |
| 0064 | 0640 | 100100111 | 1675 | MEM2 | COMX | |
| 0040 | 0612 | 000000000 | | MEM3 | ACACC | 1 |
| 0012 | 0620 | 001111000 | | | BRANCH | MEM04 |
| 0025 | 0648 | 100100111 | 1675 | | ACACC | 1 |
| 0048 | 0615 | 001111000 | | | BRANCH | MEM50 |
| 0015 | 0628 | 101010011 | 1681 | | ACACC | 1 |
| 0028 | 0619 | 001111000 | | | BRANCH | MEM10 |
| 0019 | 0653 | 001111000 | | | ACACC | 1 |
| 0053 | 0625 | 101001100 | 1689 | | BRANCH | MEM10 |
| 0052 | 0608 | 010111111 | | | RETN | F |
| 0008 | 0611 | 010011111 | | | LDX | F |
| 0011 | 0620 | 110010010 | 1661 | | CALL | MEM3 |
| 0020 | 0643 | 001010011 | | | TCY | 15 |
| 0043 | 0605 | 000010010 | | | TMA | |
| 0005 | 060A | 001110011 | | | ACACC | 12 |
| 000A | 0613 | 100110011 | 1696 | MEM04 | BRANCH | MEM4 |
| 0013 | 0627 | 101001001 | 1660 | MEM041 | BRANCH | MEM2 |
| 0027 | 064F | 010000010 | | | TCY | 4 |
| 004F | 001D | 001010001 | | | TMA | |
| 001D | 063A | 000001001 | | | XDA | |
| 003A | 0673 | 000000100 | | | DYN | |
| 0073 | 0665 | 101001110 | 1676 | | BRANCH | MEM041 |
| 0065 | 064A | 100110110 | 1694 | | BRANCH | MEM4 |
| 004A | 0616 | 001001001 | | MEM50 | TCY | 9 |
| 0016 | 062C | 001001001 | | MEM591 | THA | |
| 002C | 065E | 001110101 | | | YMCY | 10 |
| 005A | 0635 | 011110101 | | | XDA | |
| 0034 | 066A | 011111100 | | | YMCY | 3 |

TABLE I-12 (cont)

| PC | LOC | INSTR. | BRL. | LINE | NAME | TITLE | COMMENTS |
|----|-----|--------|------|------|------|-------|----------|
| 0068 | 0651 | 00101001 |  | 1686 |  | YNEC | 4 |
| 0051 | 0622 | 10001011 | 1682 | 1687 |  | BRANCH | MEM591 |
| 0022 | 0644 | 10011011 | 1696 | 1688 |  | BRANCH | MEM4 |
| 0044 | 0609 | 00100111 |  | 1689 |  | TCY | 14 |
| 0008 | 0610 | 00010100 |  | 1690 |  | TMA |  |
| 0011 | 0623 | 01111010 |  | 1691 |  | YMCY | 5 |
| 0023 | 0647 | 00001101 |  | 1692 |  | XDA | 8 |
| 0046 | 060E | 01111001 |  | 1693 |  | YMCY | 9 |
| 000C | 061A | 00101001 |  | 1694 |  | YNEC |  |
| 0010 | 0633 | 13001000 | 1690 | 1695 |  | BRANCH | MEM101 |
| 0035 | 0667 | 01011111 |  | 1696 | MEM9 | RETN |  |
| 0066 | 0652 | 00010000 |  | 1697 |  | LDX | 4 |
| 000D | 061A | 00100010 |  | 1698 |  | TCY | 0 |
| 0014 | 0634 | 01000010 |  | 1699 |  | CALLL | EXRDM1 |
| 0035 | 0655 | 11111100 |  | 1700 |  |  |  |
| 0064 | 0655 | 01000110 |  | 1701 |  | TCY | 0 |
| 0055 | 0624 | 01100110 |  | 1702 |  | CALLL | LEAD0 |
| 002A | 0654 | 11000011 |  | 1703 |  |  |  |
| 0054 | 0629 | 00100011 |  | 1704 |  | TCY | 3 |
| 0028 | 0650 | 01000110 |  | 1705 |  | CALLL | LEAD0 |
| 0050 | 0621 | 11000111 |  | 1706 |  |  |  |
| 0020 | 0640 | 01000001 |  | 1707 |  | BL |  |
| 0040 | 0601 | 10111101 | 1132 | 1708 |  |  | MEM7 |

TABLE I-13

| PC | LOC | INSTR. | BRL. | LINE | NAME | TITLE | COMMENTS |  |
|----|-----|--------|------|------|------|-------|----------|--|
|  |  |  |  |  |  |  |  | SOURCE STATEMENT |
| 0000 | 0680 | 00101010 |  | 1710 | DISPAVA | TCY | 5 | ADDRESS MODE |
| 0001 | 0683 | 00100011 |  | 1711 |  | TRIT | 3 | CONSTANT DATA ? |
| 0003 | 0687 | 10101111 | 1723 | 1712 |  | BRANCH | DISPA5 | YES BRANCH |
| 0007 | 068F | 00010100 |  | 1713 |  | TCY | 3 |  |
| 000F | 069F | 00010100 |  | 1714 |  | TMA |  |  |
| 001F | 06BF | 00111011 |  | 1715 |  | ACACC | 14 | INPUT DATA = 2 |
| 003F | 06FF | 00010111 |  | 1716 |  | TAM |  |  |
| 007F | 06FF | 01010000 |  | 1717 |  | LDX | 4 |  |
| 007F | 06FD | 00010000 |  | 1718 |  | TCY | 9 |  |
| 007D | 06FA | 00010001 |  | 1719 |  | ACACC | 13 |  |
| 0073 | 06F6 | 00111011 | 1719 | 1720 | RNDMFILL | TANDYN |  |  |
| 0077 | 06EE | 10111101 | 1721 | 1721 |  | BRANCH | RNDMFILL |  |
| 006F | 06DE | 10010101 |  | 1722 |  | BRANCH | DISPC1 |  |

TABLE I-13 (cont)

| | | | | | | | |
|---|---|---|---|---|---|---|---|
| 005F | 06BE | 001000100 | | 1723 | DISPA5 | TCY | 2 | |
| 003E | 06FC | 000101010 | | 1724 | | TMY | | |
| 007C | 06F9 | 001101100 | | 1725 | | YNEC | 2 | SG = 2 ? |
| 0079 | 06F2 | 101011111 | 1729 | 1726 | | BRANCH | DISPA6 | NO BRANCH |
| 0073 | 06E6 | 001001100 | | 1727 | | TCY | 3 | |
| 0067 | 06CE | 001101111 | | 1728 | | TCMIY | 15 | INPUT BLANK |
| 004F | 069F | 001001100 | | 1729 | DISPA6 | TCY | 3 | |
| 001E | 06BC | 000101001 | | 1730 | | TMA | 5 | GET INPUT DATA |
| 003D | 06FA | 001010010 | | 1731 | | TCY | 1 | |
| 007A | 06F5 | 000100010 | | 1732 | | TBIT | 1 | |
| 0075 | 06FA | 100101011 | 1760 | 1733 | | BRANCH | SHRPFIL | SHIFT RIGHT BRANCH |
| 006B | 06D6 | 010010000 | | 1734 | | LDX | 4 | |
| 0057 | 06AE | 001001110 | | 1735 | | TCY | 7 | SHIFT LEFT |
| 002E | 06DC | 000000011 | | 1736 | | XMA | | |
| 005C | 06B9 | 000000100 | | 1737 | | DYN | | |
| 003A | 06F0 | 101011101 | 1747 | 1738 | | BRANCH | SHLC2 | SHIFT COMPLETE ? |
| 0070 | 06E1 | 010010110 | | 1739 | | LDX | DISPLAYX | NO BRANCH |
| 0061 | 06C2 | 001010000 | | 1740 | | TCY | 1 | |
| 0043 | 06B6 | 001001010 | | 1741 | | TMA | | GET GT |
| 0006 | 068C | 001010010 | | 1742 | | TCY | 6 | |
| 0000 | 068A | 010111111 | | 1743 | SHLLP | RETN | | |
| 001A | 0687 | 000001001 | | 1744 | | MNEA | | |
| 0037 | 06EF | 100011000 | 1754 | 1745 | | BRANCH | SHLC3 | GT = G ? |
| 006E | 06DD | 101100100 | 1788 | 1746 | | BRANCH | DISPC | NO BRANCH |
| 005D | 06BA | 001010010 | | 1747 | SHLC2 | YNEC | 4 | |
| 003A | 06F4 | 101101001 | 1750 | 1748 | | BRANCH | SHLC1 | |
| 0074 | 06E9 | 001001001 | | 1749 | | TCY | 9 | |
| 0069 | 06D2 | 001010010 | | 1750 | SHLC1 | YNEC | 8 | |
| 0053 | 06A6 | 100101110 | 1736 | 1751 | | BRANCH | SHLLP | |
| 0026 | 06CC | 001000010 | | 1752 | | TCY | 4 | |
| 004C | 0699 | 100101110 | 1736 | 1753 | | BRANCH | SHLLP | |
| 0018 | 06B0 | 001010010 | | 1754 | SHLC4 | TCY | 2 | |
| 0031 | 06E3 | 001001010 | | 1755 | | TMA | | |
| 0062 | 06C5 | 001111101 | | 1756 | | ACACC | 11 | V = S • SG |
| 0045 | 06BA | 000110001 | | 1757 | | CPAIZ | | |
| 000A | 0694 | 000001001 | | 1758 | | TAY | | |
| 0015 | 06AB | 100111101 | 1779 | 1759 | | BRANCH | DISPR | |
| 002A | 06D7 | 010010000 | | 1760 | SHRPFIL | LDX | A | |
| 0056 | 06AD | 001000000 | | 1761 | | TCY | 0 | SHIFT RIGHT |
| 002C | 06DA | 000000011 | | 1762 | | XMA | | |
| 0058 | 06B1 | 000000101 | | 1763 | | IYC | | |

TABLE I-13 (cont)

| | | | | | | |
|---|---|---|---|---|---|---|
| 0030 | 06E0 | 001011001 | | 1767 | 1764 | YNEC 0 |
| 0060 | 06C1 | 100000010 | | 1774 | 1765 | BRANCH SHRC1 |
| 0041 | 06B2 | 101111000 | | | 1766 | BRANCH SHRC4 SHIFT COMPLETE |
| 0002 | 0684 | 001011010 | | 1770 | 1767 | SHRC1 YNEC 5 |
| 0005 | 0688 | 100010101 | | | 1768 | BRANCH SHRC2 |
| 000B | 0697 | 001001001 | | | 1769 | TCY 0 |
| 0017 | 06AF | 001010101 | | | 1770 | YNEC 10 |
| 002F | 06DF | 100101100 | | 1762 | 1771 | SHRC2 BRANCH SHRLP |
| 005E | 06BD | 001001010 | | | 1772 | TCY 5 |
| 003C | 06FA | 100011100 | | | 1773 | BRANCH SHRLP |
| 0078 | 06F1 | 111110000 | | 1762 | 1774 | SHRC4 CALL SHLC3 |
| 0071 | 06E2 | 011101100 | | 1739 | 1775 | ALEC 1 GET GT |
| 0063 | 06C6 | 101100100 | | 1744 | 1776 | BRANCH DISPC GT = 1 ? YES BRANCH |
| 0047 | 068E | 001000100 | | | 1777 | TCY 2 |
| 000E | 069C | 000101010 | | | 1778 | THY |
| 001D | 06B8 | 001010100 | | 1785 | 1779 | DISPB YNEC 2 V = SG |
| 003B | 06F7 | 101101100 | | | 1780 | BRANCH DISPB1 V = 2 ? NO BRANCH |
| 0076 | 06ED | 001010001 | | | 1781 | TCY 8 |
| 006D | 06DA | 010010000 | | | 1782 | LDX 4 |
| 005B | 06B6 | 001101011 | | 1798 | 1783 | TCMIY DIVSFG GENERATE HALF DOTS FOR TIMER |
| 0036 | 06EC | 100010000 | | | 1784 | BRANCH DISPB3 |
| 006C | 06D9 | 000101011 | | | 1785 | DISPB1 TYA |
| 0059 | 06B2 | 011101000 | | | 1786 | ALEC 1 V = 0,1 ? |
| 0032 | 06E4 | 101010010 | | | 1787 | BRANCH DISPB2 YES BRANCH |
| 0064 | 06C9 | 001001000 | | | 1788 | TCY 8 |
| 0049 | 0692 | 010001001 | | | 1789 | LDX H |
| 0012 | 06A4 | 001100000 | | | 1790 | TCMIY 8 |
| 0025 | 06C8 | 001100001 | | | 1791 | DISPB2 TCY 8 GENERATE BLANK DOTS FOR TIMER |
| 0044 | 0695 | 001001110 | | | 1792 | LDX 4 |
| 0014 | 06AB | 001100001 | | | 1793 | TCMIY 8 |
| 0029 | 0603 | 100010000 | | | 1794 | BRANCH CPYD3 |
| 0052 | 0645 | 001001001 | | | 1795 | DISPB3 TCY 4 |
| 0024 | 0691 | 010010000 | | | 1796 | LDX 4 |
| 0048 | 06A0 | 001100111 | | | 1797 | TCMIY 14 GENERATE FULL DOTS FOR TIMER |
| 0010 | 06C3 | 001000111 | | | 1798 | TCY 8 |
| 0021 | 0685 | 001001110 | | | 1799 | LDX 9 |
| 0042 | 06A8 | 001100001 | | | 1800 | TCMIY 3 |
| 0004 | 06B3 | 010100011 | | 1801 | 1801 | CPYD3 SBIT |
| 0009 | 06A0 | 000000100 | | | 1802 | CPYD4 DYN |
| 0013 | 0647 | 100000100 | | | 1803 | BRANCH CPYD3 SET ALL STATUS LATCHES |
| 0027 | 06CF | 001001001 | | 1501 | 1804 | TCY 9 |

TABLE I-13 (cont)

| LOC | INSTR. | BRLN. | LINE | NAME | SOURCE STATEMENT | | COMMENTS |
|---|---|---|---|---|---|---|---|
| 004E | 0690 | 01010000 | | 1805 | CPY05 | LDX | 4 | |
| 001C | 06A8 | 00011010 | | 1806 | | I4AC | | IF DATA = 15, THEN |
| 0039 | 06F3 | 10101000 | 1836 | 1807 | | BRANCH | CPY07 | GO CLEAR THIS STATUS LATCH |
| 0072 | 06E5 | 00000100 | | 1808 | | DYN | | |
| 0065 | 06CA | 10101110 | 1805 | 1809 | | BRANCH | CPY05 | |
| 0048 | 0696 | 00010000 | | 1810 | DISPD | LDX | 4 | |
| 0016 | 06AC | 00101001 | | 1811 | | TCY | 9 | |
| 002D | 06D5 | 01010001 | | 1812 | | TMA | | |
| 005A | 06EA | 01011110 | | 1813 | | LDX | 1 | |
| 0034 | 06EA | 00010010 | | 1814 | | TCY | 4 | |
| 006A | 06D1 | 01010100 | | 1815 | | RSTT | 0 | |
| 0051 | 06A2 | 00111100 | | 1816 | | ACACC | 2 | |
| 0022 | 06C4 | 10000100 | | 1817 | | BRANCH | DISPE | |
| 0044 | 0689 | 01010100 | | 1818 | DISPE | SHIT | 0 | LOAD E.O. SEGMENT IF DATA G.T.9 |
| 0008 | 0690 | 01010110 | | 1819 | | LDX | DISPLAYX | |
| 0011 | 06A3 | 00100010 | | 1820 | | TCY | 4 | SC=1 |
| 0023 | 06C7 | 00000011 | | 1821 | | DMAN | | |
| 0046 | 06AD | 00000001 | | 1822 | | XMA | | |
| 000C | 0698 | 00000011 | 1829 | 1823 | | ALEM | DISPA | WAS SC = 0 ? |
| 0019 | 06B3 | 10001010 | | 1824 | | BRANCH | DISPLAY | YES BRANCH |
| | | | | 1825 | * | OUTPUT TO | NOSCAN | |
| | | | | 1826 | | CALLL | | |
| 0033 | 06E7 | 01000000 | 0047 | 1827 | | BRANCH | DISPE | |
| 0066 | 06CD | 11101111 | 1819 | 1828 | | ACACC | 8 | |
| 0040 | 069A | 10001000 | | 1829 | DISPA | TAM | | |
| 001A | 06B4 | 00110001 | | 1830 | | TCY | 2 | SC = MAX |
| 0035 | 06EA | 00010100 | | 1831 | | DMAN | | |
| 006A | 06D5 | 01001000 | | 1832 | | XMA | | |
| 0055 | 06AA | 00000111 | | 1833 | | BL | DISPAP | SG=1 |
| 002A | 06C3 | 00000011 | | 1834 | | | | |
| 0054 | 06A9 | 01000010 | 1581 | 1835 | CPY07 | LDX | X | |
| 0028 | 06D0 | 10000000 | | 1836 | | RSTT | 3 | |
| 0050 | 0641 | 01010100 | | 1837 | | BRANCH | CD006 | |
| 0020 | 06C0 | 01010111 | 1808 | 1838 | | | | |
| 0040 | 0681 | 10110010 | | | | | | |

TABLE I-14

| PC | LOC | INSTR. | BRLN. | LINE | NAME | TITLE | | COMMENTS |
|---|---|---|---|---|---|---|---|---|
| 0000 | 0700 | 01001101 | 1452 | 1840 | FORCEOUT | CALLL | NUMGUESS | BLANK DISPLAY DATA FILE |
| 0001 | 0703 | 11000000 | | 1841 | | | | |

SOURCE STATEMENT

TABLE I-14 (cont)

| | | | | | | | | |
|---|---|---|---|---|---|---|---|---|
| 0003 | 0707 | 001001000 | | 1842 | FORM | TCY | 1 | |
| 0007 | 070F | 010011000 | | 1843 | FORMA | LDX | RANX | |
| 000F | 071F | 011111011 | | 1844 | | YMCY | 13 | |
| 001F | 073F | 000101001 | | 1845 | | TMA | | MOVE RANDOM NUMBER TO OP1 |
| 003F | 077F | 010010000 | | 1846 | | LDX | 4 | |
| 007F | 077F | 011111000 | | 1847 | | YMCY | 1 | |
| 007E | 077D | 000101100 | | 1848 | | TAMDYN | | |
| 007D | 077A | 100000111 | 1843 | 1849 | | BRANCH | FORMA | |
| 007B | 0776 | 000100000 | | 1850 | | TCY | 0 | |
| 0077 | 076E | 001111100 | | 1851 | | ACACC | 3 | LOWER LIMIT IS 30 |
| 006F | 075E | 011100110 | | 1852 | | ALEC | 6 | UPPER LIMIT IS 60 |
| 005F | 073E | 101111001 | 1856 | 1853 | | BRANCH | F02 | |
| 007F | 077C | 001111001 | | 1854 | | ACACC | 12 | AVG NUMBER IS 48 |
| 0079 | 0772 | 101101111 | 1852 | 1855 | | BRANCH | F01 | |
| 0073 | 0766 | 000011110 | | 1856 | | TAM | | PUT COMPRESSED RAN(1) IN OP1(1) |
| 0067 | 074E | 001000010 | | 1857 | F02 | LDX | 4 | |
| 004F | 071E | 001101000 | | 1858 | F03 | TCY | 1 | |
| 001E | 073C | 001100010 | | 1859 | | TCMIY | 1 | = SEGMENT |
| 003D | 077A | 010100011 | | 1860 | | TCY | 2 | |
| 0074 | 0775 | 001100000 | | 1861 | | SBIT | 3 | OPERAND STATUS LATCH |
| 0075 | 076A | 001100010 | | 1862 | | LDX | 4 | |
| 006A | 0756 | 001100101 | | 1863 | | TCMIY | GSEG | |
| 0057 | 072E | 001101101 | | 1864 | | TCMIY | OPAPEN | |
| 005C | 075C | 001101111 | | 1865 | | TCMIY | OPAMER | MINUS OPERATOR |
| 0038 | 0770 | 011011111 | | 1866 | | TCMIY | 15 | |
| 0070 | 0761 | 010000000 | | 1867 | | TCMIY | 15 | BOX TO OP2 |
| 0061 | 0742 | 101101111 | | 1868 | | RETN | | BLANK TO RESULT |
| 0043 | 0706 | 111111001 | | 1869 | F04 | BL | SCAN | SUBROUTINE EXIT |
| 0006 | 070C | 010010001 | 0041 | 1870 | | | | GET DIGIT |
| 000D | 071R | 100101110 | 1857 | 1871 | F03A | CALL | F03 | |
| | | | 1220 | 1872 | | BL | PANTHINK | |
| | | | | 1873 | * RETURNS HERE AFTER DECODE WITH DIGIT IN ACC | | | |
| 001R | 0737 | 010010000 | | 1874 | GAMESDIG | LDX | A | |
| 0037 | 076F | 000100100 | | 1875 | | TCY | 2 | GET OPERAND DIGIT |
| 006E | 075D | 000101010 | | 1876 | | THY | | OPERATOR BLANK IN NUMBER GUESSER ? |
| 005D | 073A | 000000101 | | 1877 | | IYC | | |
| 003A | 0774 | 100100100 | 1927 | 1878 | | BRANCH | GAMRETO | |
| 0074 | 0769 | 110101100 | 1927 | 1879 | | CALL | GAMRETO | |
| 0069 | 0752 | 011100000 | | 1880 | GAMRET1 | ALEC | 0 | DIGIT = 0 ? |

TABLE I-14 (cont)

| | | | | | | | |
|---|---|---|---|---|---|---|---|
| 0053 | 0726 | 101000011 | 1871 | 1882 | | BRANCH | F03A | YES BRANCH |
| 0026 | 072C | 011101101 | | 1883 | | YMCY | 10 | |
| 004C | 0719 | 000101001 | | 1884 | | TMA | | |
| 001B | 0730 | 011110010 | | 1885 | | YMCY | 4 | MOVE OP1 TO RES |
| 0031 | 0763 | 000101001 | | 1886 | | TAMIYC | | |
| 0062 | 0745 | 010101111 | | 1887 | | RETN | | |
| 0045 | 0701 | 110100110 | 1883 | 1888 | | CALL | F05 | |
| 000A | 0714 | 001011100 | | 1889 | | TCY | 3 | |
| 0015 | 072B | 001010001 | | 1890 | | TMA | | |
| 0056 | 0757 | 000110001 | | 1891 | | CPAIZ | | COMPLEMENT DIGIT |
| 002C | 0720 | 000100101 | | 1892 | | TCY | 6 | |
| 005A | 075A | 000101101 | | 1893 | | AMAAC | | ADD OP1(2) |
| 002C | 0731 | 101011110 | 1903 | 1894 | | BRANCH | F07 | NO BORROW |
| 0030 | 0760 | 101011101 | | 1895 | | ACACC | 10 | BCD ADJUST |
| 0060 | 0741 | 011110101 | | 1896 | | TAMDYN | | |
| 0041 | 0702 | 000110010 | | 1897 | | IMAC | | GET OP2(1) TO DECREMENT |
| 0002 | 0702 | 101000011 | 1871 | 1898 | | BRANCH | F03A | BLANK ALREADY |
| 0005 | 0706 | 000000111 | | 1899 | | DMAN | | OP2(1)=1 |
| 001B | 0717 | 000001111 | | 1900 | | TAP | | |
| 0017 | 072F | 011101111 | | 1901 | | ALEC | 0 | |
| 002F | 075F | 100001100 | 1899 | 1902 | | BRANCH | F06 | BLANK A LEADING ZERO |
| 003C | 0730 | 000101111 | | 1903 | | TAM | | |
| 0078 | 0776 | 111111111 | 0047 | 1904 | | CALL | NOSCAN | |
| 0071 | 0771 | 111001110 | 1953 | 1905 | | | | |
| 0063 | 0762 | 110001110 | 1904 | 1906 | | CALL | SHOWTIME | |
| 0047 | 070E | 100111110 | | 1907 | | ACACC | 15 | |
| 000E | 071C | 010010000 | | 1908 | | BRANCH | F08 | |
| 001D | 0735 | 000101000 | | 1909 | | LDX | 4 | |
| 003B | 0777 | 011111010 | | 1910 | | TCY | 1 | |
| 0076 | 076E | 000101001 | | 1911 | | YMCY | 4 | |
| 006D | 0754 | 011110101 | | 1912 | | TMA | | |
| 0059 | 0736 | 001011101 | | 1913 | | YMCY | 10 | MOVE RESULT TO OP1 |
| 0036 | 076C | 100111000 | 1911 | 1914 | | TAMDYN | | |
| 006C | 0750 | 001111000 | | 1915 | | BRANCH | F011 | |
| 0059 | 0732 | 100100010 | 1921 | 1916 | | ACACC | 1 | |
| 0032 | 0764 | 111110011 | 1857 | 1917 | | BRANCH | F013 | LEADING CHARACTER A BLANK ? |
| 0064 | 0749 | 010000001 | | 1918 | | CALL | F03 | YES BRANCH |
| 000C | 0712 | 100000000 | 1190 | 1919 | | RL | BULLSEYE | |
| 0012 | 0724 | 001001000 | | 1920 | | | | |
| 0025 | 0748 | 000011001 | | 1921 | | TCY | 1 | RESULT = 0 ? |
| | | | | 1922 | | MNEZ | | |

TABLE I-14 (cont)

| Addr | Binary | Addr2 | Label | Op | Operand | Comment |
|---|---|---|---|---|---|---|
| 004A | 0715 | 10011010 | 191A | | BRANCH | FO12 | NO BRANCH |
| 0014 | 0728 | 11000001 | 1A42 | | CALL | FORM | FORM NEW PROBLEM |
| 002A | 0753 | 01000100 | | | BL | AST2HALF | |
| 0052 | 0725 | 10001110 | 1212 | | | | |
| 0023 | 0744 | 10001100 | | GAMRETO | TCY | 3 | PUT NUMBER IN OP2 |
| 004A | 0711 | 00001011 | | NG4A | XMA | | 2ND NUMBER ? |
| 0010 | 0720 | 01110001 | 1937 | | ALEC | 9 | YES BRANCH |
| 0021 | 0743 | 10011100 | | | BRANCH | NG5 | |
| 0042 | 0705 | 00010101 | | | TPA | | |
| 0004 | 0702 | 00010101 | | | IYC | | |
| 0009 | 0713 | 00110111 | | | TCMIY | 15 | BLANK 2ND DIGIT |
| 0013 | 0727 | 01011111 | | | RETN | | |
| 0027 | 074F | 01000000 | | NG4B | RL | SCAN | GO GET ANOTHER NUMBER |
| 004E | 071D | 10110111 | | NG5 | XMA | | RESTORE 1ST NUMBER |
| 001C | 0736 | 00000011 | | | IYC | | |
| 0030 | 0773 | 00001111 | | | TAM | | FILL IN 2ND NUMBER |
| 0072 | 0765 | 01000111 | | NG6 | CALLL | MOSCAN | |
| 0065 | 0744 | 01000000 | 0047 | | | | |
| 0044 | 0716 | 11110110 | 1953 | | CALL | SHORTIME | |
| 0016 | 0720 | 11001101 | | | ACACC | 15 | ACC = OP1(1)+1 |
| 002D | 0758 | 00111111 | | | BRANCH | NG6 | CARRY BRANCH |
| 005A | 0735 | 10100101 | 1940 | | LDX | A | ACC = OP1(1) |
| 0037 | 0768 | 00010000 | | NG6A | TCY | 0 | |
| 0068 | 0751 | 01000000 | | | IMAC | | |
| 0051 | 0722 | 00011110 | | | BRANCH | NG9 | |
| 0022 | 0747 | 11001000 | | | THA | | |
| 0044 | 0709 | 00010011 | 1950 | | TCY | 3 | |
| 0008 | 0710 | 00010001 | | NG9 | RL | NG9A | |
| 0011 | 0723 | 01001101 | | | | | |
| 0023 | 0747 | 10001010 | 1509 | SHORTIMF | TCY | 12 | DEFAULT MSD COUNT |
| 0046 | 0700 | 00001011 | | SHORTVAR | TYA | | OR VARIABLE |
| 000C | 0718 | 01010110 | | | LDX | G | |
| 0019 | 0733 | 01001111 | | | TCY | 14 | |
| 0033 | 0767 | 00010111 | | | KNEZ | SHORT1 | MSD = 0 ? |
| 0066 | 0740 | 00100011 | 1960 | | BRANCH | | |
| 004D | 0714 | 10011101 | | | TAM | | |
| 001A | 0734 | 01011011 | | SHORT1 | TCY | 15 | PRESET MSD COUNT |
| 0035 | 0768 | 00100111 | | | OMAM | | DECREMENT COUNTER |
| 006A | 0755 | 00000000 | 1966 | | BRANCH | SHORTEXT | |
| 0055 | 0724 | 10101000 | | | TAMDYN | | |
| 002A | 0753 | 00010110 | | | | | |

TABLE I-14 (cont)

| | | | |
|---|---|---|---|
| 0059 | 0729 | 00000111 | DMAN |
| 0028 | 0750 | 00010111 | TAM |
| 0050 | 0721 | 00000011 | SHOWTEXT XMA |
| 0020 | 0740 | 01011111 | RETN |

TABLE I-15

SOURCE STATEMENT

| PC | LOC | INSTR. | BRLN. | LINE | NAME | TITLE | COMMENTS | |
|---|---|---|---|---|---|---|---|---|
| 0000 | 0780 | 01011110 | | 1969 | CLREGA | LDX | H | |
| 0001 | 0783 | 00000000 | | 1970 | CLCOM | COMX | 0 | |
| 0003 | 0787 | 00100000 | | 1971 | CLALL | TCY | 0 | |
| 0007 | 078F | 00110000 | | 1972 | CLALL1 | TCMIY | 0 | |
| 000F | 079F | 00101000 | | 1973 | | YNEC | | |
| 001F | 073F | 10000111 | 1972 | 1974 | | BRANCH | CLALL1 | |
| 003F | 07FF | 01011111 | | 1975 | | RETN | | |
| 007F | 07FF | 11000000 | 1969 | 1976 | | CALL | CLREGA | |
| 007E | 07FD | 00100111 | | 1977 | | TCY | MODE | |
| 007A | 07FA | 01010000 | | 1978 | | SBIT | USER | |
| 0076 | 07F6 | 01010000 | | 1979 | BLANKD | LDX | 4 | |
| 0077 | 07EF | 00100000 | | 1980 | BLANK | TCY | 0 | |
| 006F | 07DE | 00110111 | | 1981 | BLANK1 | TCMIY | 15 | |
| 005F | 07BE | 00101001 | | 1982 | | YNEC | 8 | |
| 003E | 07FC | 10110111 | 1981 | 1983 | | BRANCH | BLANK1 | |
| 007C | 07F9 | 01011111 | | 1984 | | RETN | | |
| 0079 | 07F2 | 11000001 | 1970 | 1985 | | CALL | CLCOM | |
| 0073 | 07E6 | 00100010 | | 1986 | | TCY | 4 | |
| 0067 | 07CE | 01010000 | | 1987 | | SBIT | 0 | |
| 004F | 079E | 01010000 | | 1988 | CLRR | LDX | 4 | |
| 001E | 073C | 00100011 | | 1989 | | TCY | 12 | |
| 003D | 07FA | 00110000 | | 1990 | | TCMIY | 4 | |
| 007A | 07F5 | 00100111 | | 1991 | ELCKEY | TCY | MODE | |
| 0075 | 07EA | 00101010 | | 1992 | | TMY | | |
| 006A | 07D4 | 00101100 | | 1993 | | YNEC | 3 | |
| 0057 | 074F | 10101100 | 1996 | 1994 | | BRANCH | BLUPK2 | |
| 002E | 070C | 10100000 | 2095 | 1995 | | BRANCH | HLDIS | |
| 005C | 0789 | 11011101 | 2088 | 1996 | BLUPK2 | CALL | CLREGA | |
| 0038 | 07F0 | 01001000 | | 1997 | BDXKY2 | LDX | 4 | |
| 0070 | 07E1 | 11000001 | 1970 | 1998 | | CALL | CLCOM | |
| 0061 | 07C2 | 01001000 | | 1999 | | LDX | 0 | |

TABLE I-15 (cont)

| | | | | | | |
|---|---|---|---|---|---|---|
| 0043 | 0786 | 11000011 | | 2000 | | CALL | CLALL |
| 0006 | 078C | 11000001 | | 2001 | | CALL | CLCOM |
| 000D | 0798 | 01001100 | | 2002 | | LDX | 0 |
| 001B | 07A7 | 11000011 | 1971 | 2003 | | CALL | CLALL |
| 0037 | 07EF | 11000001 | 1970 | 2004 | | CALL | CLCOM |
| 006E | 07DD | 01010001 | | 2005 | | LDX | DAM |
| 005D | 07BA | 11000001 | 1971 | 2006 | | CALL | CLALL |
| 003A | 07FJ | 10010000 | 2095 | 2007 | | BRANCH | HLDIS |
| 0074 | 07E9 | 00100001 | | 2008 | VSSKEY | TCY | MODE |
| 0069 | 07D2 | 00100001 | | 2009 | | TBIT | 2 |
| 0053 | 07A6 | 10101101 | 2042 | 2010 | | BRANCH | MOVBOX |
| 0026 | 07CC | 11000000 | 1969 | 2011 | VSS1 | CALL | CLREGA |
| 004C | 0799 | 00100011 | | 2012 | | TCY | MODE |
| 0018 | 07A0 | 00101111 | | 2013 | | TAM | |
| 0031 | 07E3 | 11111011 | 1979 | 2014 | | CALL | BLANKD |
| 0062 | 07C5 | 11000001 | 1970 | 2015 | | CALL | CLCOM |
| 0045 | 07AA | 00000110 | | 2016 | INSPLS | CLA | |
| 0064 | 07A4 | 00111000 | | 2017 | | ACACC | 1 |
| 0015 | 07AB | 00100101 | | 2018 | SETOPR | TCY | 10 |
| 0028 | 07D7 | 01001000 | | 2019 | | LDX | A |
| 0054 | 07AD | 00101111 | | 2020 | | TAM | |
| 0056 | 07D8 | 00010100 | | 2021 | | LDX | A |
| 0020 | 07B1 | 00100101 | | 2022 | | TCY | 10 |
| 0053 | 07ED | 00001101 | | 2023 | | TMA | |
| 0030 | 07C1 | 00100101 | | 2024 | | TCY | 20 |
| 0091 | 0782 | 00111001 | | 2025 | | ACACC | 9 |
| 0002 | 07B4 | 00101111 | | 2026 | | TAM | |
| 0005 | 07BH | 00010111 | | 2027 | | LDX | B |
| 0078 | 0797 | 00100101 | | 2028 | | TCY | A |
| 0017 | 07AF | 01101000 | | 2029 | | TCMIY | |
| 002F | 07DF | 01011111 | | 2030 | | LDX | A |
| 005E | 07BD | 01001000 | | 2031 | | RETN | |
| 003C | 07BA | 00010001 | | 2032 | | TCY | MODE |
| 007A | 07F1 | 00000111 | | 2033 | | TBIT | 2 |
| 0071 | 07E2 | 10000110 | 2037 | 2034 | | BRANCH | BOXKEY |
| 0063 | 07C6 | 00100000 | | 2035 | | TCY | 1 |
| 0047 | 076E | 10111010 | 1991 | 2036 | BOXKEY | BRANCH | ELCKEY |
| 000F | 079C | 00100101 | | 2037 | | TCY | 5 |
| 0010 | 07BH | 00100100 | | 2038 | | TCMIY | 10 |
| 0038 | 07F7 | 00100000 | | 2039 | | TCMIY | 1 |
| 0076 | 07EC | 00110101 | | 2040 | | TCMIY | 11 |

TABLE I-15 (cont)

| | | | | | | | |
|---|---|---|---|---|---|---|---|
| 0060 | 070A | 10100111 | | | | BRANCH | CLPR |
| 0057 | 0786 | 00001001 | | | | MNEA | VSS1 |
| 0036 | 07EC | 10010010 | | | | BRANCH | MJUGUESS |
| 006C | 0709 | 01000101 | 1988 | | MOVBOX | CALL | |
| 0059 | 07B2 | 11010100 | 1052 | | | CALL | INSOPR |
| 0032 | 07E1 | 11010100 | 2021 | | | LDX | B |
| 0064 | 07C9 | 01001100 | | | | IMAC | |
| 0049 | 0792 | 01000100 | | | | ALEC | 2 |
| 0012 | 07AA | 01110000 | | | | BRANCH | BOXOK |
| 0025 | 07C3 | 10100010 | | | | ALEC | 3 |
| 0044 | 07CB | 01000100 | | | | BRANCH | BOXKY1 |
| 0014 | 0795 | 01110110 | | | | ALEC | 6 |
| 0029 | 07AB | 10010100 | | | | BRANCH | BOXOK |
| 0052 | 07D3 | 01110110 | | | | ACACC | 13 |
| 0023 | 07A5 | 00111011 | 2056 | BOXKY1 | | TAM | |
| 0070 | 07CA | 00101011 | 2055 | BOXOK | | TCY | 5 |
| 0048 | 0791 | 00011010 | 2056 | BOXOK1 | | CALL | CLALLI |
| 0010 | 07A0 | 00101010 | | | | CALL | BOXERR |
| 0021 | 07C3 | 11000111 | 1972 | | | TCY | 13 |
| 0042 | 0785 | 01001100 | 0909 | | | TCMIY | 13 |
| 0004 | 0788 | 11010010 | | | | TCY | 6 |
| 0009 | 0793 | 00101011 | | | | TCMIY | 1 |
| 0013 | 0747 | 00110110 | | | | TCY | 2 |
| 0027 | 07CF | 00010000 | | | | ALEC | 2 |
| 004F | 079D | 00110010 | 1997 | | | BRANCH | BOXKY2 |
| 001C | 07B8 | 00110010 | | | | TCY | 6 |
| 0039 | 07F3 | 10001001 | | | | TCMIY | 2 |
| 0072 | 07E5 | 10010000 | 1997 | BLUPKY | | BRANCH | BOXKY2 |
| 0065 | 07CA | 00011100 | 1969 | | | CALL | CLREGI |
| 0043 | 0796 | 10001100 | 1970 | | | CALL | CLCOM |
| 0016 | 07AC | 11000010 | | | | TCY | 4 |
| 0020 | 07D8 | 00010001 | | | | TCMIY | 1 |
| 0054 | 0785 | 11000001 | 1979 | | | CALL | BLANKD |
| 0030 | 07E8 | 00010010 | 2016 | | | CALL | INSPLS |
| 0068 | 07D1 | 11111011 | | | | TCY | 5 |
| 0051 | 07A2 | 11000101 | | | | TCMIY | 10 |
| 0022 | 07CB | 00101010 | | | | TCY | 7 |
| 0011 | 07A3 | 00101110 | | | | TCMIY | 11 |
| 0023 | 07C7 | 00110111 | 1988 | | DPRKY2 | BRANCH | CLRB |
| 0046 | 078D | 01010001 | | | | SKIT | 2 | SET 2ND OPRD FLG |

TABLE I-15 (cont)

| | | | | | | |
|---|---|---|---|---|---|---|
| 000C | 0798 | 110010101 | 2018 | | CALL | SETOPR |
| 0019 | 07A3 | 100100000 | 2095 | | BRANCH | BLDIS |
| 0033 | 07E7 | 010010000 | | DIVZRO | LDX | 4 |
| 0066 | 07CD | 001000010 | | | TCY | 4 |
| 004D | 0794 | 001101111 | | | TCMIY | 15 |
| 0014 | 0784 | 100100000 | 2095 | | BRANCH | BLDIS |
| 0035 | 07EB | 010011000 | | CLREGB | LDX | 8 |
| 006A | 07D5 | 100000011 | 1971 | | BRANCH | CLALL |
| 0055 | 07AA | 001001101 | | BOXNX1 | TCY | 10 |
| 002A | 07D4 | 001001000 | | | LDX | 8 |
| 0054 | 07A9 | 010000101 | | | LDP | 10 |
| 0028 | 07D0 | 001100011 | | | MNEZ | |
| 0050 | 07A1 | 101011001 | 1399 | | BRANCH | USRNX1 |
| 0020 | 07C0 | 010000000 | | HLDIS | BL | SCAN |
| 0040 | 0781 | 101101111 | 0041 | | | |

OPR SEG TO A10

TABLE II
LEVELS OF DIFFICULTY, BOX PROBLEM MODE

| | LEVEL 1 | LEVEL 2 |
|---|---|---|
| ADDITION PROBLEMS | | |
| Addends | 0 to 9 | 0 to 49 |
| Sum | 0 to 18 | 0 to 98 |
| SUBTRACTION PROBLEMS | | |
| Minuend | 0 to 18 | 0 to 49 |
| Subtrahend | 0 to 9 | 0 to 49 |
| Difference | 0 to 9 | 0 to 49 |
| MULTIPLICATION PROBLEMS | | |
| Multiplicand | 0 to 5 | 0 to 9 |
| Multiplier | 0 to 9 | 0 to 9 |
| Product | 0 to 45 | 0 to 81 |
| DIVISION PROBLEMS | | |
| Dividend | 0 to 45 | 0 to 81 |
| Division | 1 to 5 | 1 to 9 |
| Quotient | 0 to 9 | 0 to 9 |

TABLE III
FIVE BIT LATCHED ACCUMULATOR REGISTER CODES

| S BIT CODE | SEGMENTS ACTUATED | OUTPUT DISPLAY |
|---|---|---|
| 00 | a,b,c,d,e,f | 0 |
| 01 | b,c | 1 |
| 02 | a,b,c,d,e,g | 2 |
| 03 | a,b,c,d,g | 3 |
| 04 | b,c,f,g | 4 |
| 05 | a,c,d,f,g | 5 |
| 06 | a,c,d,e,f,g | 6 |
| 07 | a,b,c | 7 |
| 08 | a,b,c,d,e,f,g | 8 |
| 09 | a,b,c,d,f,g | 9 |
| 0A | a,d,e,f | [ |
| 0B | a,b,c,d | ] |
| 0C | e,g | r |
| 0D | a,d,e,f,g | E |
| 0E | | Blank |
| 0F | | Blank |
| 10 | | Blank |
| 11 | c | part of timer display |
| 12 | d | part of timer display |
| 13 | e | part of timer display |
| 14 | g | part of timer display |
| 15 | f | part of timer display |
| 16 | a | part of timer display |
| 17 | b | part of timer display |
| 18 | a,d | dots in divide sign |
| 19 | | Blank |
| 1A | b,e,g | plus sign |
| 1B | g | minus sign |
| 1C | f | multiply sign |
| 1D | a,d,g | divide sign |
| 1E | a,b,c,d,e,f,g | circle |
| 1F | | Blank |

TABLE IV
DISPLAY PRESENTATIONS

TYPE A PRESENTATION

1. Sequentially energize the display's $S_a$ segments starting at left hand side of the display (D9) and proceed to right hand side (D2) and energize equals sign segments between the $S_p$ segments at D5 and D4; follow the $S_p$ segment at D2 by first actuating four segments at D1 (these segments are located at 90° positions to each other) and then by actuating all segments at D1.
2. Repeat step 1, substituting $S_d$ segments for $S_p$ segments.
3. Repeat step 1, substituting G segments for $S_p$ segments.
4. Repeat step 1, substituting $S_a$, $S_d$ and $S_g$ segments for $S_p$ segments.
5. Actuate circular character by first actuating four segments (at 90° positions to each other) at D1 and then actuating all segments at D1; sequentially energize the $S_p$ segments starting at the right side (D2) and proceed to the left hand side (D9) and actuate the equals sign segments between the $S_p$ segments at D4 and D5.
6. Repeat step 5, substituting $S_d$ segments for $S_p$ segments.
7. Repeat step 5, substituting $S_g$ segments for $S_p$ segments.
8. Repeat step 5, substituting $S_a$, $S_d$ and $S_g$ segments for $S_p$ segments.

TYPE B PRESENTATION

3. Sequentially energize the display's $S_g$ segments starting at left hand side of the display (D9) and proceed to right hand side (D2) and energize the equals sign segments between the $S_g$ segments at D5 and D4; follow the $S_g$ segment at D2 by first actuating four segments at D1 (these segments are located at 90° positions to each other) and then by actuating all segments at D1.
2. After actuating all segments at D1, again actuate the four segments at D1; then sequentially energize the $S_g$ segments starting at the right side (D2) and proceed to the left hand side (D9) and actuate the equals sign segments between the $S_g$ segments of D4 and D5.

TYPE C PRESENTATION

Do step 1 of a type B presentation alone.

TYPE D PRESENTATION

Actuate the various segments in the various digit positions for approximately one second. The segments should appear to be randomly actuated to the casual observer; of course, the actual sequence selected for actuating the segments may be preprogrammed to merely appear to be random.

What is claimed is:

1. An electronic learning aid comprising:
   problem posing means for posing a sequence of arithmetic problems to an operator of the learning aid;
   display means operably associated with said problem posing means for visually presenting to an operator of the learning aid problems posed by said problem posing means, said display means including a plurality of individually actuatable segments visually observable when actuated, some of said plurality of segments being arranged in a generally circular configuration and others of said plurality of segments being arranged to display numeric characters;
   operator input means for receiving an input from an operator of the learning aid as an entered solution by the operator to the problem being posed as displayed by said display means;
   comparison means for comparing an entered solution to a posed arithmetic problem in said sequence with the correct solution to the problem being posed;

elasped time measuring means coupled to said problem posing means and said comparison means for measuring elapsed times between the time the first problem in said sequence is posed until the time the last problem in said sequence is solved, said elapsed time measuring means including a register for storing a number indicative of the elapsed time;

an arithmetic unit associated with said problem posing means, said comparison means and said elapsed time measuring means for calculating the correct solutions to the problems posed and for periodically incrementing the number stored in said register of said elapsed time measuring means;

result means coupled to said display means, said comparison means and said elapsed time measuring means for providing outputs indicative of the correctness of the entered solutions of said sequence of problems posed and the elapsed time measured by said elapsed time measuring means, said display means being responsive to the outputs of said result means for displaying to the operator an indication of the correctness of the entered solutions of said sequence of problems posed and an indication of the elapsed time measured by said elapsed time measuring means; and said segments of said display means arranged in said generally circular configuration being sequentially actuated around the circumference of said circular configuration by said elapsed time measuring means wherever said problem posing means poses a sequence of problems at said display means, and said other segments arranged to display numeric characters being selectively actuatable in response to said elapsed time measuring means to display numeric characters indicative of the total elapsed time measured by said elapsed time measuring means.

2. An electronic learning aid as set forth in claim 1, wherein said operator input means comprises a keyboard.

3. An electronic learning aid as set forth in claim 2, wherein said display means comprises a vacuum fluorescent display device.

4. An electronic learning aid as set forth in claim 2, wherein said display means comprises an array of light emitting diodes.

5. An electronic learning aid as set forth in claim 2, wherein said display means comprises a liquid crystal display device.

6. An electronic learning aid as set forth in claim 1, wherein the numeric characters indicative of the total elapsed time are displayed after said sequence of problems has been posed.

7. An electronic learning aid as set forth in claim 1, wherein said comparison means includes means for determining when an entered solution is incorrect; and
said display means being responsive to said incorrect solution-determining means for displaying to the operator an indication of the incorrectness of each entered incorrect solution.

8. An electronic learning aid as set forth in claim 7, further including means for actuating the segments of said display means in a pseudorandom fashion, and said display means displaying said indication of incorrectness via actuation of its segments in a pseudorandom fashion.

9. An electronic learning aid as set forth in claim 7, wherein each of the arithmetic problems posed by said problem posing means includes at least two operands, and further including a random number generator coupled to said problem posing means for randomly generating at least one of the operands in the arithmetic problems posed by said problem posing means.

10. An electronic learning air as set forth in claim 7, wherein each of the arithmetic problems posed by said problem posing means includes at least two operands, and said arithmetic unit incrementing one of the operands in successive problems included in said sequence of problems posed by said problem posing means.

11. An electronic learning aid comprising:
answer entry means;
display means for visually presenting to an operator of the learning aid problems posed by said learning aid, said display means including a plurality of individually actuatable segments visually observable when actuated, some of said plurality of segments being arranged in a generally circular configuration; and
microprocessor system means coupled to said display means, said microprocessor system means including
problem posing means for posing a sequence of arithmetic problems via said display means to the operator of said learning aid,
means receiving from said answer entry means a proposed solution by the operator to the problem being posed at said display means,
comparison means for comparing a proposed solution as received by said receiving means from said answer entry means with the correct solution to the problem being posed to determine whether the proposed solution is correct,
timing means for measuring the elapsed time occurring from the time the first problem in said sequence is posed until the last problem in said sequence is solved, said timing means including a register for storing a number indicative of the elapsed time, said number being periodically incremented by said microprocessor system means,
means actuating said display means to indicate the correctness of the proposed solutions entered at said answer entry means in response to the sequence of problems posed at said display means, and
means actuating said display means to indicate the elapsed time occurring during the posing of said sequence of problems and in a manner indicating that the number in said register is being periodically incremented, wherein said segments of said display means arranged in said generally circular configuration are periodically and sequentially actuated around the circumference of said circular configuration in response to the number in said register being incremented by said microprocessor system means.

12. An electronic learning aid as set forth in claim 11, wherein said display means has a plurality of character positions adapted to display respective characters therein, an annotate character disposed between at least some of the character positions to separate at least some of the character positions and an equals sign character disposed between others of the charcter positions, and said plurality of segments of said display means including segmented electrodes defining said characters for said plurality of character positions, said annotate character and said equals sign character.

13. An electronic learning aid as set forth in claim 12, wherein said display means comprises a vacuum fluorescent display device.

14. An electronic learning aid as set forth in claim 11, wherein said electronic learning aid includes problem entry means and wherein said problem posing means of said microprocessor system means includes a memory means for storing a sequence of problems entered at said problem entry means.

15. An electronic learning aid as set forth in claim 14, wherein said answer entry means and said problem entry means are provided by a keyboard coupled to said microprocessor system means.

16. An electronic learning aid as set forth in claim 14, wherein each of the arithmetic problems posed by said problem posing means includes at least two operands, said microprocessor system means includes a random number generator means coupled to said problem posing means for randomly generating at least one of the operands in the arithmetic problems included in said sequence of problems, and wherein said electronic learning aid further includes entry mode means for determining whether the sequence of problems posed at said display means is provided by said memory means of said problem posing means or by said problem posing means in conjunction with said random number generator means.

* * * * *